United States Patent
Johannes et al.

(10) Patent No.: US 12,448,063 B2
(45) Date of Patent: Oct. 21, 2025

(54) SYSTEMS AND METHODS FOR AUTOMATED OPERATION AND HANDLING OF AUTONOMOUS TRUCKS AND TRAILERS HAULED THEREBY

(71) Applicant: Outrider Technologies, Inc., Brighton, CO (US)

(72) Inventors: Matthew S. Johannes, Arvada, CO (US); Martin E. Sotola, Boulder, CO (US); Joseph S. DeRose, Denver, CO (US); Jarvis A. Schultz, Golden, CO (US); Austin Lovan, Wheat Ridge, CO (US)

(73) Assignee: Outrider Technologies, Inc., Brighton, CO (US)

( * ) Notice: Subject to any disclaimer, the term of this patent is extended or adjusted under 35 U.S.C. 154(b) by 207 days.

(21) Appl. No.: 18/219,618

(22) Filed: Jul. 7, 2023

(65) Prior Publication Data

US 2024/0043075 A1    Feb. 8, 2024

Related U.S. Application Data

(63) Continuation-in-part of application No. 17/009,620, filed on Sep. 1, 2020, now Pat. No. 11,707,955, which (Continued)

(51) Int. Cl.
   *B62D 53/08* (2006.01)
   *B62D 53/12* (2006.01)
   *B25J 9/16* (2006.01)

(52) U.S. Cl.
   CPC ....... *B62D 53/0857* (2013.01); *B62D 53/125* (2013.01); *B25J 9/1697* (2013.01)

(58) Field of Classification Search
   CPC ... B62D 53/0857; B62D 53/125; B25J 9/1697
   See application file for complete search history.

(56) References Cited

U.S. PATENT DOCUMENTS

| 3,881,748 A | 5/1975 | Donaldson |
| 4,366,965 A | 1/1983 | Rhodes |

(Continued)

FOREIGN PATENT DOCUMENTS

| CA | 2555212 A1 | 9/2005 |
| CN | 106741239 | 5/2017 |

(Continued)

OTHER PUBLICATIONS

'Re: Adapting the gladhand to an airhose'. In Steel Soldiers Military Vehicles Supersite Forums [online], Nov. 24, 2008 [ retrieved on Nov. 4, 2020], Retrieved from the Internet: <https://www.steelsoldiers.com/threads/adapting-the-gladhand-to-an-airhose,28023/post-292796>. (Year: 2008).

(Continued)

*Primary Examiner* — Gertrude Arthur Jeanglaude
(74) *Attorney, Agent, or Firm* — Loginov & Associates, PLLC; William A. Loginov

(57) ABSTRACT

This invention provides a system and method for reliably interconnecting a native gladhand on a trailer with an AV truck, in which the gladhand can vary in placement and type on the trailer front. A visually guided robot manipulator arm accesses the trailer front. The arm includes an end effector assembly that is arranged to visually navigate to the gladhand and engage the gladhand by latching onto a gladhand using a connection tool that includes a hinged gladhand/wedge capture assembly and a pressurized clamping connection plate that selectively engages the trailer gladhand seal. The capture assembly is arranged to accommodate different gladhand geometries in latching thereonto. The connection tool includes a hinge that is spring-loaded in both a locked and unlocked bistable state, and sensors monitor the state. The system can include passive or active compliance elements that accommodate moderate misalignment (Continued)

between the engaged gladhand and the robotic arm/connection tool.

40 Claims, 64 Drawing Sheets

Related U.S. Application Data is a continuation-in-part of application No. 16/282,279, filed on Feb. 21, 2019, now Pat. No. 11,099,560.

(60) Provisional application No. 62/715,757, filed on Aug. 7, 2018, provisional application No. 62/681,044, filed on Jun. 5, 2018, provisional application No. 62/633,185, filed on Feb. 21, 2018.

(56) References Cited

U.S. PATENT DOCUMENTS

| | | | |
|---|---|---|---|
| 4,448,447 A | 5/1984 | Funk | |
| 4,548,783 A | 10/1985 | Dalke | |
| 5,305,427 A | 4/1994 | Nagata | |
| 5,607,221 A | 3/1997 | Justus | |
| 6,179,319 B1 | 1/2001 | Malisch | |
| 6,863,538 B2 | 3/2005 | Mattern | |
| 7,562,918 B2 | 7/2009 | Toma | |
| 7,669,875 B2 | 3/2010 | Halverson | |
| 7,748,549 B1 | 7/2010 | Browning | |
| 8,187,020 B2 | 5/2012 | Algueera Gallego | |
| 8,301,318 B2 | 10/2012 | Lacaze | |
| 8,532,862 B2 | 9/2013 | Neff | |
| 8,727,084 B1 | 5/2014 | Kuker | |
| 8,806,689 B2 | 8/2014 | Riviere | |
| 8,888,121 B2 | 11/2014 | Trevino | |
| 9,068,668 B2 | 6/2015 | Grover | |
| 9,211,889 B1 | 12/2015 | Hoetzer | |
| 9,302,678 B2 | 4/2016 | Murphy | |
| 9,592,964 B2 | 3/2017 | Göllü | |
| 9,688,489 B1 | 6/2017 | Zevenbergen | |
| 10,081,504 B2 | 9/2018 | Walford | |
| 10,399,477 B2 | 9/2019 | Obermeyer | |
| 10,556,473 B2* | 2/2020 | Strand | B60D 1/62 |
| 11,099,560 B2 | 8/2021 | Smith | |
| 11,429,099 B2 | 8/2022 | Smith | |
| 11,560,188 B2 | 1/2023 | Moore | |
| 11,834,111 B2* | 12/2023 | Moore | B60D 1/64 |
| 2003/0233189 A1 | 12/2003 | Hsiao | |
| 2004/0146384 A1 | 7/2004 | Whelan | |
| 2005/0017506 A1 | 1/2005 | Caldwell | |
| 2005/0103541 A1 | 5/2005 | Nelson | |
| 2006/0071447 A1 | 4/2006 | Gehring | |
| 2007/0030349 A1 | 2/2007 | Riley | |
| 2008/0012695 A1 | 1/2008 | Herschell | |
| 2008/0223630 A1 | 9/2008 | Couture | |
| 2008/0262654 A1 | 10/2008 | Omori | |
| 2010/0025964 A1 | 2/2010 | Fisk | |
| 2011/0037241 A1 | 2/2011 | Temple | |
| 2011/0254504 A1 | 10/2011 | Haddad | |
| 2012/0248167 A1 | 10/2012 | Flanagan | |
| 2014/0007386 A1 | 1/2014 | Liao | |
| 2014/0251556 A1 | 9/2014 | Orton | |
| 2014/0268095 A1 | 9/2014 | Petkov | |
| 2015/0251366 A1 | 9/2015 | Voth | |
| 2015/0258908 A1 | 9/2015 | Fukui | |
| 2015/0263541 A1 | 9/2015 | Fukui | |
| 2015/0328655 A1 | 11/2015 | Reichler | |
| 2015/0352721 A1 | 12/2015 | Wicks | |
| 2015/0360882 A1 | 12/2015 | Girtman | |
| 2016/0039456 A1 | 2/2016 | Lavoie | |
| 2016/0054143 A1 | 2/2016 | Abuelsaad | |
| 2016/0075526 A1 | 3/2016 | Avalos | |
| 2016/0260328 A1 | 9/2016 | Mishra | |
| 2016/0304122 A1 | 10/2016 | Herzog | |
| 2016/0318490 A1 | 11/2016 | Ben Shalom | |
| 2017/0031356 A1 | 2/2017 | Bell | |
| 2017/0050526 A1 | 2/2017 | Sommarström | |
| 2017/0146168 A1 | 5/2017 | Caprio | |
| 2017/0165839 A1 | 6/2017 | Tan | |
| 2017/0174019 A1 | 6/2017 | Lurie | |
| 2017/0185082 A1 | 6/2017 | Matos | |
| 2017/0186124 A1 | 6/2017 | Jones | |
| 2017/0305694 A1 | 10/2017 | Mcmurrough | |
| 2017/0361844 A1 | 12/2017 | Kahn | |
| 2017/0364070 A1 | 12/2017 | Oba | |
| 2017/0369260 A1 | 12/2017 | Hoofard | |
| 2018/0050573 A1 | 2/2018 | Strand | |
| 2018/0202822 A1 | 7/2018 | Delizio | |
| 2018/0250833 A1 | 9/2018 | Boria | |
| 2018/0264963 A1 | 9/2018 | Dudar | |
| 2018/0265076 A1 | 9/2018 | Hall | |
| 2018/0265296 A1 | 9/2018 | Beckman | |
| 2018/0281178 A1 | 10/2018 | Jacobsen | |
| 2018/0346029 A1 | 12/2018 | Kabos | |
| 2018/0362270 A1 | 12/2018 | Clucas | |
| 2019/0002216 A1 | 1/2019 | Walford | |
| 2019/0064828 A1 | 2/2019 | Meredith | |
| 2019/0064835 A1 | 2/2019 | Hoofard | |
| 2019/0077600 A1 | 3/2019 | Watts | |
| 2019/0095861 A1 | 3/2019 | Baldwin | |
| 2019/0129429 A1 | 5/2019 | Juelsgaard | |
| 2019/0187716 A1 | 6/2019 | Cantrell | |
| 2019/0197786 A1 | 6/2019 | Molyneaux | |
| 2019/0235504 A1 | 8/2019 | Carter | |
| 2020/0239242 A1 | 7/2020 | Hoofard | |
| 2020/0338942 A1 | 10/2020 | Winograd | |
| 2020/0387166 A1 | 12/2020 | Lacaze | |
| 2020/0387168 A1 | 12/2020 | Lacaze | |
| 2021/0053407 A1 | 2/2021 | Smith | |
| 2021/0061304 A1 | 3/2021 | Braunstein | |
| 2021/0141384 A1 | 5/2021 | Lacaze | |
| 2021/0192784 A1 | 6/2021 | Taylor | |
| 2021/0238908 A1 | 8/2021 | Ramage | |
| 2021/0316761 A1 | 10/2021 | Torrie | |
| 2021/0380182 A1 | 12/2021 | Delizo | |
| 2022/0080584 A1 | 3/2022 | Wicks | |
| 2022/0371199 A1 | 11/2022 | Schultz | |
| 2023/0391243 A1 | 12/2023 | Duong | |
| 2024/0043075 A1 | 2/2024 | Johannes | |
| 2024/0294044 A1* | 9/2024 | Lacaze | B60D 1/64 |

FOREIGN PATENT DOCUMENTS

| | | |
|---|---|---|
| CN | 107380002 | 11/2017 |
| DE | 102012102648 B4 | 9/2012 |
| DE | 102012023999 A1 | 1/2014 |
| EP | 2886497 B1 | 6/2015 |
| JP | S5885702 A | 5/1983 |
| JP | 3215916 B2 | 10/2001 |
| WO | 2010118420 A2 | 10/2010 |
| WO | 2013180622 A1 | 12/2013 |
| WO | 2016205559 A1 | 12/2016 |
| WO | 2017100716 A1 | 6/2017 |
| WO | 2018001915 A1 | 1/2018 |
| WO | 2019042958 A1 | 3/2019 |
| WO | 2019046383 A1 | 3/2019 |
| WO | 2019118848 A1 | 6/2019 |

OTHER PUBLICATIONS

Bennett, Sean. Modern Diesel Technology: Brakes, Suspension & Steering. New York, Delmar, 2007. pp. 53-54. ISBN-10: 1-4180-1372-2. (Year: 2007).

Fuchs C et al: "3D pose estimation for articulated vehicles using Kalman-filter based tracking", Pattern Recognition. Image Analysis, Allen Press, Lawrence, KS, US, vol. 26, No. 1, Jul. 23, 2016 (Jul. 23, 2016), pp. 109-113, XP036013102, ISSN: 1054-6618, DOI: 10.1134/S1054661816010077 [retrieved on Jul. 23, 2016] p. 109-p. 112.

Tofael Ahamed: "Navigation of an Autonomous Tractor Using Multiple Sensors", Thesis, Feb. 22, 2008 (Feb. 22, 2008), XP055527539, Retrieved from the Internet: URL:https://tsukuba.repo.nii.ac.jp/?action =repository action common download&item id=20956

(56) References Cited

OTHER PUBLICATIONS

&item- - no=l&attribute- id=l7&file- no=2 [retrieved on Nov. 27, 2018] Chapter 9.

* cited by examiner

SYSTEMS AND METHODS FOR AUTOMATED OPERATION AND HANDLING OF AUTONOMOUS TRUCKS AND TRAILERS HAULED THEREBY

RELATED APPLICATIONS

This application is a continuation-in-part of U.S. patent application Ser. No. 17/009,620, entitled SYSTEMS AND METHODS FOR AUTOMATED OPERATION AND HANDLING OF AUTONOMOUS TRUCKS AND TRAILERS HAULED THEREBY, filed Sep. 1, 2020, now U.S. Pat. No. 11,707,955, issued Jul. 25, 2023, which is a continuation-in-part of U.S. patent application Ser. No. 16/282,279, entitled SYSTEMS AND METHODS FOR AUTOMATED OPERATION AND HANDLING OF AUTONOMOUS TRUCKS AND TRAILERS HAULED THEREBY, filed Feb. 21, 2019, now U.S. Pat. No. 11,099,560, issued Aug. 24, 2021, which claims the benefit of U.S. Provisional Application Ser. No. 62/633,185, entitled SYSTEMS AND METHODS FOR AUTOMATED OPERATION AND HANDLING OF AUTONOMOUS TRUCKS AND TRAILERS HAULED THEREBY, filed Feb. 21, 2018, U.S. Provisional Application Ser. No. 62/681,044, entitled SYSTEMS AND METHODS FOR AUTOMATED OPERATION AND HANDLING OF AUTONOMOUS TRUCKS AND TRAILERS HAULED THEREBY, filed Jun. 5, 2018, and U.S. Provisional Application Ser. No. 62/715,757, entitled SYSTEMS AND METHODS FOR AUTOMATED OPERATION AND HANDLING OF AUTONOMOUS TRUCKS AND TRAILERS HAULED THEREBY, filed Aug. 7, 2018, the entire disclosure of each of which applications is herein incorporated by reference.

FIELD OF THE INVENTION

This invention relates to autonomous vehicles and more particularly to autonomous trucks and trailers therefor, for example, as used to haul cargo around a shipping facility, a production facility or yard, or to transport cargo to and from a shipping facility, a production facility or yard.

BACKGROUND OF THE INVENTION

Trucks are an essential part of modern commerce. These trucks transport materials and finished goods across the continent within their large interior spaces. Such goods are loaded and unloaded at various facilities that can include manufacturers, ports, distributors, retailers, and end users. Large over-the road (OTR) trucks typically consist of a tractor or cab unit and a separate detachable trailer that is interconnected removably to the cab via a hitching system that consists of a so-called fifth wheel and a kingpin. More particularly, the trailer contains a kingpin along its bottom front and the cab contains a fifth wheel, consisting of a pad and a receiving slot for the kingpin. When connected, the kingpin rides in the slot of the fifth wheel in a manner that allows axial pivoting of the trailer with respect to the cab as it traverses curves on the road. The cab provides power (through (e.g.) a generator, pneumatic pressure source, etc.) used to operate both itself and the attached trailer. Thus, a plurality of removable connections are made between the cab and trailer to deliver both electric power and pneumatic pressure. The pressure is used to operate emergency and service brakes, typically in conjunction with the cab's own (respective) brake system. The electrical power is used to power (e.g.) interior lighting, exterior signal and running lights, lift gate motors, landing gear motors (if fitted), etc.

Throughout the era of modern transport trucking, the connection of such electrical and pneumatic lines has typically been performed manually by a driver. For example, when connecting to a trailer with the cab, after having backed into the trailer so as to couple the truck's fifth wheel to the trailer's kingpin, these operations all require a driver to then exit his or her cab. More particularly, a driver must crank the landing gear to drop the kingpin into full engagement with the fifth wheel, climb onto the back of the cab chassis to manually grasp a set of extendable hoses and cables (carrying air and electric power) from the rear of the cab, and affix them to a corresponding set onto related connections at the front of the trailer body. This process is reversed when uncoupling the trailer from the cab. That is, the operator must climb up and disconnect the hoses/cables, placing them in a proper location, and then crank down the landing gear to raise the kingpin out of engagement with the fifth wheel.

A wide range of solutions have been proposed over the years to automate one or more of the above processes, thereby reducing the labor needed by the driver. However, no matter how effective such solutions have appeared in theory, the trucking industry still relies upon the above-described manual approach(es) to connecting and disconnecting a trailer to/from a truck tractor/cab.

Commonly-assigned U.S. patent application Ser. No. 17/009,620, entitled SYSTEMS AND METHODS FOR AUTOMATED OPERATION AND HANDLING OF AUTONOMOUS TRUCKS AND TRAILERS HAULED THEREBY, filed Sep. 1, 2020, now U.S. Pat. No. 11,707,955, issued Jul. 25, 2023, teaches novel arrangements for using robotic, multi-axis arm-based manipulators to connect and disconnect (typically pneumatic) service lines between the AV truck and a so-called gladhand connection on the trailer front. This application is incorporated herein by reference as useful background information. More particularly, it is desirable to provide mechanisms for connecting the truck lines a so-called native gladhand that is free of adapters or attachments other than the conventional flange and seal arrangement that allows such to form a gas-tight seal with another gladhand on the AV truck. The attachment and detachment is performed using a rotational motion between confronting gladhands to lock flanges together in a manner that compresses opposing annular seals contained in each gladhand body. The above-incorporated Published Patent Application describes end effectors and robotic hands that facilitate the attachment of a gladhand adapter to the native trailer front-mounted gladhand. As part of the attachment process, the native gladhand should be identified. Machine vision, employing pattern recognition based upon acquired images of the trailer front, can be used (at least in part) to identify and locate the trailer gladhand.

There are numerous challenges in providing connections between airlines on an AV truck and a native and/or modified gladhand. Novel adaptations and mechanisms for reliably facilitation such connections and subsequent operation of the AV truck with a hitched trailer are highly desirable.

SUMMARY OF THE INVENTION

This invention overcomes disadvantages of the prior art by providing a system and method for reliably interconnecting a native gladhand on a trailer with an AV truck, in which the gladhand can vary in placement and type on the trailer front (e.g. fixed or retractable type). The AV truck includes a robot manipulator arm mounted on its chassis in a position to access the trailer front. The arm includes an end effector assembly that is arranged to visually navigate to the gladhand using appropriate machine vision cameras (and/or depth sensors) and techniques and engage the gladhand by latching onto a recognized gladhand portion (e.g. a wedge) using a connection tool that includes a hinged gladhand/wedge capture assembly and a pressurized clamping connection plate that selectively engages the trailer gladhand seal. The capture assembly is arranged to accommodate different gladhand geometries in latching thereonto. The connection tool includes a hinge that is spring-loaded in both a locked and unlocked bistable state, and sensors monitor the state. The connection tool and/or another component of the robotic connection system can include passive or active compliance elements that accommodate moderate misalignment between the engaged gladhand and the robotic arm/connection tool. Once clamped on, the end effector releases from the connection tool and returns to a stowed, non-interfering location on the truck chassis. The connection tool is again engaged and removed from the trailer gladhand when unhitching of the trailer occurs.

In an illustrative embodiment a system and method for interconnecting a brake line on an AV truck with a gladhand mounted on a front of a trailer hitched thereto is provided. A robotic arm, having an end effector, is guided by a controller, from a stowage location to the gladhand. The end effector can removably carry a connection tool with a connection member, which is adapted to carry pressurized air from a braking circuit of the AV truck to a braking circuit of the trailer. A gladhand capture assembly on the connection tool can selectively engage a portion of the gladhand. A hinge assembly can allow movement of the gladhand capture assembly relative to a base of the connection tool between an unlocked configuration and a locked configuration. Illustratively, the movement of the gladhand capture assembly from the unlocked to the locked configuration is adapted to expose a retractable gladhand to enable engagement of the connection member with a seal of the gladhand. The system and method can further provide at least one of (a) a sensor that detects each of the unlocked configuration and the locked configuration and transmits information thereon to the controller, and (b) a motion measurement sensor that determines an angle or position of the gladhand capture assembly. The gladhand capture assembly can include latching fingers adapted to engage the portion, responsive to an actuator controlled by the controller. The latching fingers can be linked to the actuator via links and slots that allow the fingers to engage the portion at differing elevations relative thereto. The latching fingers can be arranged to move downwardly and inwardly into contact with the portion. The portion is a wedge and the movement inwardly is in directions approximately normal to confronting side edges of the wedge. The latching fingers can each include gripping formations (e.g. ramp-like shapes). The hinge assembly can include at least one of (a) a bistable spring arrangement, and (b) an active hinge assembly, that biases the gladhand capture assembly into each of the unlocked configuration and the locked configuration. The stowage location can include a stowage stand that receives the connection tool in a predetermined orientation. The stowage stand can further include a biasing assembly that moves the gladhand capture assembly into the desired configuration as the robotic arm directs the connecting tool into the predetermined orientation. Illustratively, the biasing assembly can comprise a rib that the latching fingers straddle in the predetermined orientation. Magnets can be adapted to magnetically engage the latching fingers when the latching fingers are moved outwardly into a non-engaged configuration with respect to a wedge, whereby upon withdrawal of the connection tool from the stowage stand, the gladhand capture assembly is moved to the unlocked position. The stowage stand can include a frame having alignment pins, and the connection tool can include a plate that selectively engages the frame with the holes passing over respective of the alignment pins. The gladhand capture assembly can include a contact sensor or proximity sensor that transmits information to the controller when the gladhand is engaged. The contact sensor or proximity sensor can comprise at least one of a rocker assembly and a switch, a LIDAR, a camera assembly, and a Hall effect sensor. The gladhand capture assembly can include a magnet assembly to assist engagement with the portion. Illustratively, at least one of the connection tool and the robot arm includes a compliance structure that enables a predetermined degree of motion between the gladhand and the connection member when engaging the gladhand. The compliance structure can be passive, and can be located between the base of the connection tool and the gladhand capture assembly. It can further define a plurality of compliance elements arranged between a pair of mounts on each of respective subassemblies of the gladhand capture assembly. The compliance elements can comprise semi-rigid, elastomeric elements. The compliance structure can further include a lockout mechanism that limits compliance motion at predetermined times. In various embodiments, the gladhand can comprise a fixed gladhand or a retractable gladhand. Illustratively, the connection tool can include a kickstand structure that is selectively positioned to engage a side wall of the trailer adjacent to the retractable glad hand so as to maintain the glad hand in an outwardly pivoted position. In various embodiments, the controller can be arranged to confirm a status of a connection between the connection tool and the gladhand after the connection member engages the gladhand seal. The controller can be adapted to receive information from at least one of (a) the robotic arm performing a tug test of the connection tool, (b) a pressure sensor in line with the braking circuit (c) a pressure switch in line with the braking circuit, and (d) a flow sensor in line with the braking circuit. The connection tool can further be adapted to engage a predetermined first type of gladhand geometry, and/or at the at least a second connection tool can be provided, which is adapted to be removably carried from a second stowage location, with a second connection member adapted to carry pressurized air through a second type of gladhand geometry. A rotation device can be provided that allows rotation of the connection tool with respect to the robotic arm. The rotation device can be constructed and arranged to selectively change between an unlocked state, a rotating state and a rotationally locked state. The rotation device can be located on the connection tool and can include a receiving structure that removably attaches to the end effector. The receiving structure mounted on a base. An actuator can movably interact with the receiving structure to selectively define the unlocked state, the rotating state and the rotationally locked state. The receiving structure can include a bottom surface arranged to selectively engage rollers, operatively connected to the actuator, which are moved into and out of an interfering engagement with portions of the bottom surface based upon axial movement of the actuator with respect to the receiving structure. In various embodiments, pressurized air is provided by a source on the braking circuit of a truck. The connection member can include a connection member seal defining a central orifice and a modified oval perimeter which, when engaged with a seal of the glad hand, allows for maintenance of a pressure connection in the presence of misalignment between the connection member seal and the glad hand seal. Illustratively, the stowage location can include a stowage stand that receives the connection tool in a predetermined stowed orientation. The tool can be oriented into the stowed orientation by at least one of the robotic arm interacting with a structure of the stowage stand and an actuator assembly on the connection tool.

In an illustrative embodiment, a system and method for interconnecting a brake line on an AV truck with a gladhand mounted on a front of a trailer hitched is provides, and can include a connection tool adapted to be removably connected to and guided by a robotic arm by a controller. The connection tool can have a connection member adapted to carry pressurized air from a braking circuit of the AV truck to a braking circuit of the trailer. A gladhand capture assembly on the connection tool can selectively engage a portion of the gladhand, in which the connection tool can be movable between a plurality of configurations based upon a type of gladhand being engaged. A stowage stand having a frame can allow the connection tool to be stored in, and removed therefrom, by the robotic arm. The frame can be constructed and arranged to cause each of the plurality of configurations to be defined by the connection tool. Illustratively, the frame can include a structure that allows the connection tool to move between an unlocked and a locked configuration based upon movement of the robotic arm.

In an illustrative embodiment, a system and method for interconnecting a brake line on an AV truck with a gladhand mounted on a front of a trailer hitched thereto is provided, and includes a robotic arm, having an end effector, that is guided by a controller, from a stowage location to the gladhand. The end effector can removably carry a connection tool with a connection member adapted to carry pressurized air from a braking circuit of the AV truck to a braking circuit of the trailer. A gladhand capture assembly on the connection tool selectively engages a portion of the gladhand. A compliance structure can be located on at least one of the connection tool and the robot arm that enables a predetermined degree of motion between the gladhand and the connection member when engaging the gladhand. The compliance structure can be passive and can be located between the base of the connection tool and the gladhand capture assembly and includes a plurality of compliance elements arranged between a pair of mounts on each of respective subassemblies of the gladhand capture assembly. The compliance elements can comprise semi-rigid, elastomeric elements. The compliance structure includes a lockout mechanism that limits compliance motion at predetermined times.

In an illustrative embodiment, a system and method for interconnecting a brake line on an AV truck with a gladhand mounted on a front of a trailer hitched thereto is provided, and can include a robotic arm, having an end effector, that is guided by a controller, from a stowage location to the gladhand. The end effector can removably carry a connection tool with a connection member adapted to carry pressurized air from a braking circuit of the AV truck to a braking circuit of the trailer. A gladhand capture assembly on the connection tool selectively engages a portion of the gladhand. A hinge assembly can be provides, which includes an active drive element that allows movement of the gladhand capture assembly relative to a base of the connection tool between at least two configurations to engage or retrieve each of a plurality of differing types of gladhands.

In an illustrative embodiment, a system and method for interconnecting a brake line on an AV truck with a gladhand mounted on a front of a trailer hitched thereto is provided, and includes a robotic arm, having an end effector, which is guided by a controller, from a stowage location to the gladhand. The end effector can removably carry a connection tool with a connection member adapted to carry pressurized air from a braking circuit of the AV truck to a braking circuit of the trailer. A rotation device that allows rotation of the connection tool with respect to the robotic arm, the rotation device constructed and arranged to selectively change between an unlocked, rotating state and a rotationally locked state. The rotation device can be located on the connection tool and can include a receiving structure that removably attaches to the end effector, the receiving structure mounted on a base, and further comprising an actuator that movably interacts with the receiving structure to selectively define the unlocked, rotating state and the rotationally locked state. Illustratively, the receiving structure can include a bottom surface arranged to selectively engage rollers, operatively connected to the actuator, which can be moved into and out of an interfering engagement with portions of the bottom surface based upon axial movement of the actuator with respect to the receiving structure.

BRIEF DESCRIPTION OF THE DRAWINGS

The invention description below refers to the accompanying drawings, of which.

DETAILED DESCRIPTION

I. Overview

Figure 1:
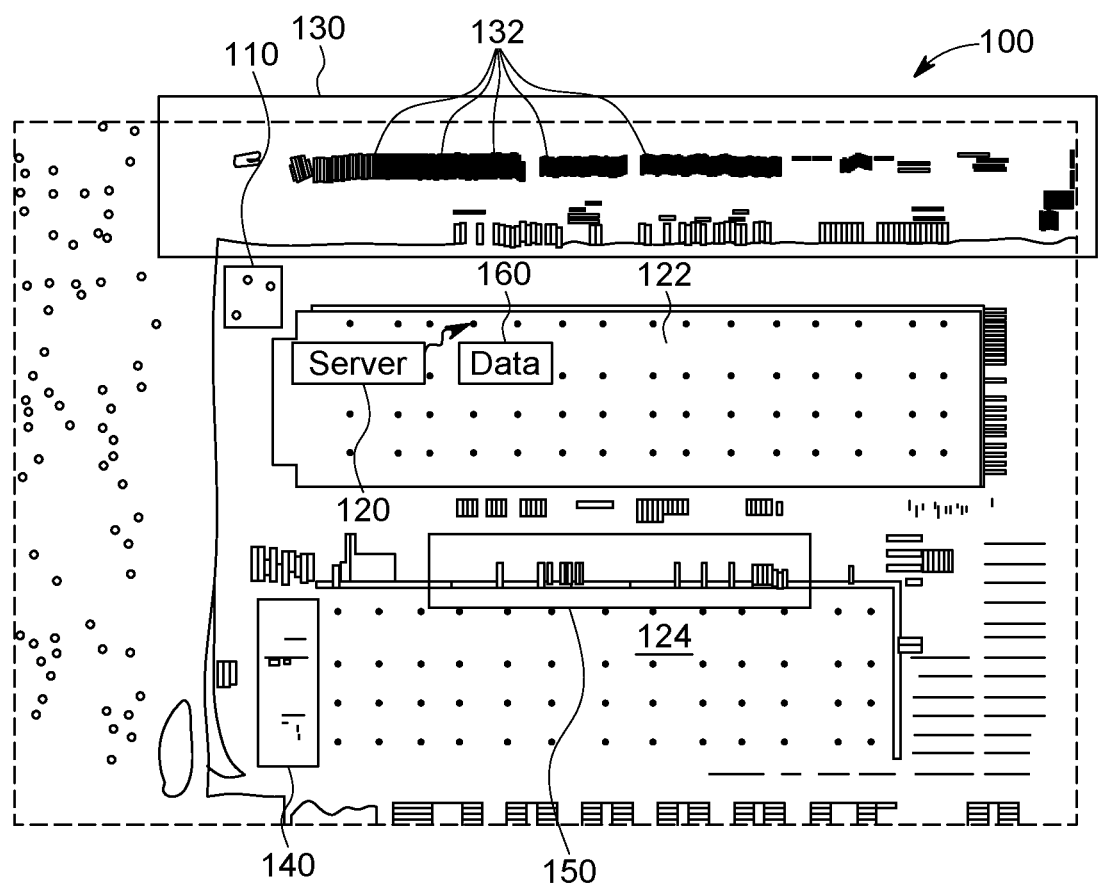
FIG. 1 is a diagram showing an aerial view of an exemplary shipping facility with locations for storing, loading and unloading trailers used in conjunction with the AV yard truck arrangements provided according to a system and method for handling trailers within a yard.

FIG. 1 shows an aerial view of an exemplary shipping facility 100, in which over-the-road (OTR) trucks (tractor trailers) deliver goods-laden trailers from remote locations and retrieve trailers for return to such locations (or elsewhere—such as a storage depot). In a standard operational procedure, the OTR transporter arrives with a trailer at a destination's guard shack (or similar facility entrance checkpoint) 110. The guard/attendant enters the trailer information (trailer number or QR (ID) code scan-imbedded information already in the system, which would typically include: trailer make/model/year/service connection location, etc.) into the facility software system, which is part of a server or other computing system 120, located offsite, or fully or partially within the facility building complex 122 and 124. The complex 122, 124 includes perimeter loading docks (located on one or more sides of the building), associated (typically elevated) cargo portals and doors, and floor storage, all arranged in a manner familiar to those of skill in shipping, logistics, and the like.

By way of a simplified operational example, after arrival of the OTR truck, the guard/attendant would then direct the driver to deliver the trailer to a specific numbered parking space in a designated staging area 130—shown herein as containing a large array of parked, side-by-side trailers 132, arranged as appropriate for the facility's overall layout. The trailer's data and parked status is generally updated in the company's integrated yard management system (YMS), which can reside on the server 120 or elsewhere.

Once the driver has dropped the trailer in the designated parking space of the staging area 130, he/she disconnects the service lines and ensures that connectors are in an accessible position (i.e. if adjustable/sealable). If the trailer is equipped with swing doors, this can also provide an opportunity for the driver to unlatch and clip trailer doors in the open position, if directed by yard personnel to do so.

At some later time, the (i.e. loaded) trailer in the staging area 130 is hitched to a yard truck/tractor, which, in the present application is arranged as an autonomous vehicle (AV). Thus, when the trailer is designated to be unloaded, the AV yard truck is dispatched to its marked parking space in order to retrieve the trailer. As the yard truck backs down to the trailer, it uses one or multiple mounted (e.g. a standard or custom, 2D grayscale or color-pixel, image sensor-based) cameras (and/or other associated (typically 3D/range-determining) sensors, such as GPS receiver(s), radar, LiDAR, stereo vision, time-of-flight cameras, ultrasonic/laser range finders, etc.) to assist in: (i) confirming the identity of the trailer through reading the trailer number or scanning a QR, bar, or other type of coded identifier; (ii) Aligning the truck's connectors with the corresponding trailer receptacles. Such connectors include, but are not limited to, the cab fifth ($5^{th}$) wheel-to-trailer kingpin, pneumatic lines, and electrical leads. Optionally, during the pull-up and initial alignment period of the AV yard truck to the trailer, the cameras mounted on the yard truck can also be used to perform a trailer inspection, such as checking for damage, confirming tire inflation levels, and verifying other safety criteria.

The hitched trailer is hauled by the AV yard truck to an unloading area 140 of the facility 100. It is backed into a loading bay in this area, and the opened rear is brought into close proximity with the portal and cargo doors of the facility. Manual and automated techniques are then employed to offload the cargo from the trailer for placement within the facility 100. During unloading, the AV yard truck can remain hitched to the trailer or can be unhitched so the yard truck is available to perform other tasks. After unloading, the AV yard truck eventually removes the trailer from the unloading area 140 and either returns it to the staging area 130 or delivers it to a loading area 150 in the facility 100. The trailer, with rear swing (or other type of door(s)) open, is backed into a loading bay and loaded with goods from the facility 100 using manual and/or automated techniques. The AV yard truck can again hitch to, and haul, the loaded trailer back to the staging area 130 from the loading area 150 for eventual pickup by an OTR truck. Appropriate data tracking and management is undertaken at each step in the process using sensors (described below) on the AV yard truck and/or other manual or automated data collection devices—for example, terrestrial and/or aerial camera drones.

Figure 2:
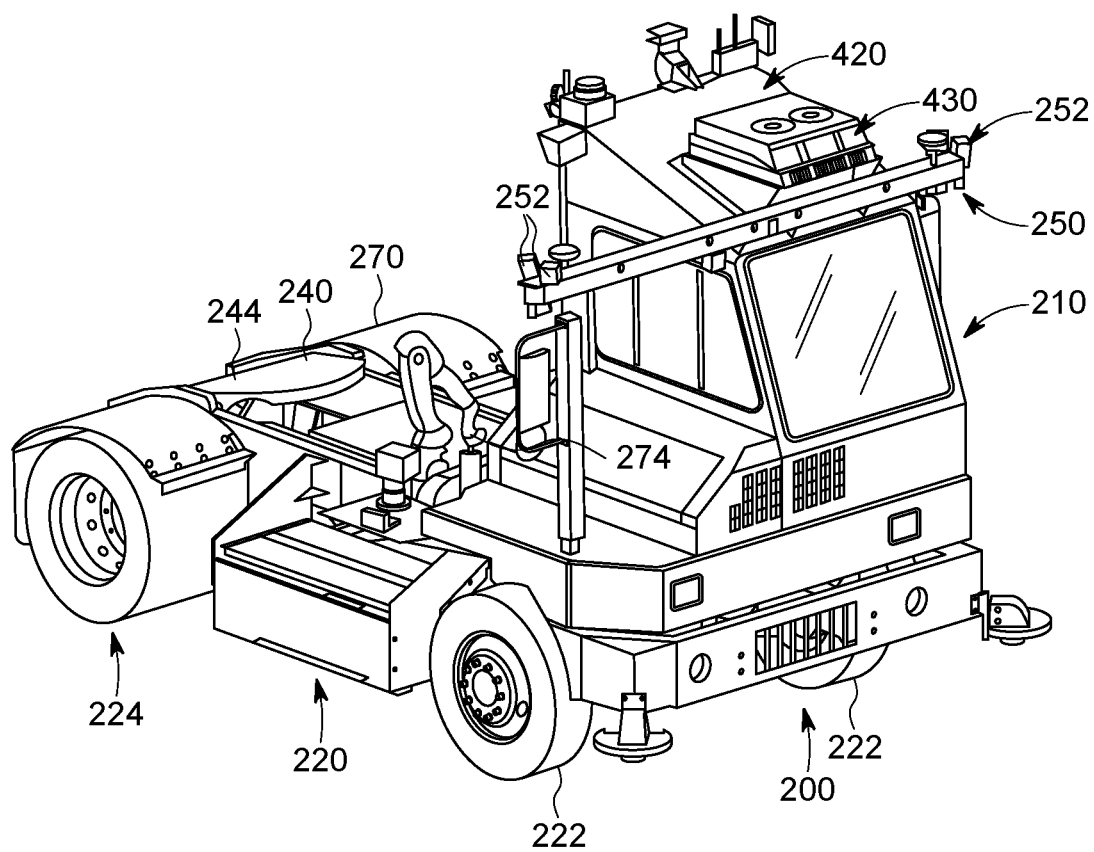
FIG. 2 is a front-oriented perspective view of an exemplary AV yard truck for use in association with the system and method herein.
Figure 3:
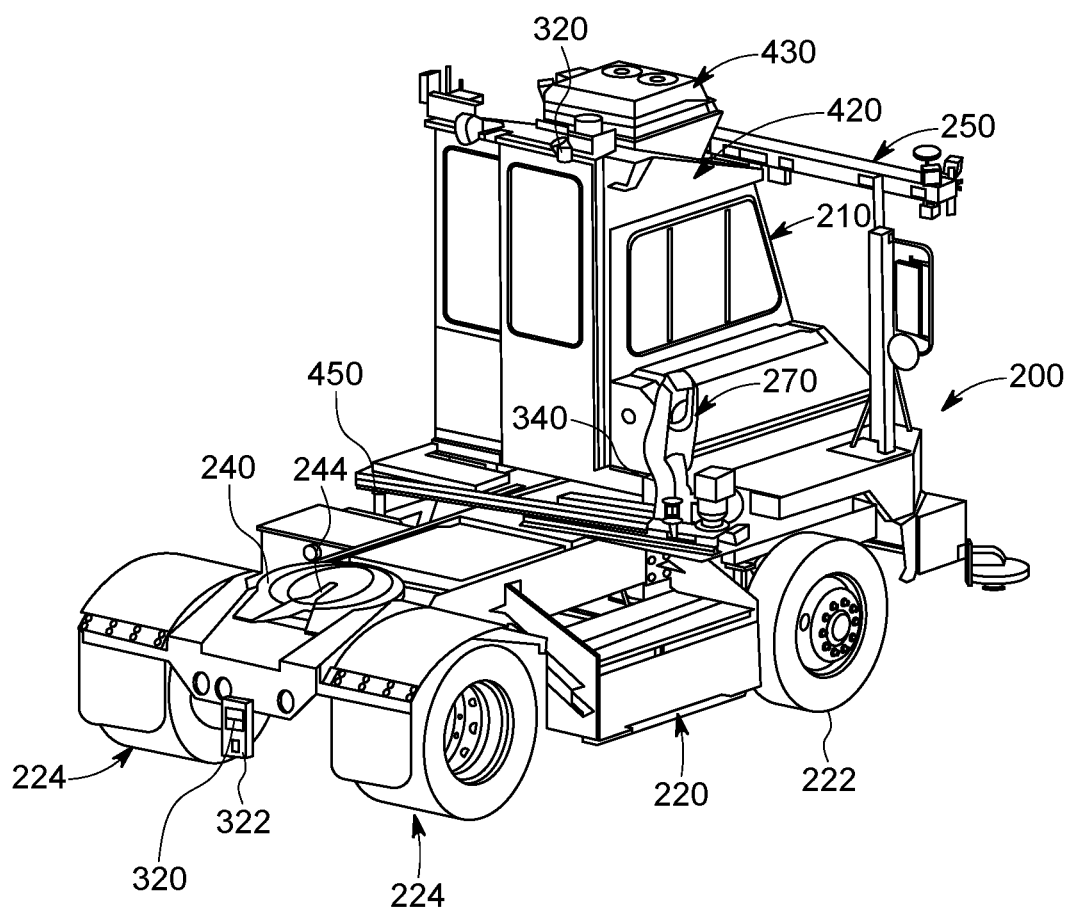
FIG. 3 is a rear-oriented perspective view of the AV yard truck of FIG. 2.
Figure 4:
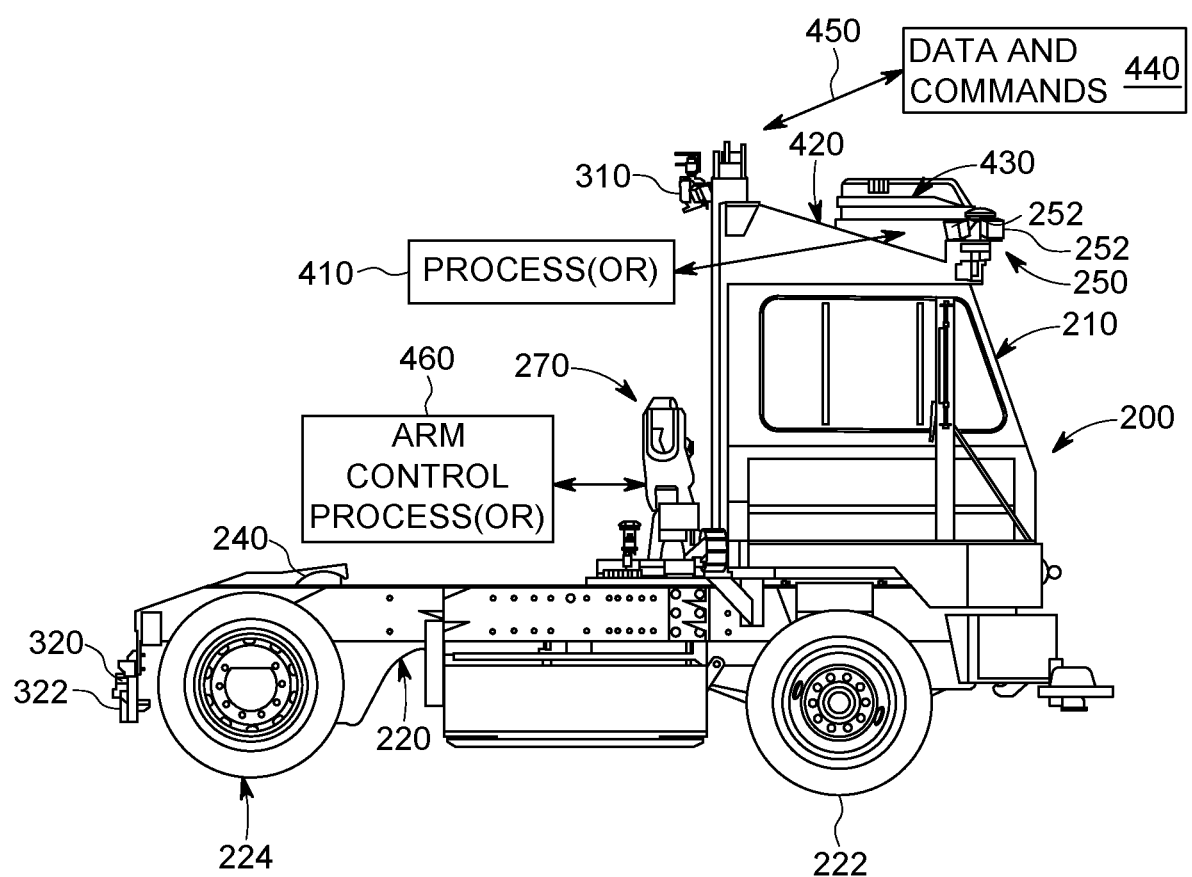
FIG. 4 is a side view of the AV yard truck of FIG. 2.

Having described a generalized technique for handling trailers within a facility reference is now made to FIGS. 2-4, which show an exemplary AV yard truck 200 for use herein. The yard truck 200 is powered by diesel or another internal combustion fuel, or (more typically) electricity, using appropriate rechargeable battery assembly that can operate in a manner known to those of skill. For the purposes of this description, the AV yard truck is powered by rechargeable batteries, but it is contemplated that any other motive power source (or a combination thereof) can be used to provide mobility to the unit. Notably, the yard truck 200 includes at least a driver's cab section 210 (which can be omitted in a fully autonomous version) and steering wheel (along with other manual controls) and a chassis 220 containing front steerable wheels 222, and at least one pair of rear, driven wheels 224 (shown herein as a double-wheel arrangement for greater load-bearing capacity). The respective chassis 220 also includes a so-called fifth ($5^{th}$) wheel 240 that is arranged as a horseshoe-shaped pad with a rear-facing slot 244, which is sized and arranged to receive the kingpin hitch located at the bottom front (510 in FIG. 5) of a standard trailer 500. The fifth wheel 240 shown tilted downwardly in a rearward direction so as to facilitate a ramping action when the AV truck is backed onto the trailer. Various fifth wheel-lifting mechanisms can be provided, which employ appropriate hydraulic lifting actuators/mechanisms known to those of skill so that the hitched trailer is raised at its front end. In this raised orientation, the hitch between the truck and trailer is secured.

The AV yard truck can include a variety of custom or commercially available remote sensors and/or autonomous driving sensing arrangements (e.g., those available from vendors, such as Velodyne Lidar, Inc. of San Jose, CA), including, but not limited to GPS, LiDAR, radar, image-based (e.g. machine vision), inertial guidance, and ultrasonic that allow it to navigate through the yard and hitch-to/unhitch-from a trailer in an autonomous manner that is substantially or completely free of human intervention. Such lack of human intervention can be with the exception, possibly, of issuing an order to retrieve or unload a trailer—although such can also be provided by the YMS via the server 120 using a wireless data transmission 160 (FIG. 1) to and from the truck (which also includes an appropriate wireless network transceiver—e.g. WiFi-based, etc.). One example of sensor placement is shown and described in U.S. patent application Ser. No. 17/511,087, entitled PROCESSOR AND SENSOR ARRAY FOR AUTONOMOUS TRUCK, filed Oct. 26, 2021, the teachings of which are incorporated by reference as useful background information. The exemplary AV yard truck 200 includes a novel top-mounted bar 250 that carries various sensors (e.g. visual imaging sensors and LiDAR) in a manner that affords a desirable line of sight. For example visual sensors 252 are provided on ends of the bar 250 and a rear visual sensor 310 (FIG. 3) is provided at the top of the cab, and is used as part of the trailer connection system as described below. A rear bumper visual sensor 320 and LiDAR sensor are also depicted to aid in backup and hitching operations. Other sensors as described in the above-incorporated U.S. patent application Ser. No. 17/511,087 are also provided around the truck chassis 220 and cab 210. The processing components 410 (also termed "processor") for various sensing telemetry can be housed in the cab roof cap 420, which is wedge-shaped in this embodiment. It can include a cooling (e.g. fan) unit 430 and appropriate heat sinks to remove excess heat generated by data processing, storage and transceiver components. As also shown the processor(s) 410 receive and transmit data and commands 440 via an RF link 450 as described above.

Notably, the AV yard truck 200, includes an emergency brake pneumatic hose (typically red) 340 (shown in phantom in FIG. 3), service brake pneumatic hose (typically blue, not shown) and an electrical line (often black, not shown), that extend from the rear of the cab 210. This allows arrangement for access by yard personnel when connecting and disconnecting the hoses/lines from a trailer during the maneuvers described above.

In operation, control of the truck 200 can be implemented in a self-contained manner, entirely within the processor 410 which receives mission plans and decides on appropriate maneuvers (e.g. start, stop, turn accelerate, brake, move forward, reverse, etc.). Alternatively, control decisions/functions can be distributed between the processor 410 and a remote-control computer—e.g. the server 120, that computes control operations for the truck and transmits them back as data to be operated upon by the truck's local control system. In general, control of the truck's operation, based on a desired outcome, can be distributed appropriately between the local processor 410 and the facility system server 120.

II. Pneumatic Line Connection Between Yard Truck and Trailer

The AV truck chassis 220, rearward of the cab 210, includes an area that resides in front of the fifth wheel 240 that supports a multi-axis robotic manipulator arm assembly 270 that move in three dimensions (e.g., 7 degrees of freedom (DOF)) in a programmed path according to conventional robotic behavior. The arm assembly 270 is mounted on a track 450 that enables powered, lateral motion across the width of the chassis 220. The arm assembly 270 can be based upon a conventional robot, such as the GP7, available from Yaskawa America, Inc. of Waukegan, Il. The end of the arm assembly can include a customized end effector assembly with an associated tool-changing mechanism that is arranged to selectively pick up gladhand engaging tools 520 in FIG. 5) on the trailer front 530, and attach a corresponding gladhand (i.e. and adapterless implementation), or structure with a native gladhand-engaging adapter on the end of the hose 340, so as to complete an emergency brake pneumatic circuit between the AV yard truck 200 and the trailer 500. Other connections can be made by the robotic arm, e.g. between the service brake lines and/or the electrical connections using appropriate motion control and adapters. More generally, the attachment of AV truck pneumatic lines to various types of native gladhands is shown and described in above-incorporated commonly-assigned, U.S. patent application Ser. No. 17/009,620, now U.S. Published Application No. US-2021-0053407-A1. It should be clear that the end effector 274 can define a variety of shapes and functions, depending upon the nature of the task and type of adapter used to connect the AV truck pneumatic line to the native gladhand on the trailer front. Likewise, the number of axes and motion capability of the arm 270 is highly variable, depending upon the nature of the task and relative location of the robot versus the trailer gladhand. In general, the robot 270 is positioned on the chassis 220 in such a manner that it can be stowed without (free of) interfering with normal turning of the trailer on its kingpin when hitched to the AV yard truck 200. The tracking 450 can be angled rearwardly from one side to the other (as shown) to help facilitate forward stowage of the robot 270 when not in use (as shown). As described further below, the robot arm 270 moves under the control of a processor arrangement 460 they can be contained within the robot housing or (in whole or in part) provided as part of the overall processing arrangement 410. Note that any of the processing functions herein can be performed in the stand-alone fashion on the AV yard truck 200, or can be partially performed remotely by the server 120 for the yard.

III. Robotic Gladhand Capture and Connection Mechanisms

A. Gladhand and Connection Tool Gladhand/Wedge Capture Assembly

Figure 5:
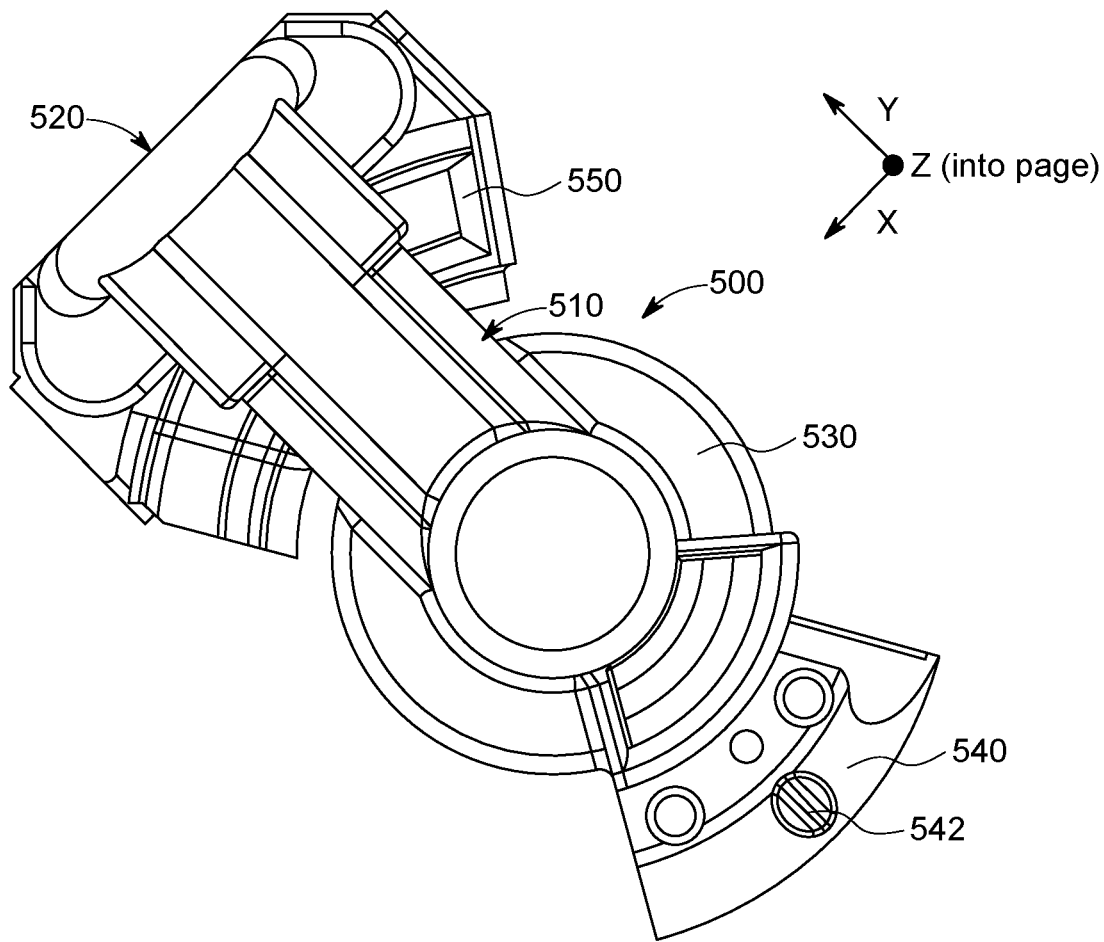
FIG. 5 is a top view of a typical, conventional (e.g. fixed) gladhand located on a trailer, that is subject to connection using the system and method herein.
Figure 6:
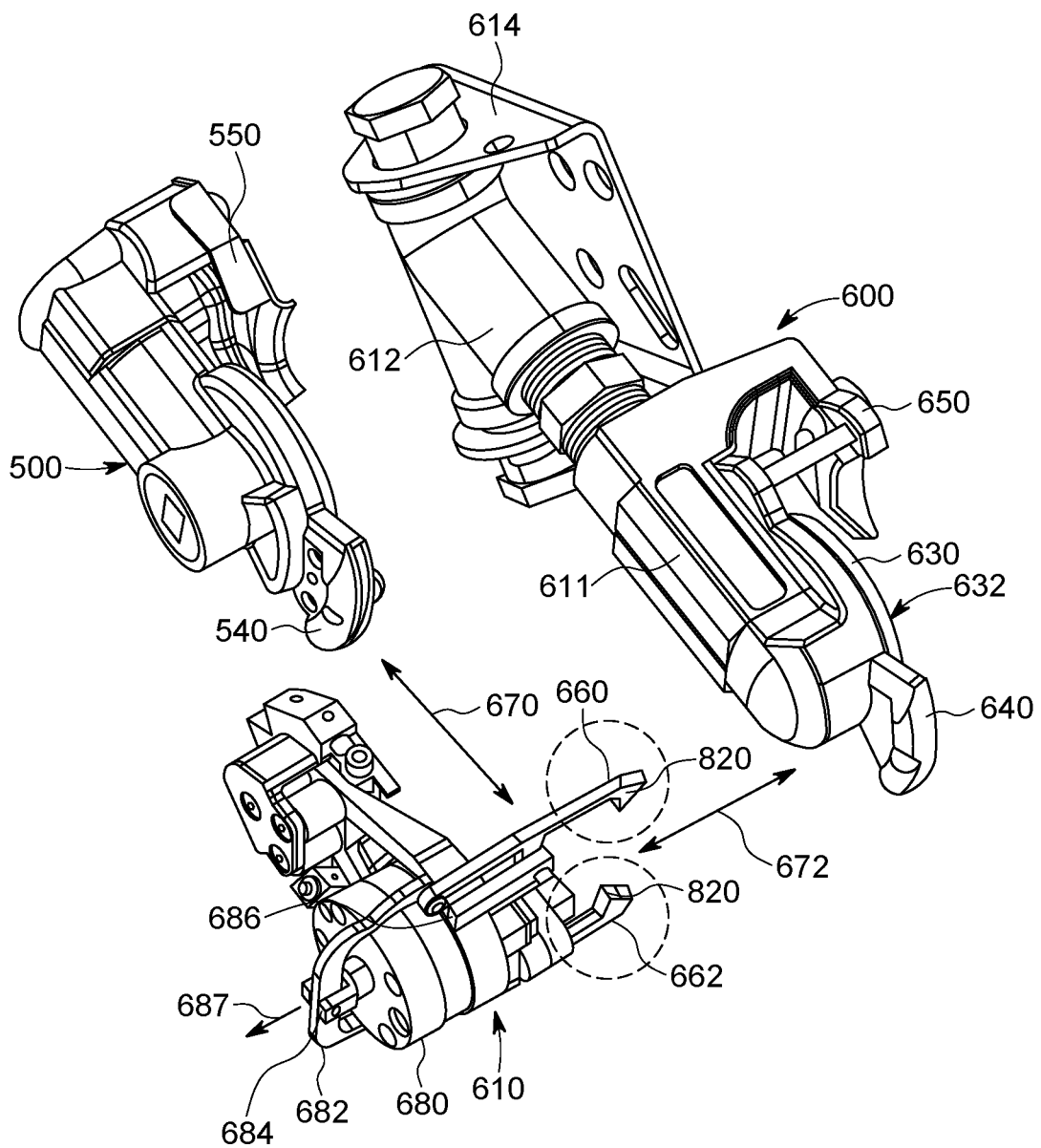
FIG. 6 is a perspective view of a of robot-arm-mounted/deployed connection tool for use in accommodating various angles of approach relative to each of a fixed gladhand (FIG. 5) and a spring-loaded (retractable) gladhand.
Figure 33:
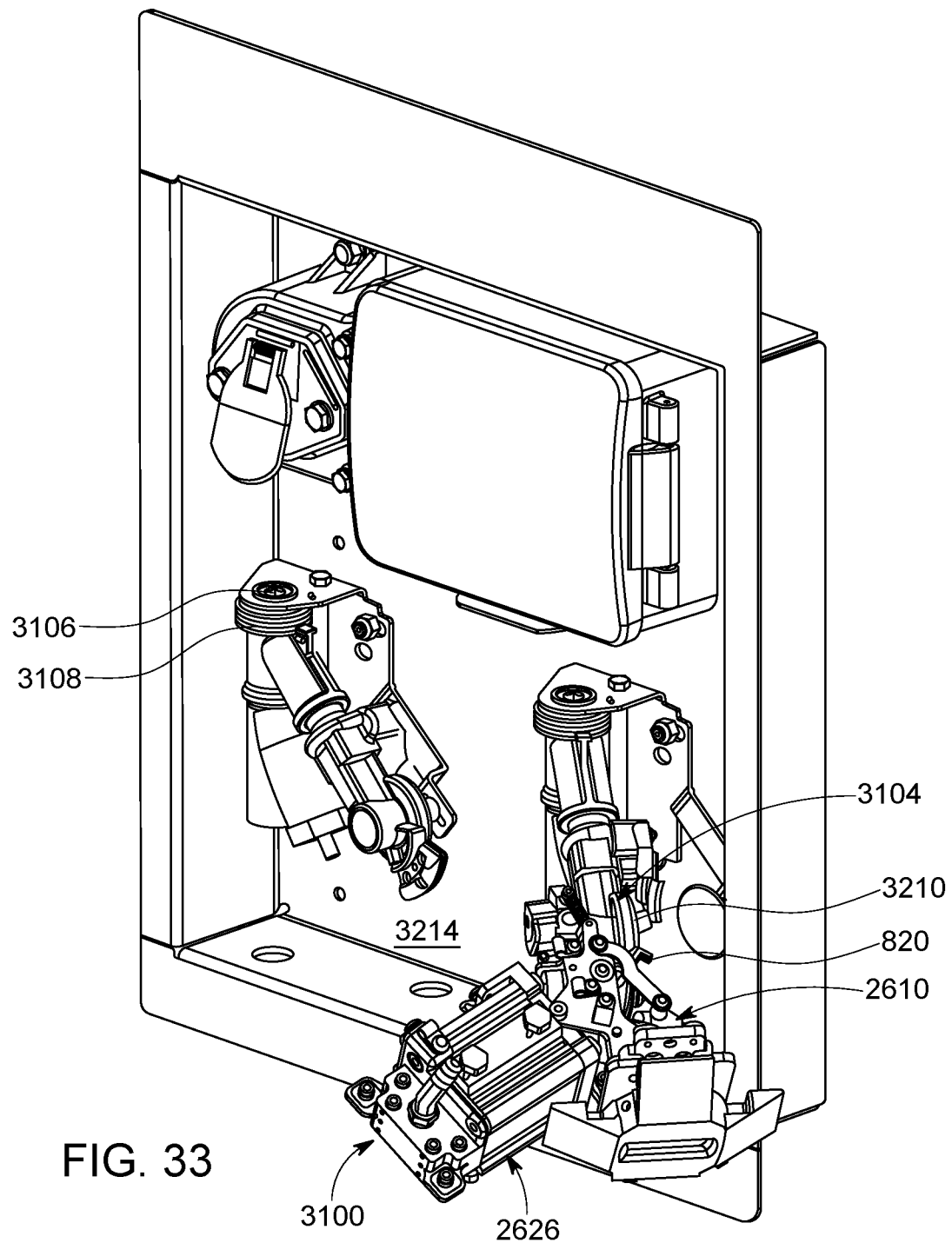
FIG. 33 is a further perspective view of the overall connection tool and active hinge in the locked state as shown in FIG. 32, and further depicting the overall glad hand box on a trailer front.

FIG. 5 shows a typical fixed gladhand 500 that resides on a trailer. As described below, and with reference to FIG. 33, the gladhand can be implemented as a swinging/hinged, retractable unit that is mounted on the surface of the trailer front, or in a recessed box thereon (as shown). Generally, the geometry of the gladhand 500 is characterized by a body 510 that includes a threaded base 520, for mounting to a pipe or hose, which interconnects with the trailer pneumatic system (e.g. emergency and/or service brake lines). The body includes an inner channel that opens at a seal base 530, having an annular seal on the underside thereof (not shown in FIG. 5). This seal normally engages a confronting seal on an opposing, manually attached "native" gladhand on the truck, which is substituted from the automated connection system operated by the robot arm 270 (as described further below, and generally in the above-incorporated U.S. patent application Ser. No. 17/009,620, now U.S. Published Patent Application No. US-2021-0053407-A1). In the case of a conventional, native gladhand attachment procedure, a rotational motion is used to slip another (not shown) gladhand's front wedge (540), beneath the other gladhand's rear flange 550 so that the spring force of the confronting seals on each glad hand secures the attached components together. A shallow detent (542) on the wedge (544) engages an associated protrusion (not shown) on the flange 550 to maintain the connection until it is overcome by a rotational force to detach the gladhands from each other. The various components of the native gladhand are used in the present embodiments, and in the above-incorporated Published U.S. Patent Application No. US-2021-0053407-A1, to facilitate an automated connection free of a need to manually attach an adapter (hence, an "adapterless" system and method) using a robot-applied connection tool. The robot and associated control system are adapted herein to operate on either a retractable, spring-loaded gladhand 600 or fixed gladhand as shown in FIG. 6, described further below. Particular adaptations that assist in facilitating attachment of a robot-mounted connection tool with the native gladhand are now described in further detail.

Figure 26:
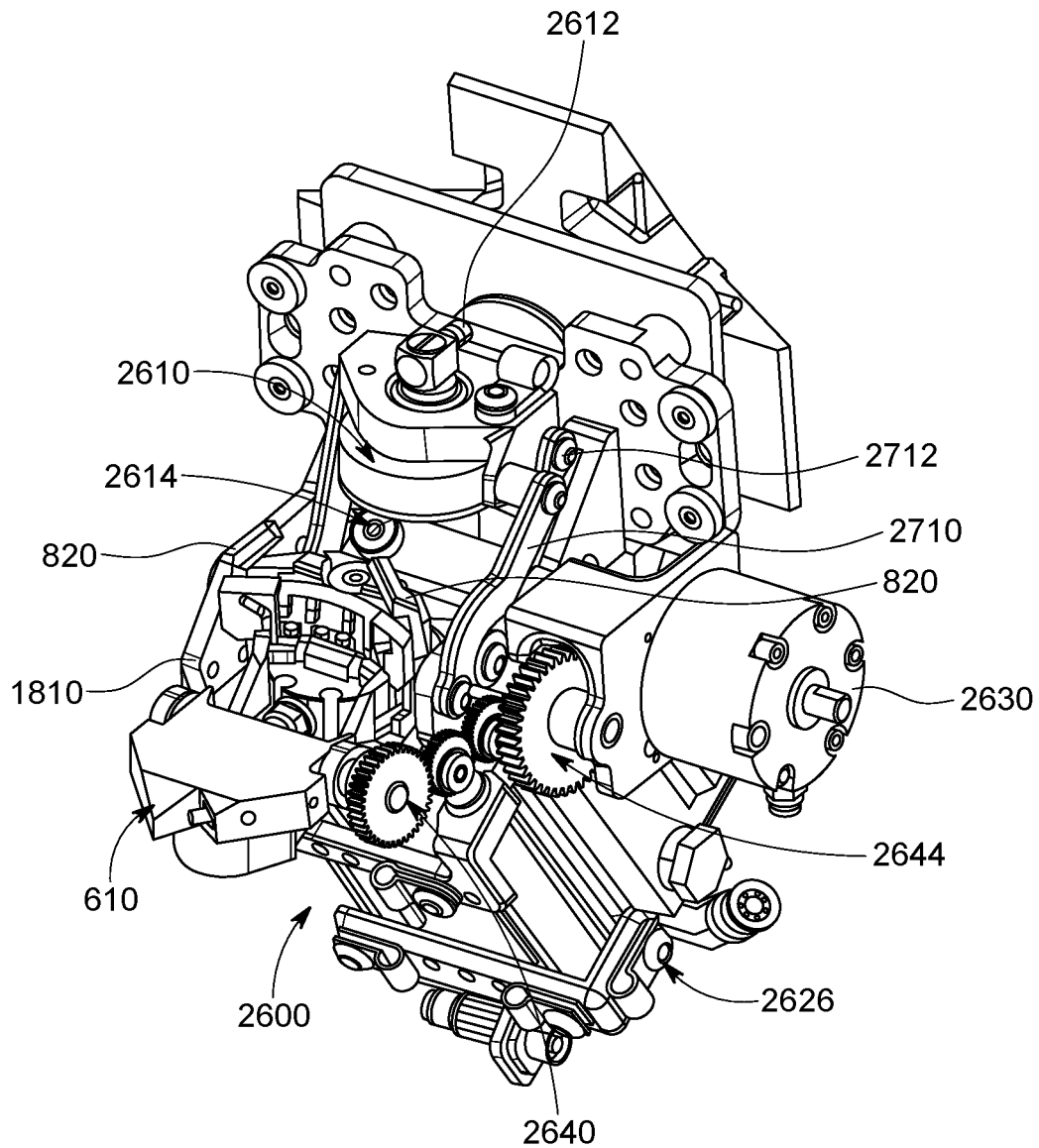
FIG. 26 is a side view of an active hinge for use with the connection tool of FIG. 6, which allows for full control of the gladhand capture assembly.

With further reference to FIG. 6, a gladhand capture assembly 610, which is part of the overall robot-arm-applied connection tool 2600 (See, for example, FIG. 26 below) is shown with respect to each of a fixed gladhand 500 and a spring-loaded, retractable gladhand 600. By way of non-limiting example, the gladhand capture assembly locates and engages the standard wedge located on a typical gladhand. It is expressly contemplated that the capture assembly of the connection tool herein can locate and engage one or more other structure(s) on the gladhand. Thus, the term wedge capture assembly should be taken broadly to include such an arrangement, and the term "gladhand capture" assembly can be substituted therefor. Similar (in structure and function) to the fixed gladhand 500, the retractable gladhand 600 includes a body 611 mounted on a hinged pipe 612 and bracket 614 mounted on the trailer front and/or a box thereon. The retractable gladhand 600 includes a seal base 630 that houses an annular seal 532, and further includes a wedge 640 and flange 650 for engaging an opposing truck pneumatic system gladhand. As described below, and in the above-incorporated published U.S. Patent Application No. US-2021-0053407-A1, the robot arm is used to rotate the spring-loaded gladhand away from a trailer face to expose its sealing gland, it is also used to rotate the tool's pivoting mechanism to change the tool's state. This set of rotations (exposing the gladhand and rotating the tool's pivot) can be accomplished sequentially in either order or they can be accomplished at the same time. The robot arm moves the tool to position the gladhand capture assembly 610 so that it overlies the gladhand 500 or 600 with a pair of latching fingers 660 and 662 actuated to selectively grasp the wedge 540 or 640.

As shown in FIG. 6, the two double arrows 670 and 672 indicate the two typical (generally orthogonal) directions from which the connection tool and underlying capture assembly 610 can approach a gladhand 500 or 600. The latching fingers 660 and 662 are shaped and arranged to engage the wedge 540 or 640 in the two directions 670, 672. The latching fingers 660 and 662 are adapted to capture the wedge of the gladhand when commanded to actuate. The wedge presence sensor (described below) can be triggered based upon positive engagement of the fingers with the wedge, thereby signaling a complete connection and/or relatively close proximity to the wedge. The geometry of the fingers 660, 662 allows clearance over and away from different arrangements of the wedge depending on this approach direction, as shown in FIG. 6. Approach direction 672 is an orientation typically experienced when operating on many retractable types of gladhands (600). Conversely, approach direction 670 moves the capture assembly 610 clear past the wedge 540, and then it captures the gladhand wedge from the end such as would be experienced when operating on many fixed types of gladhands (500). Note that the gladhand engaging tool(s) described herein are exemplary of various mechanisms that can be adapted to inter-operate with specific types/form factors of gladhands. It should be clear to those of skill that appropriate modifications can be made to the gladhand-engaging adapters/tools described herein to be compatible with differing native gladhands. Such various tools can be stored in appropriate locations on the AV truck of provided by an operator as needed for a specific trailer. The camera system and pattern recognition system can include trained information that identifies specific gladhand types based upon certain differentiating features and selects the appropriate tool for the task.

Figure 7:
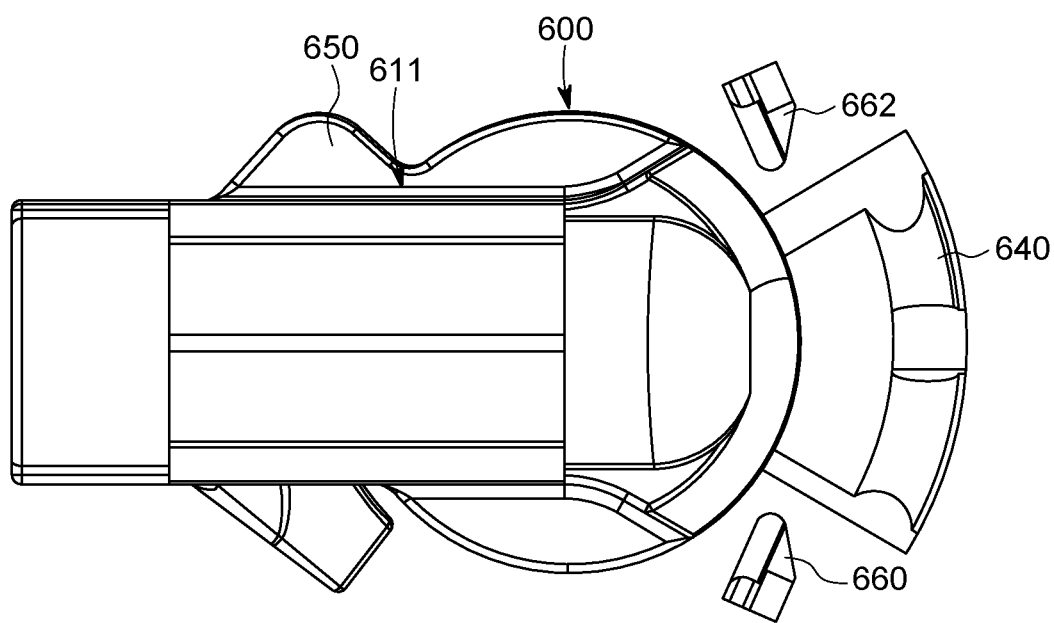
FIG. 7 is a fragmentary top view of the grippers for the connection tool operating on the spring-loaded gladhand, as shown in of FIG. 6.
Figure 8:
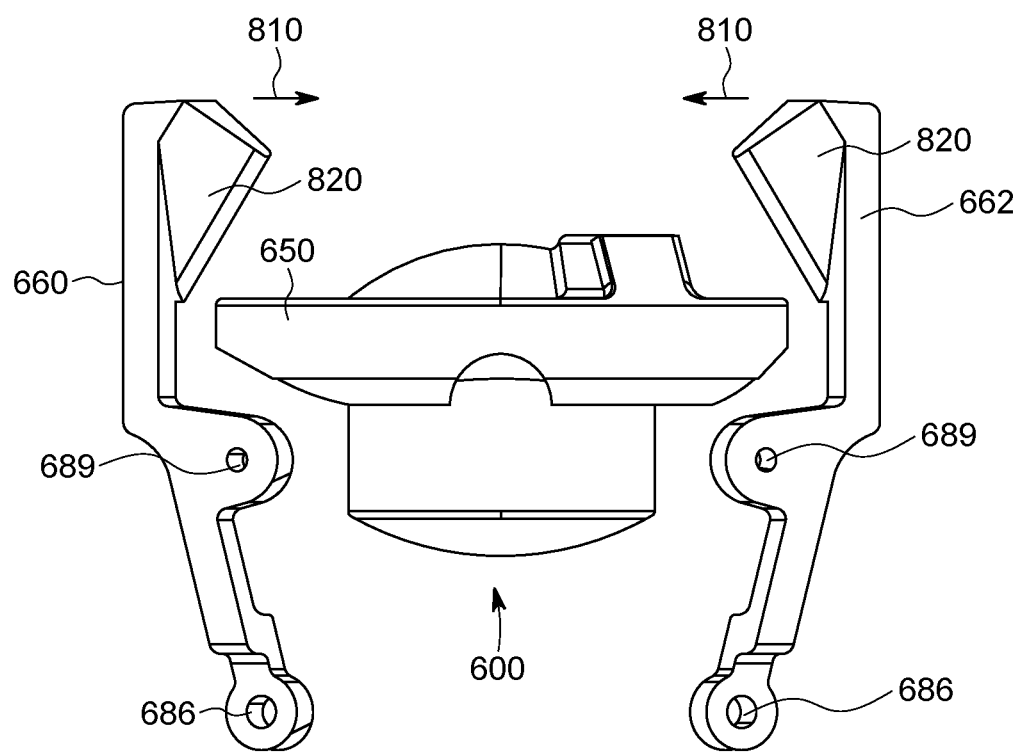
FIG. 8 is a fragmentary front view of the grippers for the connection tool operating on the spring-loaded gladhand as shown in FIG. 6.

With further reference to FIGS. 7 and 8, the latching fingers 660, 662 are actuated by a linear or rotary actuator (pneumatic, electromagnetic solenoid, etc.) 680, which carries a U-shaped link bar 682 on a pivoting clevis 684. The fingers 660, 662 include pivoting ends that, when withdrawn (arrow 687), cause the protruding gripping ramps 820 (FIG. 8) to move inwardly (arrows 810 in FIG. 8) as the fingers rotate about fulcrum points 689. The ramps 820 (also termed "gripping formations") can be constructed from a durable material (polymer, metal, etc.) that is long-wearing and relatively non-marring. The fingers can be oriented at angles that match that cause actuation to move (arrows 810) in a direction approximately normal to the sides of the gladhand wedge.

Figure 9:
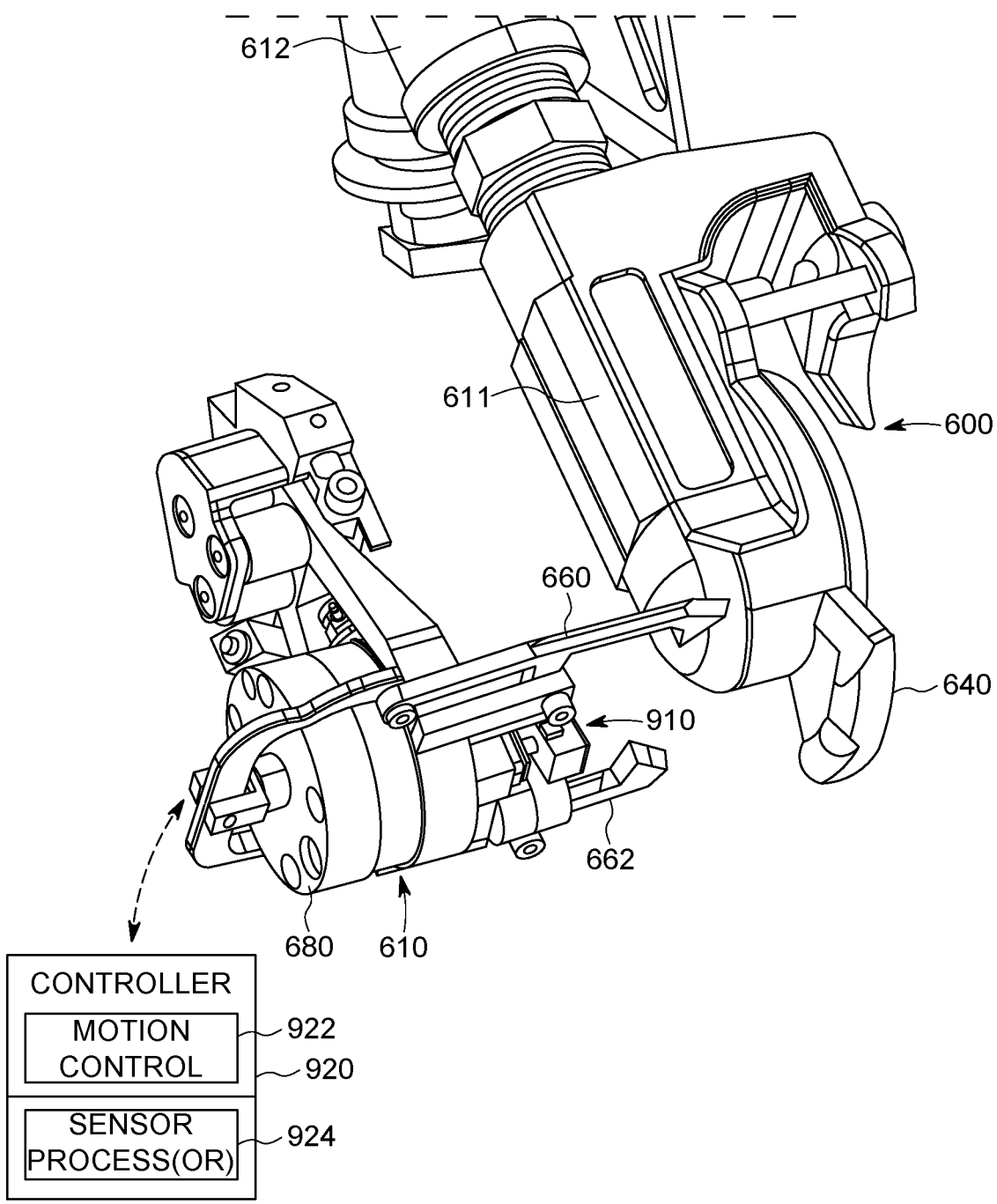
FIG. 9 is a perspective view of the connection tool of FIG. 6, including a presence sensor that interacts with the wedge of the exemplary spring-loaded gladhand, shown in a confronting relationship.
Figure 10:
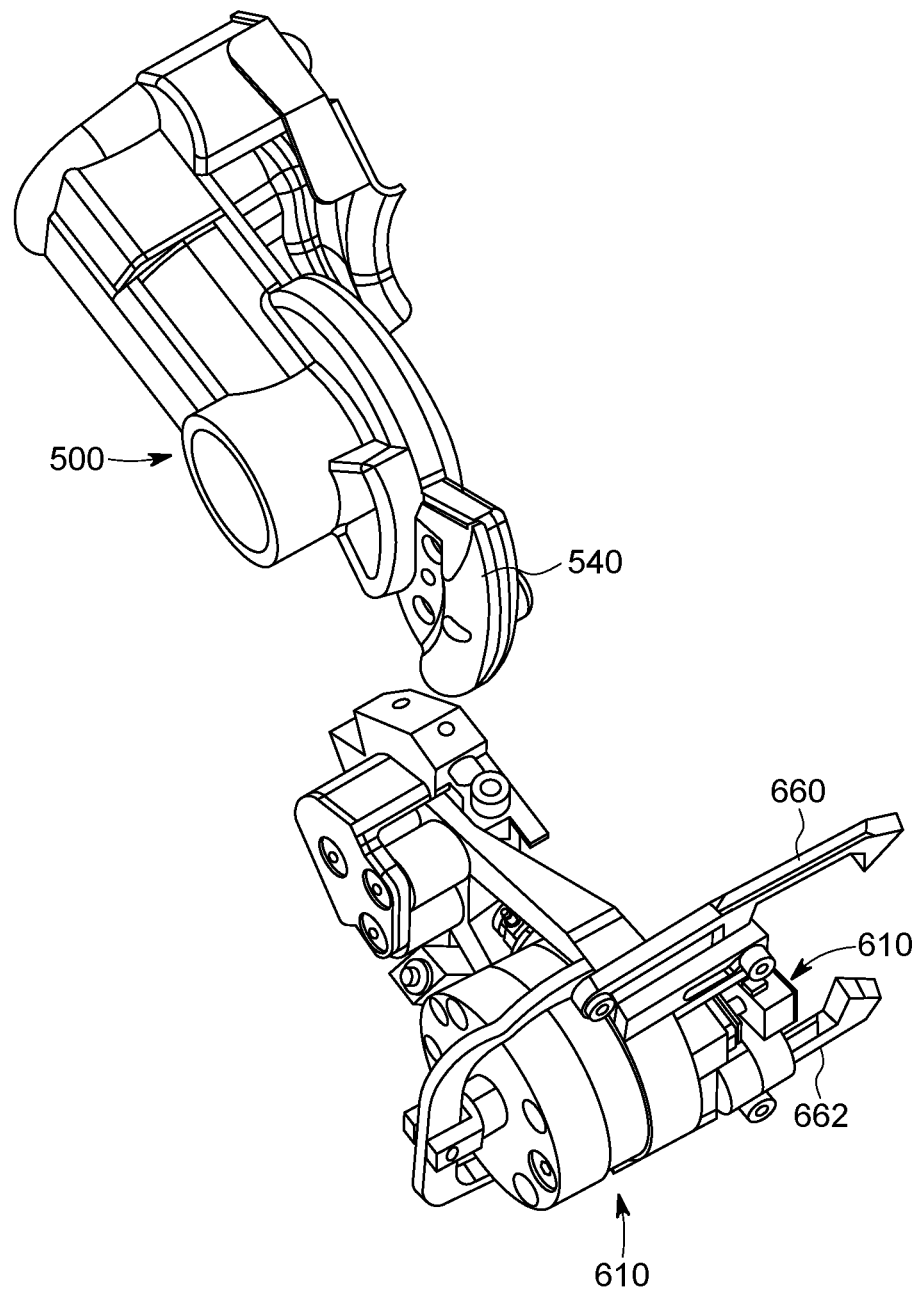
FIG. 10 is a perspective view of the connection tool and presence sensor of FIG. 9, interacting with the wedge of the exemplary fixed gladhand, as shown in FIG. 6.
Figure 11:
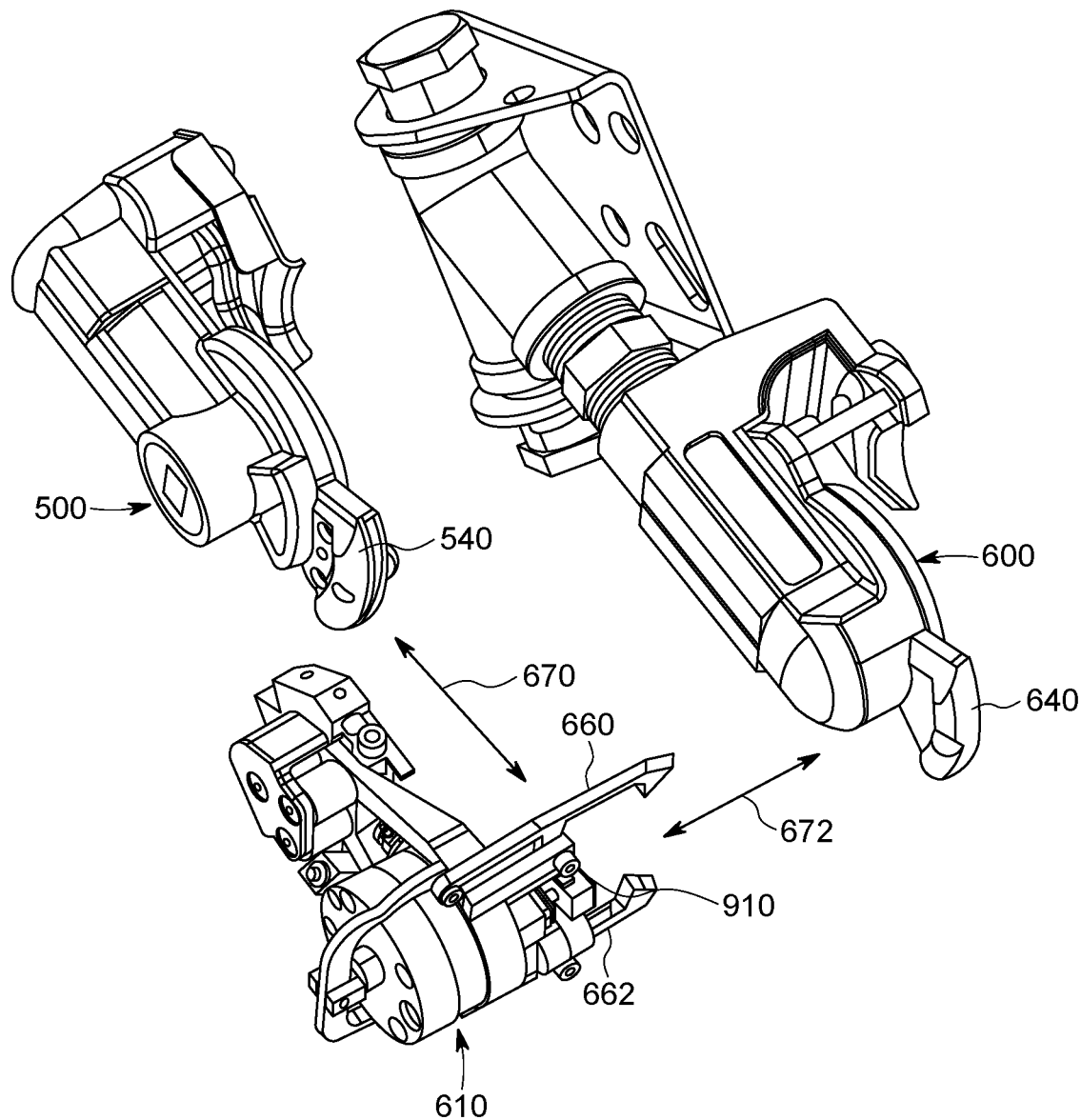
FIG. 11 is a perspective view of the relative motions for the connection tool and associated presence sensor of FIG. 9 to engage with each of a spring-loaded gladhand and fixed gladhand.
Figure 12:
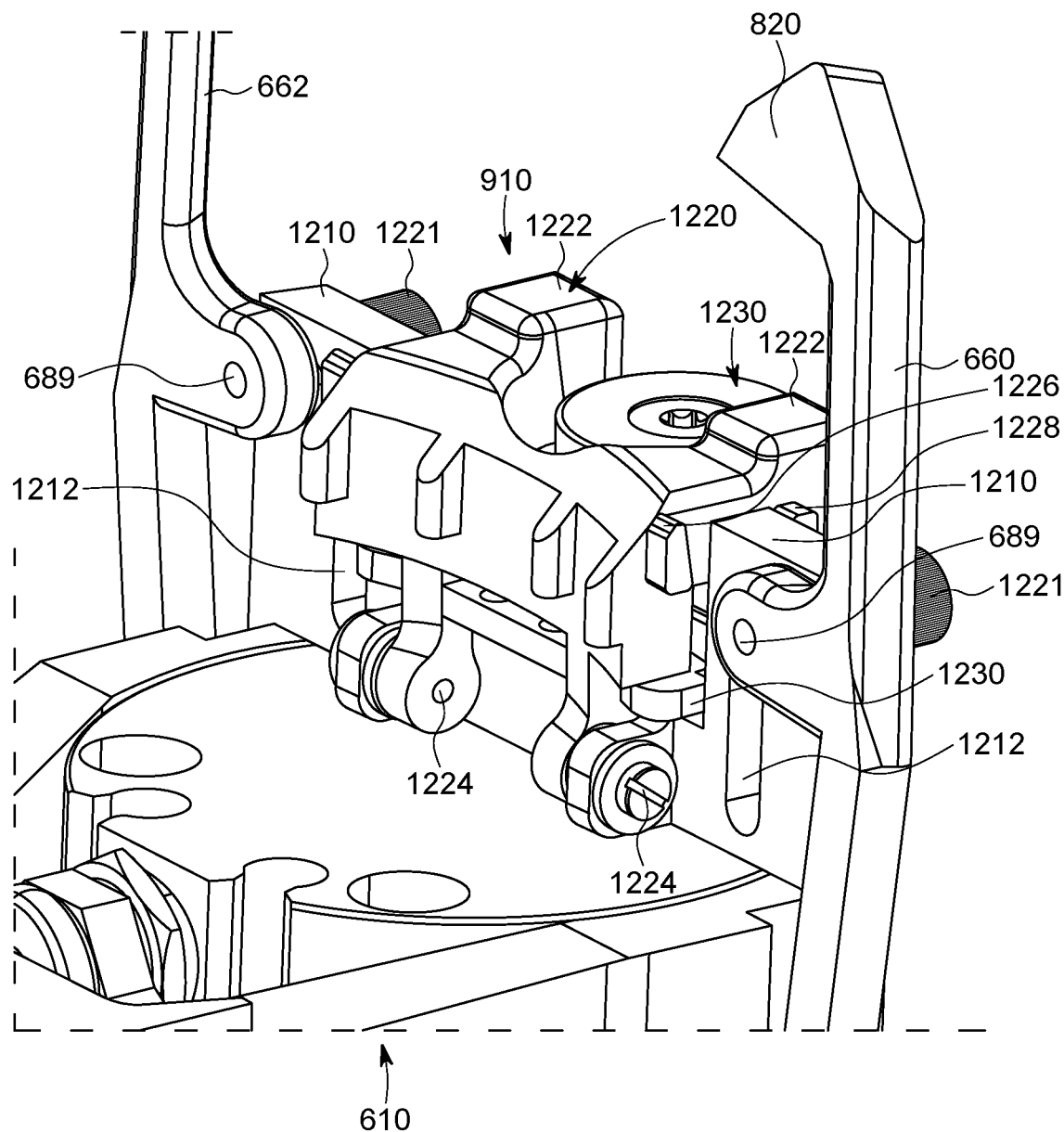
FIG. 12 is a fragmentary perspective view of the connection tool of FIG. 9 detailing components of the presence sensor.

Note that capturing the gladhand wedge is a critical sensing component of the adapterless tool. The wedge is one of the standardized components of a gladhand on the SAE specification such that it can be reliably used as a benchmark for proper gladhand capture. Thus, reference is made to FIGS. 9-17, which further describe the gladhand capture assembly 610 includes a wedge presence sensor 910 that is adapted to detect the presence of a gladhand wedge from either the vertical or horizontal orientation (for both the spring-loaded (FIG. 9), and fixed (FIG. 10) gladhand approach directions (arrows 672 and 670 in FIG. 11, respectively). In operation, the presence sensor 910 is arranged to be presented to the wedge, and actuated thereby, when the capture assembly is appropriately aligned with, and in position to grasp the wedge 540, 640 with the latching fingers 660, 662. Note in, for example, FIG. 12, the posts 1210 having slots 1212 in which the fulcrum pivot points 689 (e.g. Allen screws 1221 as shown) ride when the latching fingers 660, 662 are actuated. This latching motion is described further below.

Figure 13:
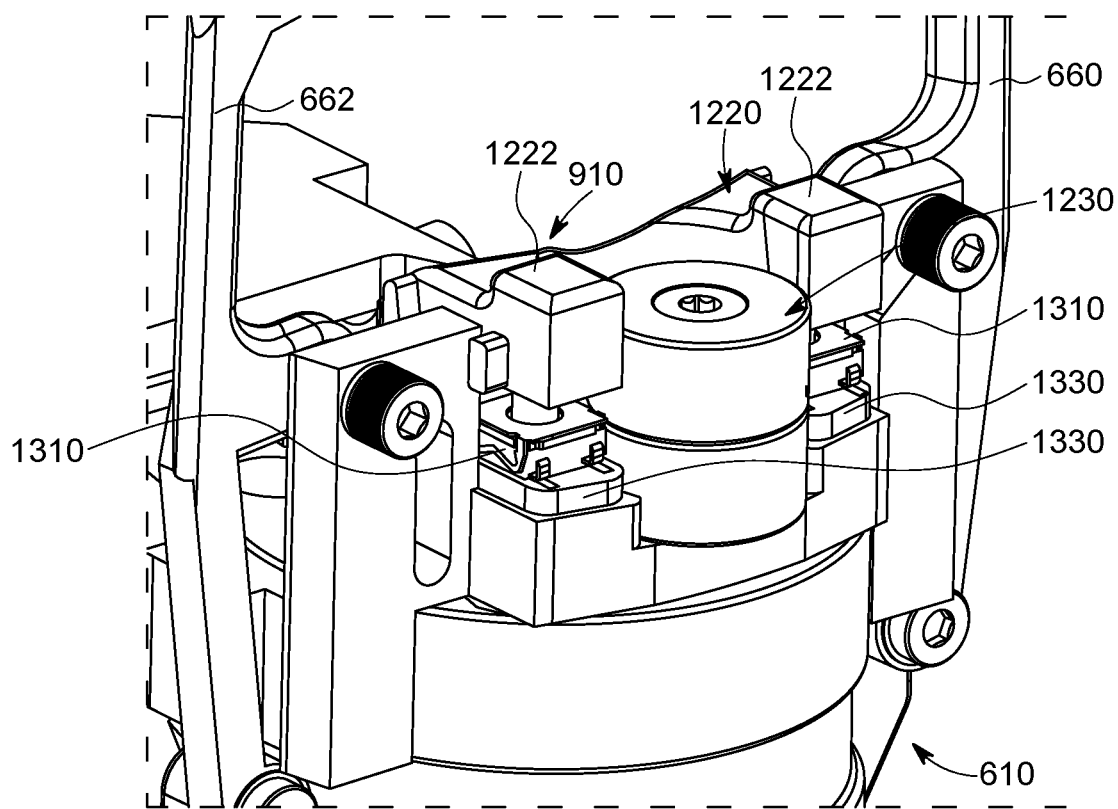
FIGS. 13 and 14 are fragmentary perspective views of the connection tool of FIG. 9 showing the components of the presence sensor in each of a disengaged and engaged position, respectively.
Figure 14:
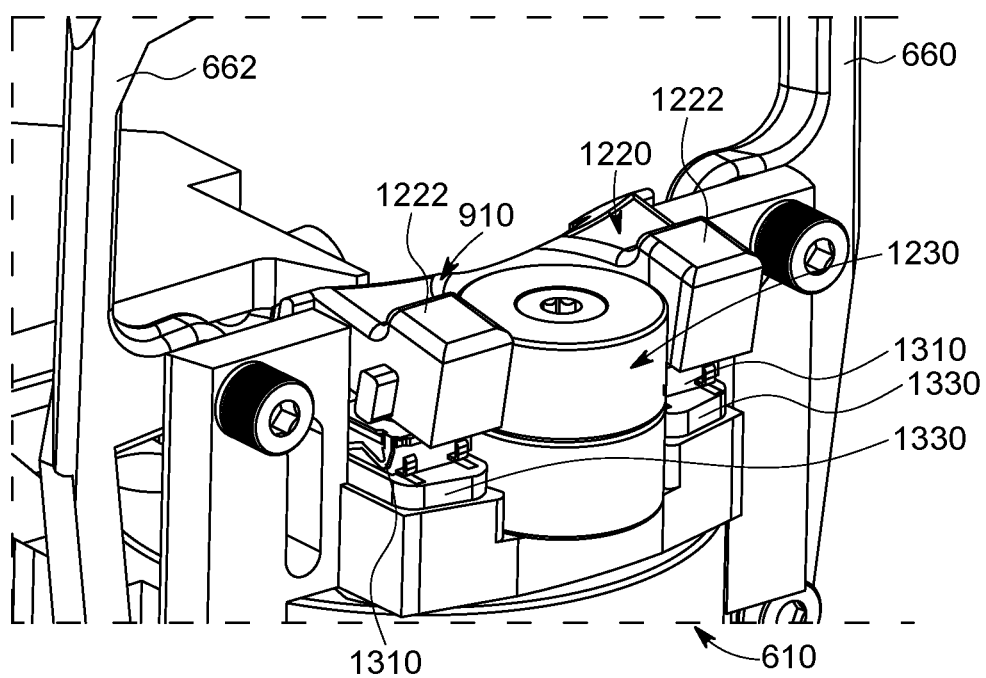
Figure 15:
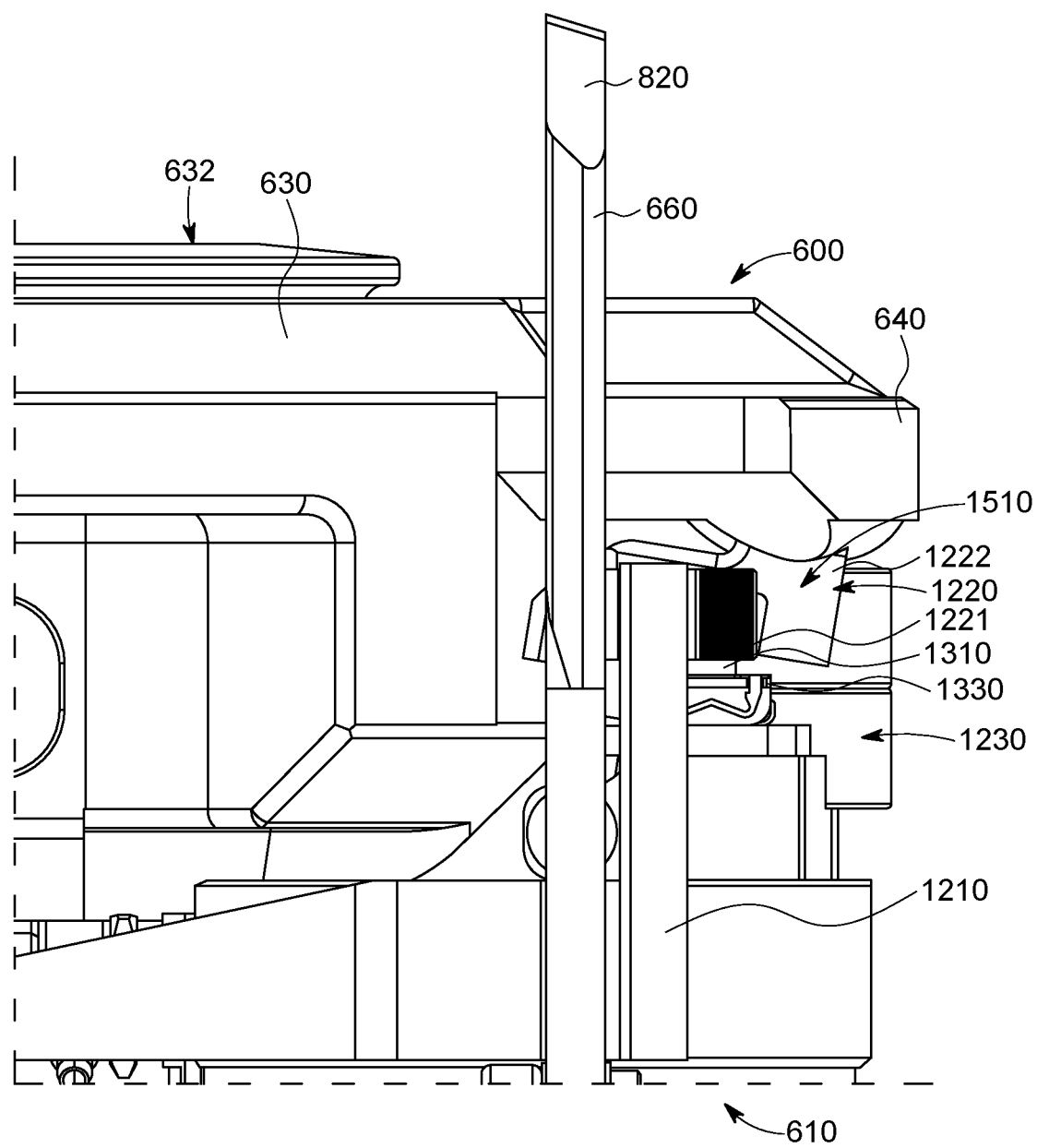
FIG. 15 is a fragmentary side view of the connection tool of FIG. 9 showing the components of the presence sensor in an engaged position with an exemplary gladhand.
Figure 16:
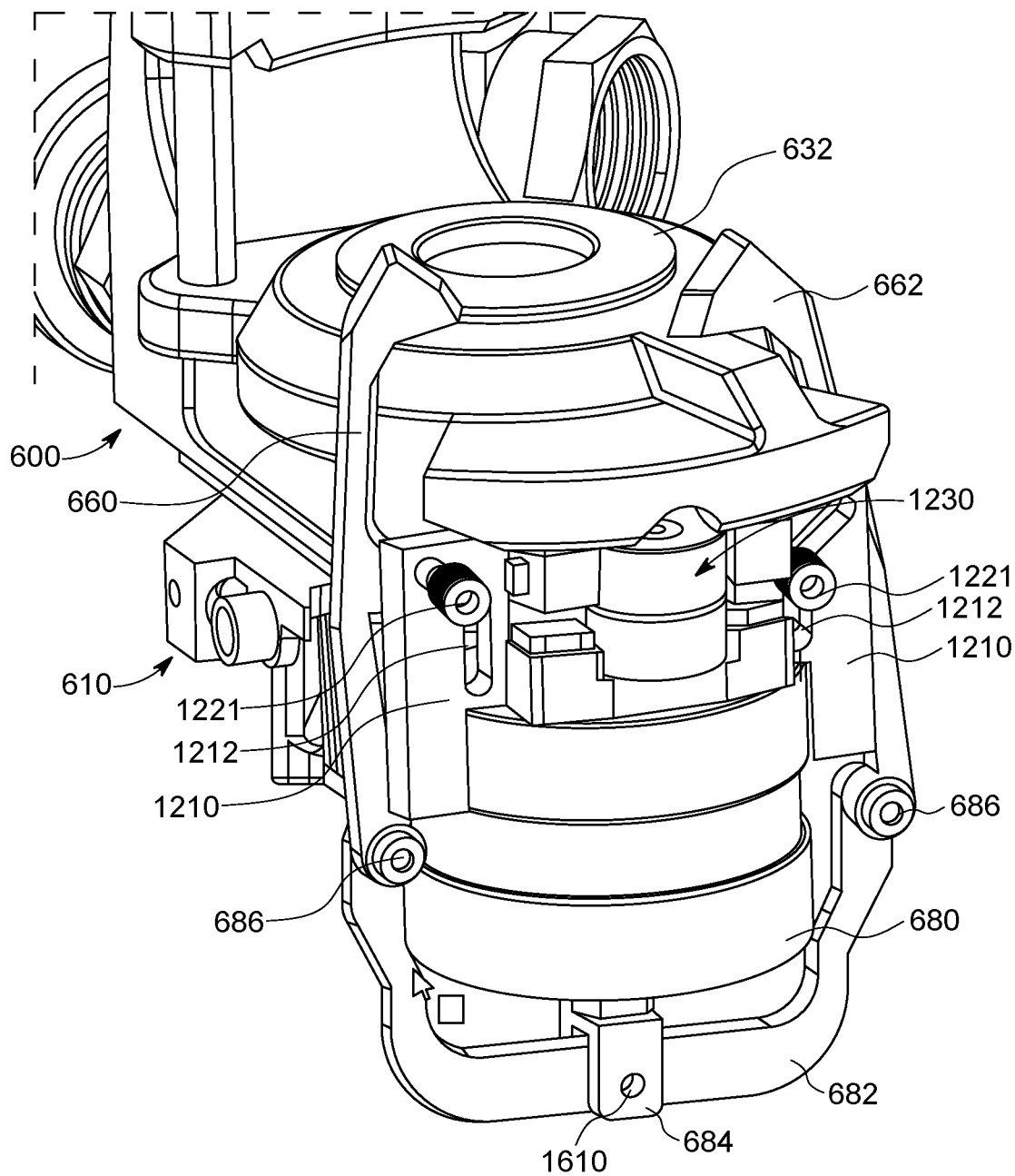
FIGS. 16 and 17 are fragmentary perspective views of the connection tool of FIG. 6 showing operation of a thickness accommodation function for the grippers using a passive pivot attached to the output of the latching actuator, in each of two different orientations.

As shown more particularly in FIGS. 12-15, the wedge presence sensor 910 consists of a rocker assembly 1220 on mounted rotatably on top of (e.g.) a printed circuit (PC) board 1330 having a pair of electromechanical microswitches/pushbuttons 1310 (shown more clearly in FIGS. 13-15). The rocker 1220 is generally U-shaped with a pair of contact pads 1222 that are arranged to contact the wedge when in proximity thereto. The rocker 1220 is rotatably mounted on pivot points (e.g. screws) 1224. The pivot points 1224 of the rocker are arranged so that contact from the horizontal (arrow 670) or vertical (arrow 672) directions will cause the rocker 1220 to rotate into the pushbuttons 1310, therefore triggering the wedge presence sensor. The sensor is powered and transmits contact via an appropriate cable (not shown) that is linked back to the robotic arm and/or vehicle (AV truck) controller. Alternatively, an onboard battery assembly can be provided to the connection tool and control and sensor signals for various tool operations can be transmitted and received vial a wireless link with the vehicle. Such a battery assembly can be recharged when the connection tool is mounted on the end effector of the robot arm using appropriate electrical contacts in the connection therebetween.

Hard stops 1226 and 1228 are provided on the sides of the rocker 1220 to limit the rotational travel of the rocker in each of opposing rotational directions, and to prevent possible damage to the pushbuttons through over-compression. A high-strength magnet assembly 1230 is provided within the U-shaped recess of the rocker, and is secured to the frame of the gladhand capture assembly 610. The magnet 1230 is adapted to bias the gladhand wedge 540, 640 toward the presence sensor contact pads 1222, and thereby trigger the wedge presence sensor via actuation of the switches 1310. Note that, although the present embodiment employs physical contact to determine wedge presence, other sensor arrangements and/or operational principles can be used to achieve the same result. These sensor types can include, but are not limited to, proximity, distance, Hall effect, and/or pressure/force sensors. Note that the magnet assembly herein can also be beneficial in instances in which the gladhand has a damaged or broken spring, as it draws the gladhand into appropriate engagement.

In operation, as shown in FIG. 15, the magnet 1230 has engaged the wedge 640 of the gladhand 600, and caused the rocker 1220 to rotate downwardly (arrow 1510) toward the switches 1310, thereby actuating them and informing the controller (920 in FIG. 9) that aligned contact has been made between the gladhand capture assembly 610 and the gladhand 600. The system can direct the actuator 680 to engage the latching fingers, thereby securing the connection. Note that the controller 920 can be instantiated as a local control (e.g. PC) board on the connection tool that sends and receives signals from the AV truck robotic control system. The controller 920 can comprise various functional processes/ors include generalized motion control 922 that operates the various steppers and actuators on the connection tool and sensor processes/ors 920 that provide power to connection tool sensors (e.g. wedge presence sensor(s) 910, 932, 942, etc.), and receive feedback therefrom.

Figure 9A:
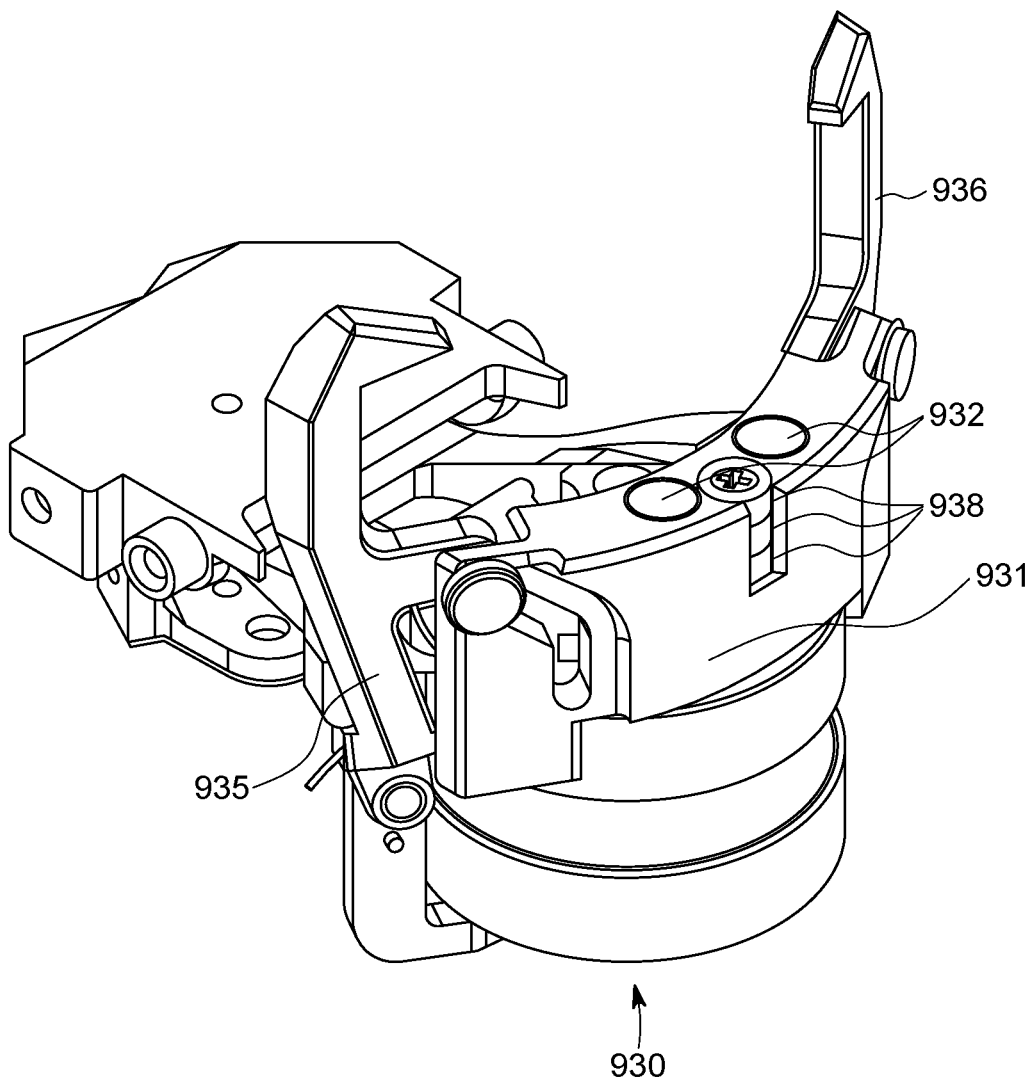
FIGS. 9A and 9B are perspective views of connection tools, each having a wedge presence sensors, according to alternate embodiments.

With reference to FIG. 9A, an alternate arrangement for a wedge sensor is shown. The connection tool 930, in this embodiment, includes a curved frame 931 for guiding latching fingers 935 and 936. The frame 931 includes a pair of non-contacting/passive proximity sensors 932. Such passive sensors can operate on a variety of physical principals known to those of skill, and are commercially available, these passive sensors can include the integration of one or multiple capacitive, inductive, magnetic, optical, or ultrasonic proximity sensors. In the exemplary connection tool of FIG. 9A, the frame 931 two spaced-apart sensors are provided to detect the presence of a wedge at a predetermined distance. The sensors are connected to the tool's processing circuitry, including any appropriate analog and/or digital interface as required to convert the sensor's signal into a meaningful data value—for example, a range of values that indicates a degree of proximity of a wedge. In one example, the sensor circuitry can be combined to yield a positive result if either one or both of the sensors are covered by the wedge. Note that the frame also includes a stack of magnets 938 between the sensors that can be part of the sensors physical operation and/or can assist in engaging the wedge through magnetic attraction. Also notably, the connection tool shape, and motion path of the associated latching fingers, define a geometry that enables the connection tool to fit into relatively tight spaces, such as a recessed gladhand box on a trailer face.

Figure 9B:
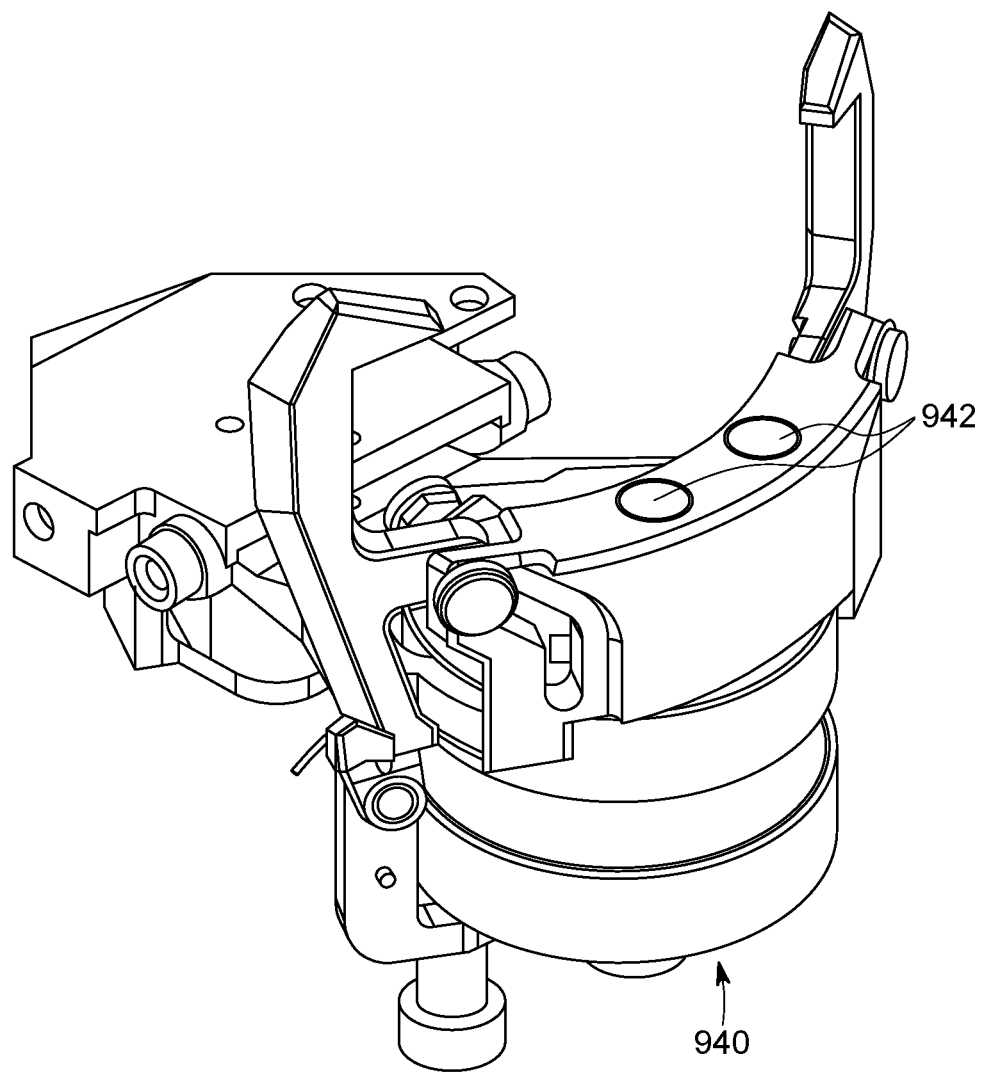

FIG. 9B shows an alternate embodiment of a two-sensor (942) connection tool 940, in which the frame is free of magnets.

Figure 17:
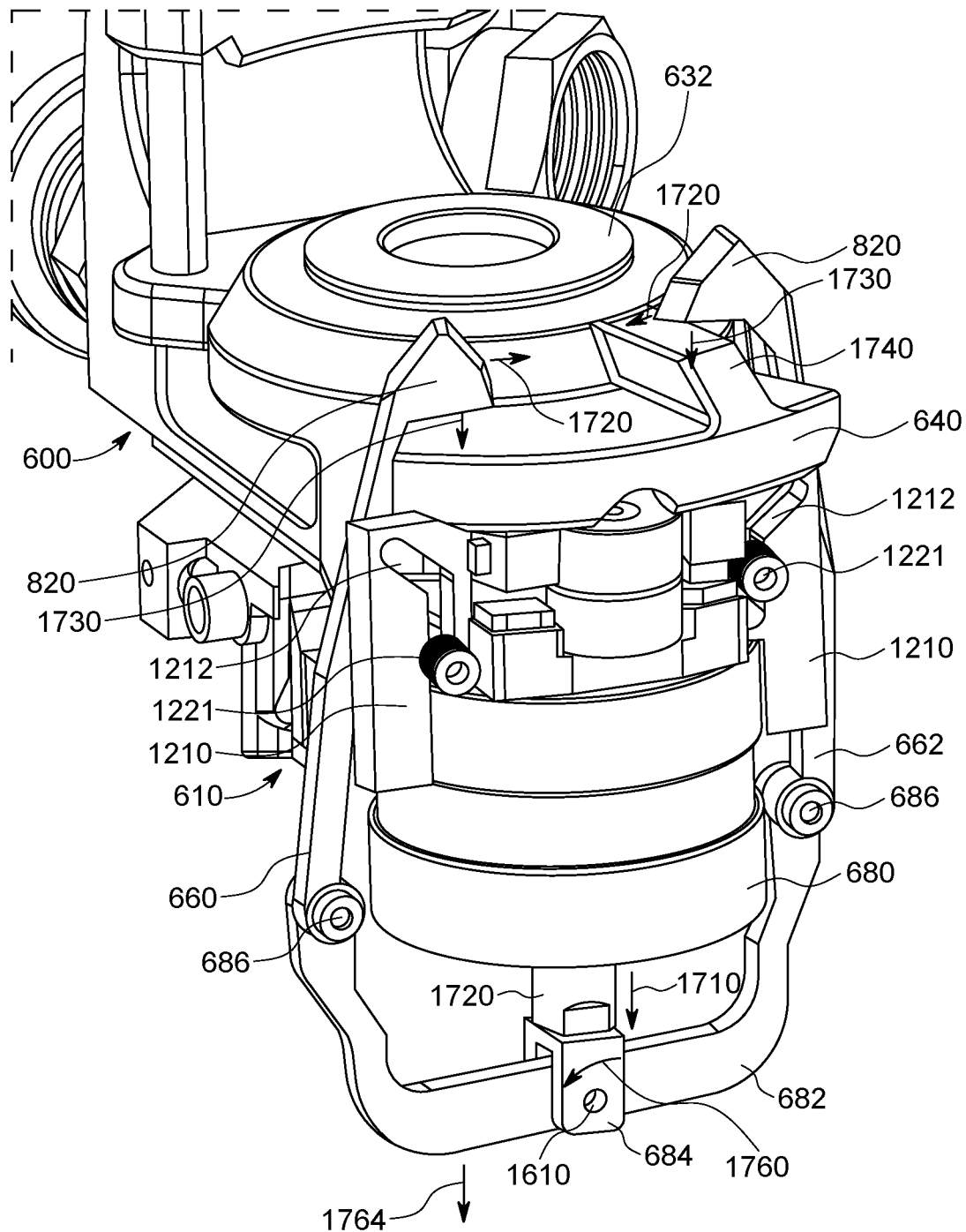

It is further noted that various gladhands have different profiles on their wedge face, making it somewhat challenging to capture the wedge tightly with a linear-actuated capture assembly. Note, with reference to FIGS. 16 and 17, that the slots 1212 each define a dogleg shape with a wider separation from each other where the pivots 1221 reside when the clevis 684 is in an unextended state relative to the actuator 680 (FIG. 16); and conversely, the slots each define a reduced separation when the clevis 684 is extended. Hence, as shown in FIG. 17, upon actuation, the actuator's drive shaft/ram 1720, and associated clevis 684 moves outwardly (arrow 1710) from the actuator 680, causing the fulcrum pivot points (screws 1221) to ride along the slots 1212. This, in turn causes the ramps 820 on the ends of the latching fingers 660, 662 to move inwardly (arrows 1720) and downwardly (arrows 1730), to engage the wedge 640. In this example, the wedge surface includes a raised rib 1740 which creates an uneven engagement surface for the ramps 820. To accommodate this uneven surface, the gladhand capture assembly 610 includes a passive pivot 1610 on the clevis 684 of the linear actuator 680 that allows the U-shaped link bar 682 to swivel (curved arrow 1760), while the finger 662 can remain engaged to the rib 1740 as the actuator extends further, thereby moving (arrow 1746) the opposing finger 660 further until it also contacts the surface of the wedge. The actuator 680 can be adapted to exert a predetermined continuous pressure on the wedge once engaged. This pressure can be maintained by a locking function, voltage current regulator, fluid/air pressure and/or other technique known to those of skill. In summary, the depicted assembly of slots, pivots and linkages allows each of the fingers to capture the gladhand wedge at different relative heights thereon using a single linear actuator stroke.

B. Bistable Connection Tool Configurations

Figure 18:
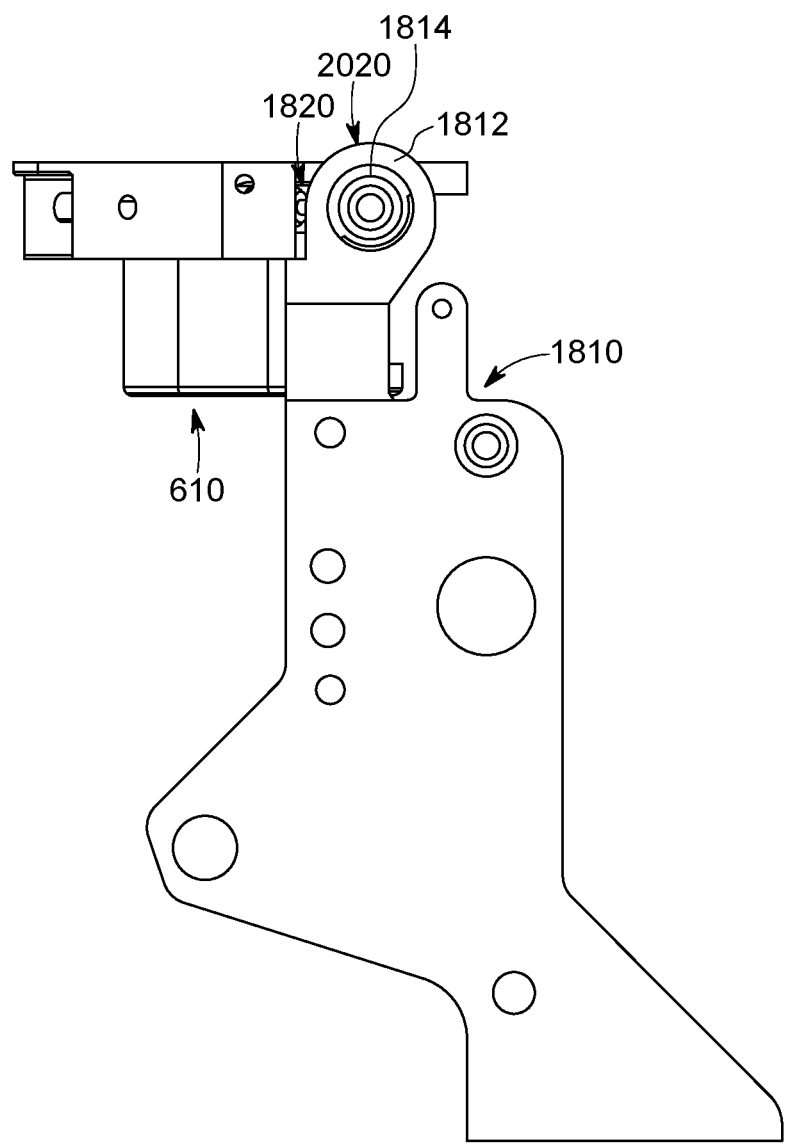
FIGS. 18 and 19 are side views of a hinge portion of the connection tool in each of two positions, respectively, representing a bistable configuration that accommodates two different modes of operation so as to inform proper robot arm motion planning with respect to gladhands.
Figure 19:
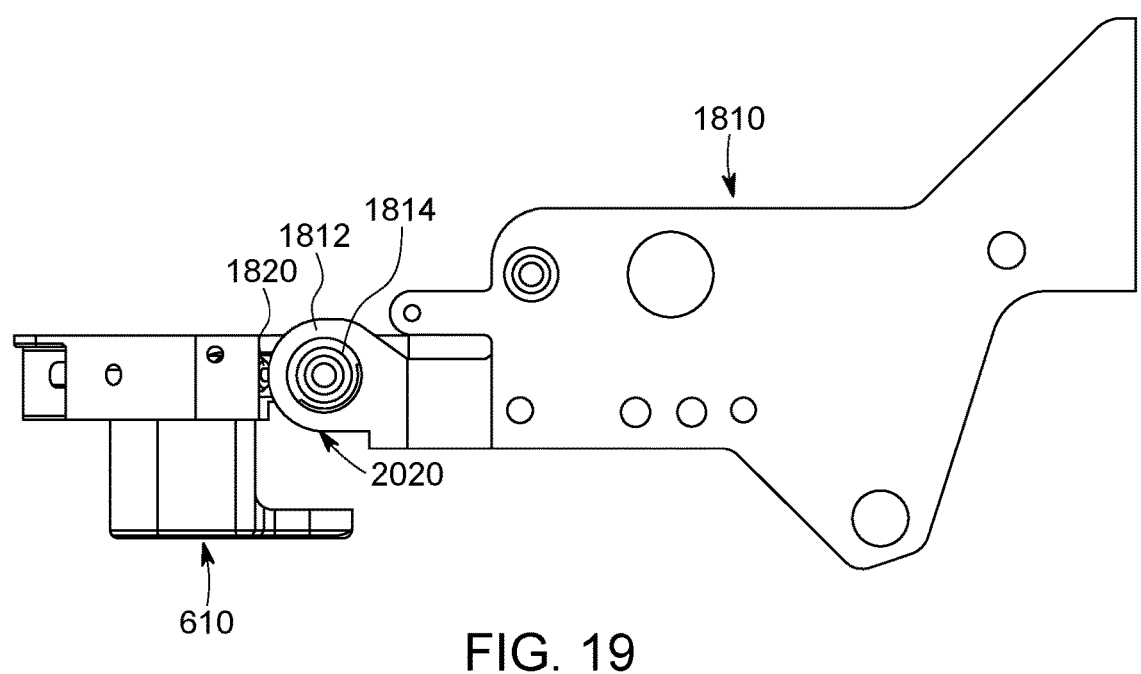
Figure 20:
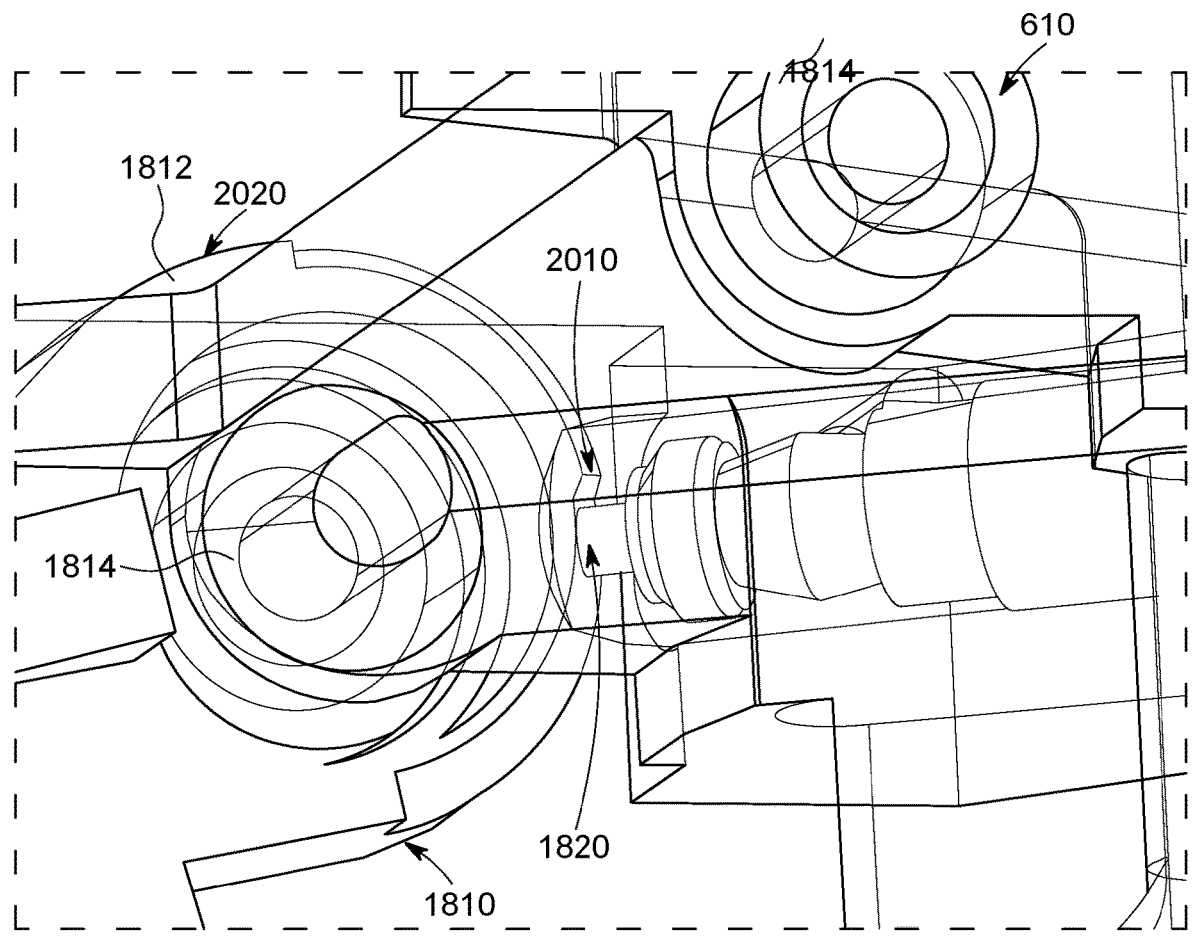
FIG. 20 is an exposed fragmentary perspective view of the position switch assembly for the hinge portion of the connection tool of FIGS. 18 and 19.

The connection tool is adapted to support at least two different modes of operation—namely engaging a retractable glad hand and a fixed gladhand on the trailer front. To accommodate these two different modes, the hinge supporting the gladhand capture assembly 610 with respect to the main body of the connection tool supports a mechanical, bistable configuration. In order for the system to properly inform proper robot motion planning, associated control systems, and supporting behaviors, the assembly is adapted to recognize what position the connection tool (and underlying components) resides in at any given time. Thus, with reference to FIGS. 18-20, the gladhand capture assembly 610, is shown pivotally mounted on a hinge body 1810 via a semi-annular pivot base 1812 that rides about a cylindrical pivot 1814 on the gladhand capture assembly 610. A linear position switch 1820 is located on the gladhand capture assembly 610, facing the pivot base 1810. This switch is powered by the system power supply, or a battery, and communicates with the system controller via a wired or wireless connection as described above. The switch includes a contact plunger that moves from a depressed position when facing the circular perimeter 2020 (FIG. 20) to an extended position, when outside the perimeter 2020, and/or facing a flattened notch 2010 (a cord line of the perimeter semi-circle 2020). The notch 2010 is exposed to the switch 1820 when the gladhand capture assembly is extended directly outward from the hinge body 1810 (FIGS. 19 and 20). The switch 1820 is otherwise extended when the gladhand capture assembly 610 is either partially or fully disposed at an angle to the hinge body 1810 (FIG. 18). Thus, the switch 1820 can provide positive feedback as to when the tool is in one state (FIG. 18) or the other (FIGS. 19 and 20). As shown in FIG. 20, the gladhand capture assembly pivot 1814 can be provided as two spaced-apart pivots that engage a pair of hinge bodies that are also spaced apart so as to provide a stable and robust hinged platform. Note that the linear displacement switch 1820 described herein is only one of a variety of possible alternate arrangements for a sensor according to various embodiments. For example an electro-optical (or other type—e.g. Hall effect) proximity sensor can be used to sense predetermined motion or position measurements in this arrangement and other used herein. Likewise, position and/or motion of various components/actuators can be sensed using a pattern recognition camera and/or LIDAR arrangement. Similarly, a rotary encoder or linear potentiometer can be used to extract angular position data along the entire rotation path, and thereby to assist with robotic planning. Hence, in alternate embodiments, motion/position of these components, and others described herein, can be sensed using non-contacting sensors, and/or sensors that operate using different principles.

Figure 20A:
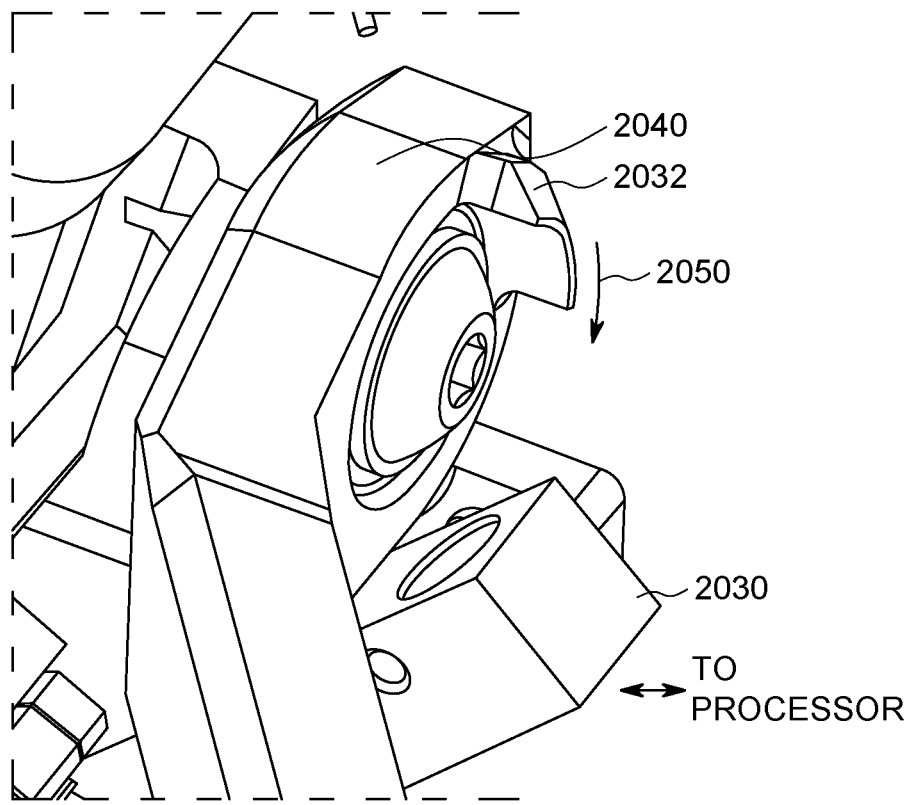
FIG. 20A is a fragmentary perspective view of a position sensor for detecting hinge position according to an alternate embodiment shown detecting a location of the hinge portion of the connection tool in a first position.
Figure 20B:
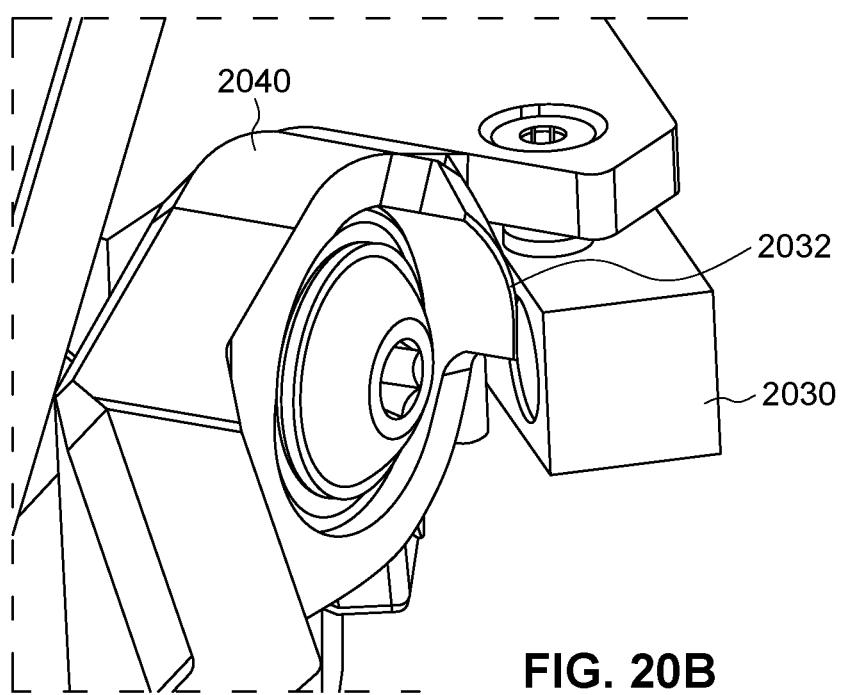
FIG. 20B is a fragmentary perspective view of the position sensor of FIG. 20B shown detecting a location of the hinge portion of the connection tool in a second position.
Figure 21:
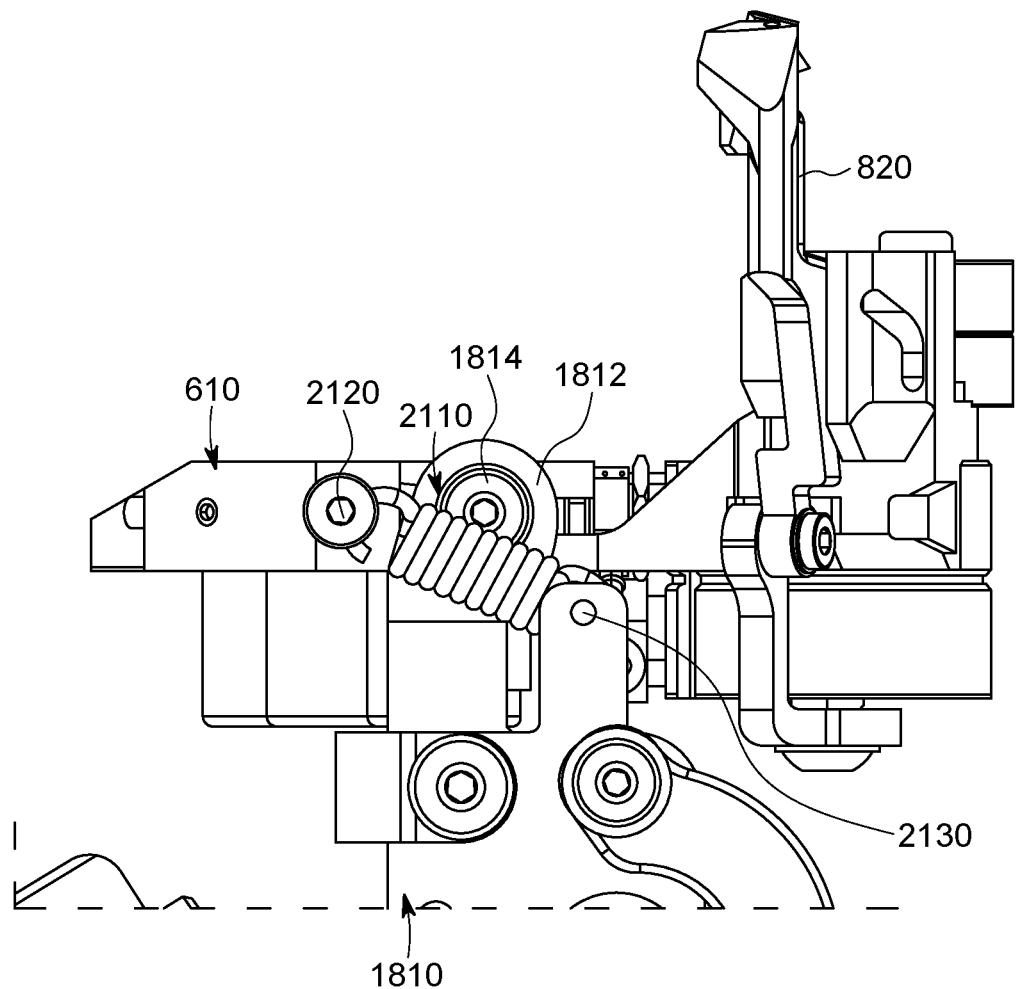
FIGS. 21-23 are fragmentary side views of the connection tool and associated hinge of FIGS. 18 and 19, further showing the gladhand/wedge capture assembly used to capture each of a fixed and a spring-loaded gladhand having a bistable spring that selectively bias the tool toward either state, in each of an unlocked, midpoint/transition, and locked position, respectively, FIGS. 24 and 25 hard stops for maintaining the hinge of FIGS. 21-23 in the unlocked and locked positions, respectively.
Figure 22:
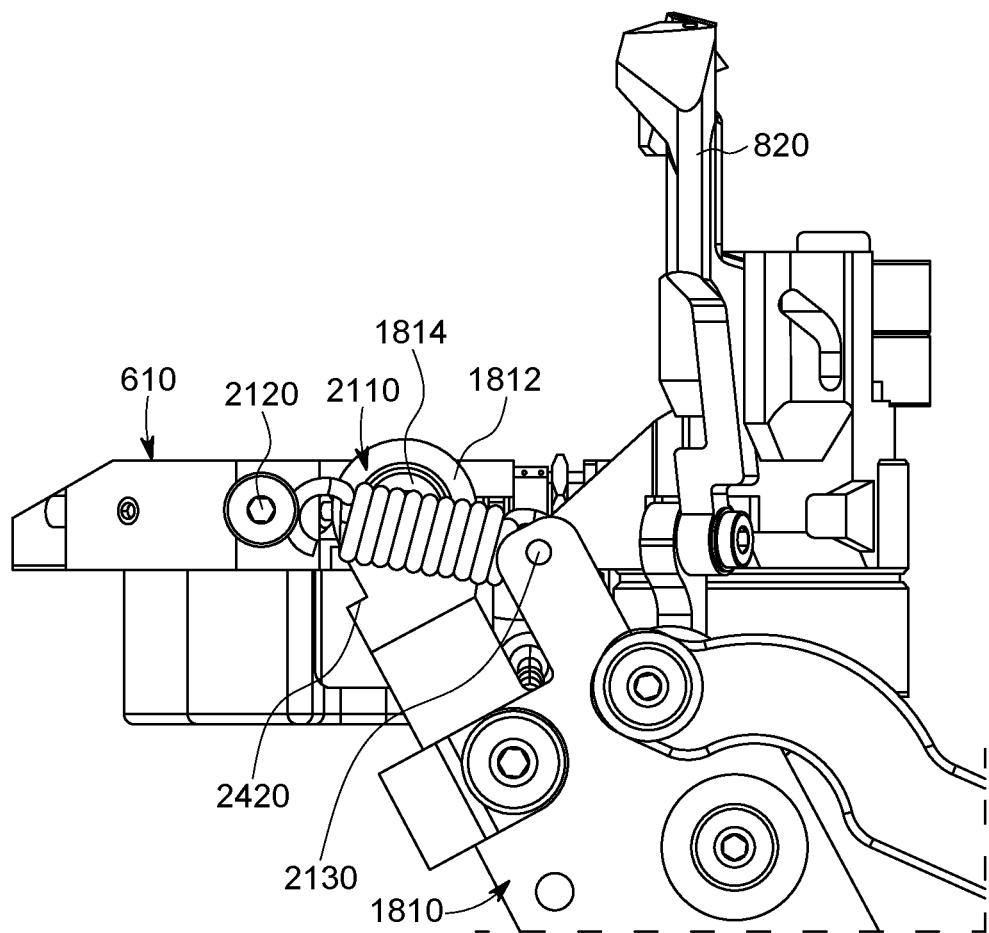
Figure 23:
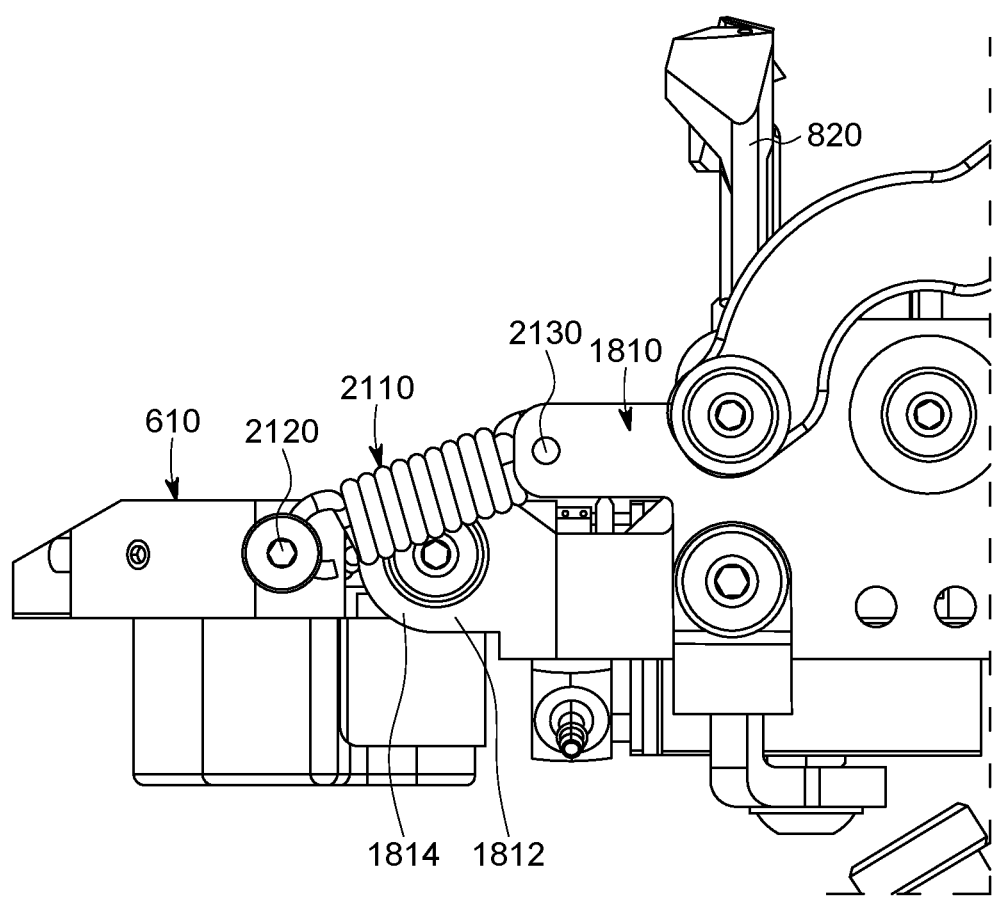

With reference now to FIGS. 20A and 20B an example of a non-contacting sensor 2030 is shown. The sensor 2030 comprises an inductive proximity sensor and an interacting protrusion 2032 on the hinge body 2040. The protrusion moves (curved arrow 2050) out of the sensing field of the sensor 2030 (FIG. 2A showing an unlocked state), into a position (FIG. 2B) that overlies the sensing field. The degree of overlap to trigger a state change in the sensor 2030 occurs at a desired amount of hinge rotation.

Reference is now made to FIGS. 21-25, the adapterless connection tool includes a bistable spring assembly to facilitate motion of the connection tool between each of two configurations for the gladhand capture assembly that are, respectively used to capture a either a fixed or a retractable, spring-loaded gladhand. To force the tool to bias towards either of these states, a bistable spring assembly, is provided using, e.g. a compression coil spring 2110 on one or both sides of the tool. The spring 2110 includes pivoting bases 2120 and 2130 that are positioned with respect to the hinge pivot 1814 so as to allow the gladhand capture assembly 610 to flip between an unlocked position (FIG. 21) and a locked position FIG. 23, while passing through a transition arc (FIG. 22), where the spring 2110 exerts increased tension. The bistable arrangement typically exerts maximum extension on the spring 2110 at approximately 45 degrees from the unlocked and locked states. After passing this point in either direction, the spring forces the gladhand capture assembly 610 to snap into the nearest state. This ensures that the gladhand capture assembly 610 is positively positioned in either of the desired states, thus further ensuring proper placement and engagement of the latching fingers 820 with respect to the gladhand wedge.

Figure 24:
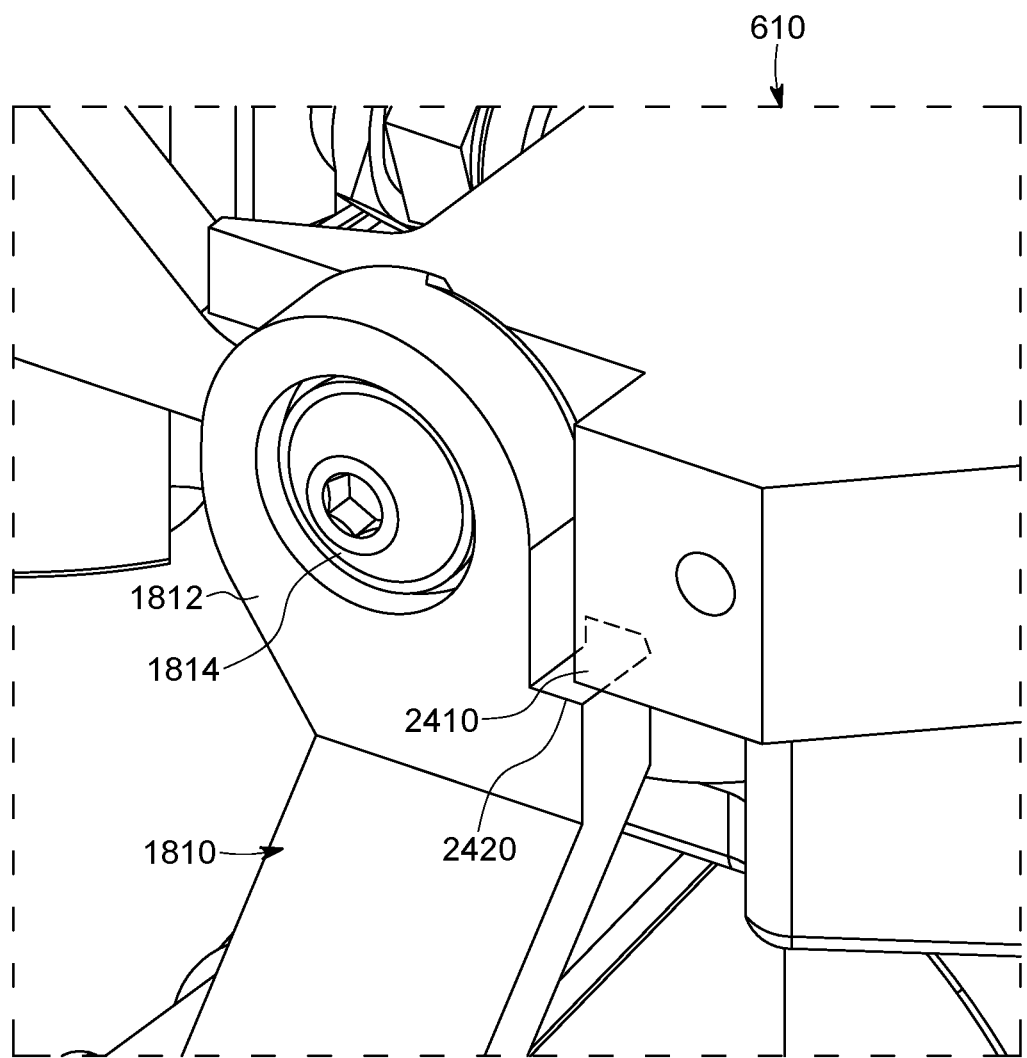
Figure 25:
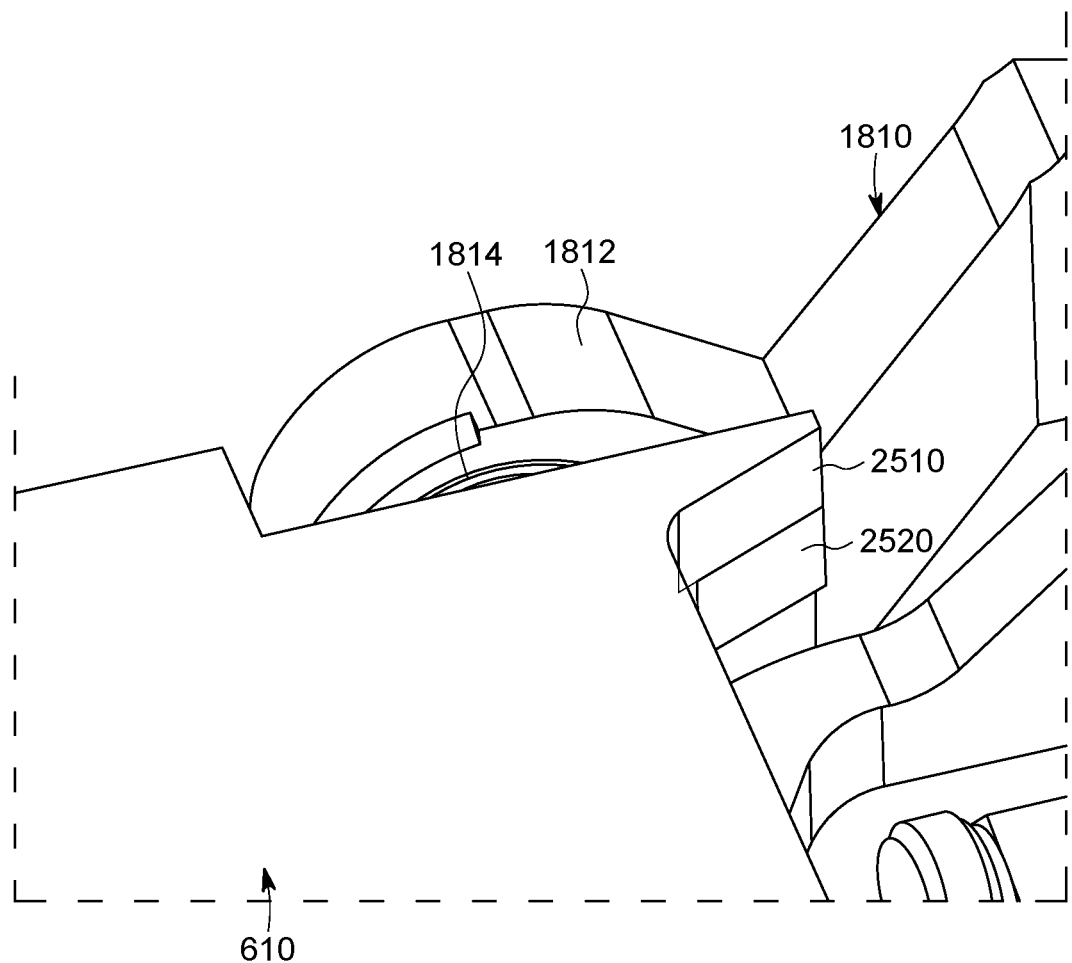

As the spring 2110 is constantly in tension, even in the unlocked and locked states, the spring biases the gladhand capture assembly into each of these positions, and the positions are, in turn, maintained using a pair of interengaging hard stops relative to each state. As shown in FIG. 24, the unlocked position is maintained by hard stops 2410 and 2420 on each of the gladhand capture assembly 610 and hinge body 1810, respectively. Likewise, the locked state is maintained, as shown in FIG. 25, by a pair of hard stops 2510 and 2520 that define inwardly directed protrusions on the gladhand capture assembly 610 and tool base 1810, respectively. Overall, the above-described arrangement of sensors and springs enables the robot to easily change between (and understand) the state of the connection tool depending upon the required connection task. The change from locked to unlocked state for the gladhand capture assembly 610, based upon the bistable spring arrangement can be facilitated by a tool stowage arrangement and described in detail below.

C. Active Connection Tool Hinge

With reference to FIGS. 26-33 the connection tool employs an active hinge arrangement both for configuration change before gladhand capture and after in the case of a retractable, spring-loaded gladhand to expose the sealing face of the gladhand for connection using the swinging airline connection plate assembly 2610. As described further below, and as depicted in above-incorporated Published U.S. Patent Application No. US-2021-0053407-A1 (e.g. see FIG. 48S therein), the airline connection plate assembly 2610 includes an airline connection 2612 in communication with the pneumatic braking system of the AV yard truck. The airline connection plate assembly 2610 includes a sealing surface 2614 that selectively engages the seal of a native gladhand, once captured by the latching fingers 820. The motion of the plate assembly 2610 is facilitated by two pairs of link arms 2710 and 2712 attached to the hinge base 1810. The plate assembly 2610 swings between the depicted disconnected state and a connected state in engagement with the gladhand seal. The motion of the plate assembly 2610 can be driven in a variety of ways—for example using a linear pneumatic, hydraulic or electric actuator 2626 (with pneumatic power connection 2627) as shown, and/or by rotary motor-driven (rotary actuator, stepper, servo, etc.) gears (as described in the above-incorporated Published U.S. Patent Application. When swung into position, the airline connection plate assembly 2610 completes a pressurized braking circuit between the AV yard truck and the trailer.

The active hinge arrangement herein allows for full control of the gladhand capture assembly configuration by producing a high torque about the gladhand capture hinge via a pneumatic, electromechanical, or hydraulic rotary actuator 2630. Similarly, a pneumatic, electromechanical, or hydraulic linear actuator could achieve the same effect. Force can be transmitted from the actuator 2630 to the tool hinge point (gear 2640 on pivot 1814) utilizing a gear train (e.g. gears 2644), timing belt and pulley, linkage and/or any acceptable force transfer mechanism.

Figure 27:
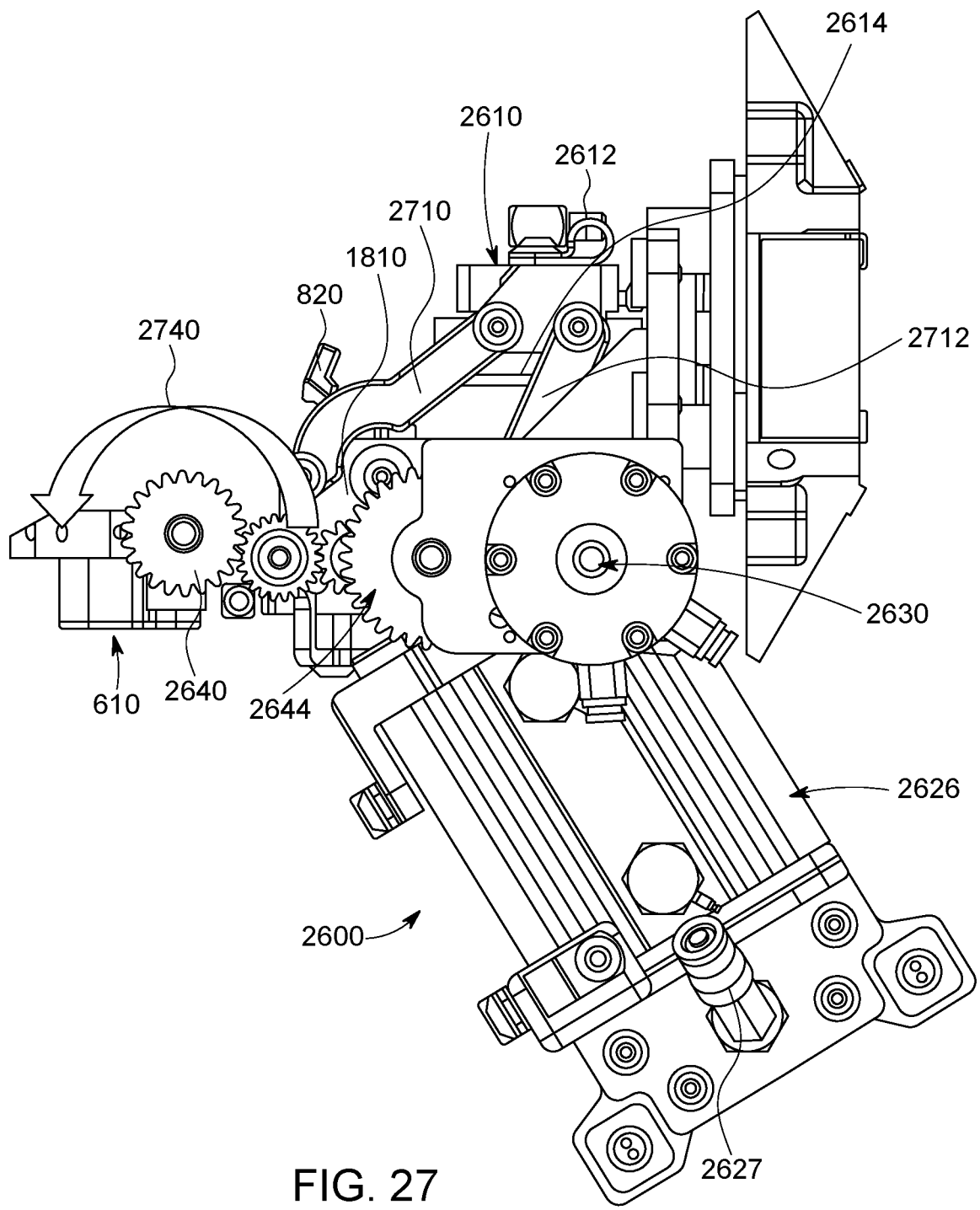
FIGS. 27 and 28 are side views of the connection tool and active hinge of FIG. 26 shown in each of a locked and unlocked position, respectively.
Figure 28:
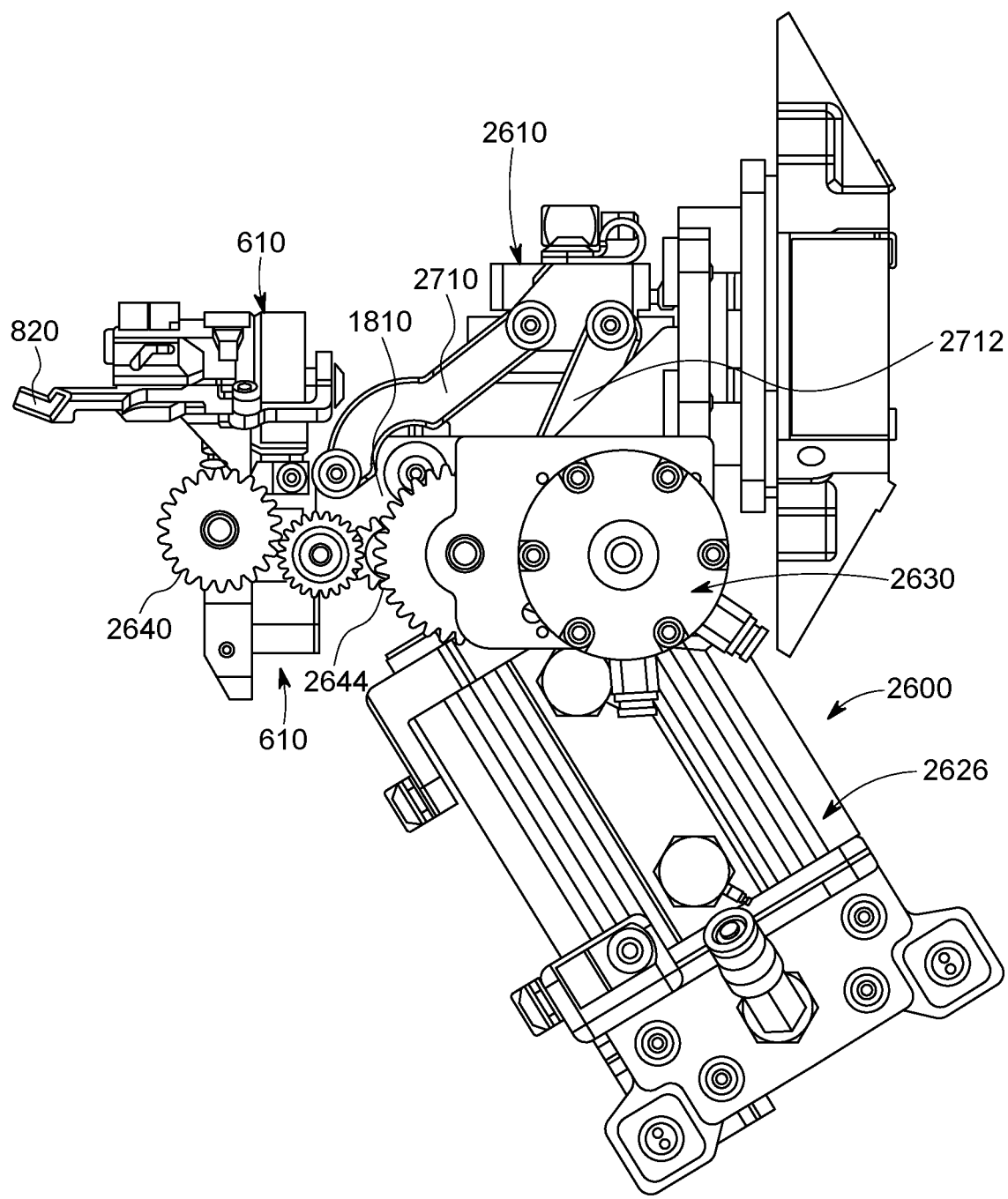
Figure 29:
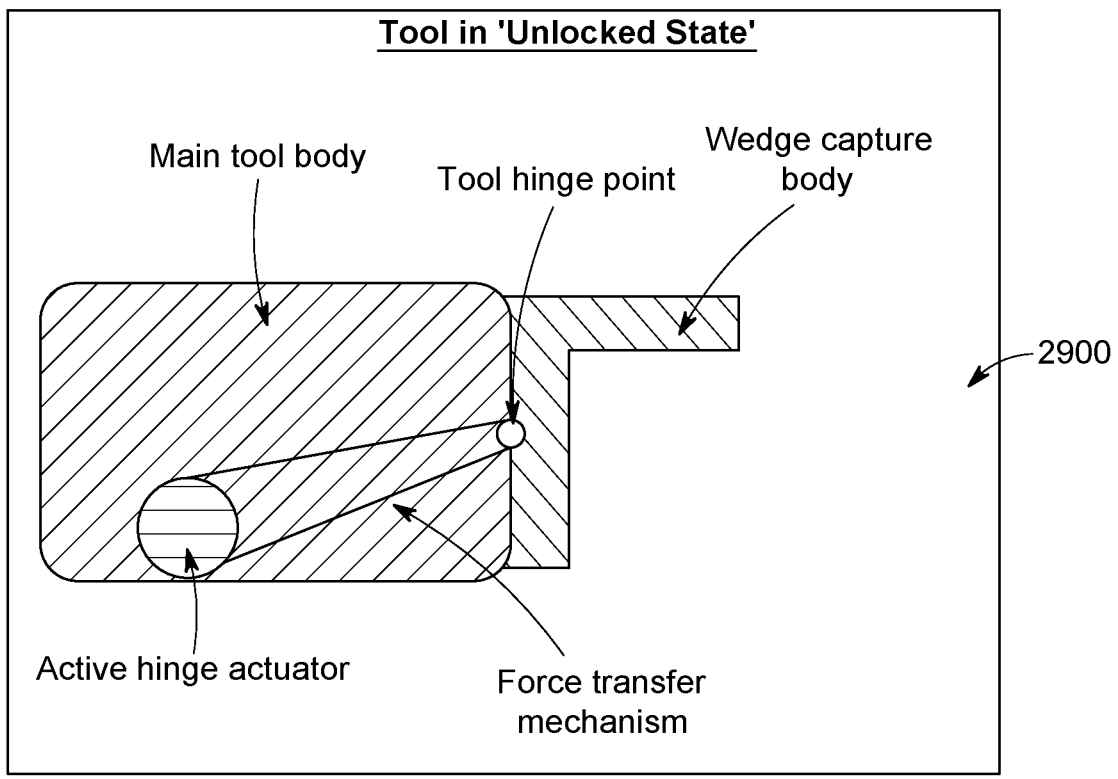
FIGS. 29 and 30 are diagrams showing the generalized operation of the gladhand capture assembly and active hinge of FIG. 26 in each of an unlocked and locked position, respectively.
Figure 30:
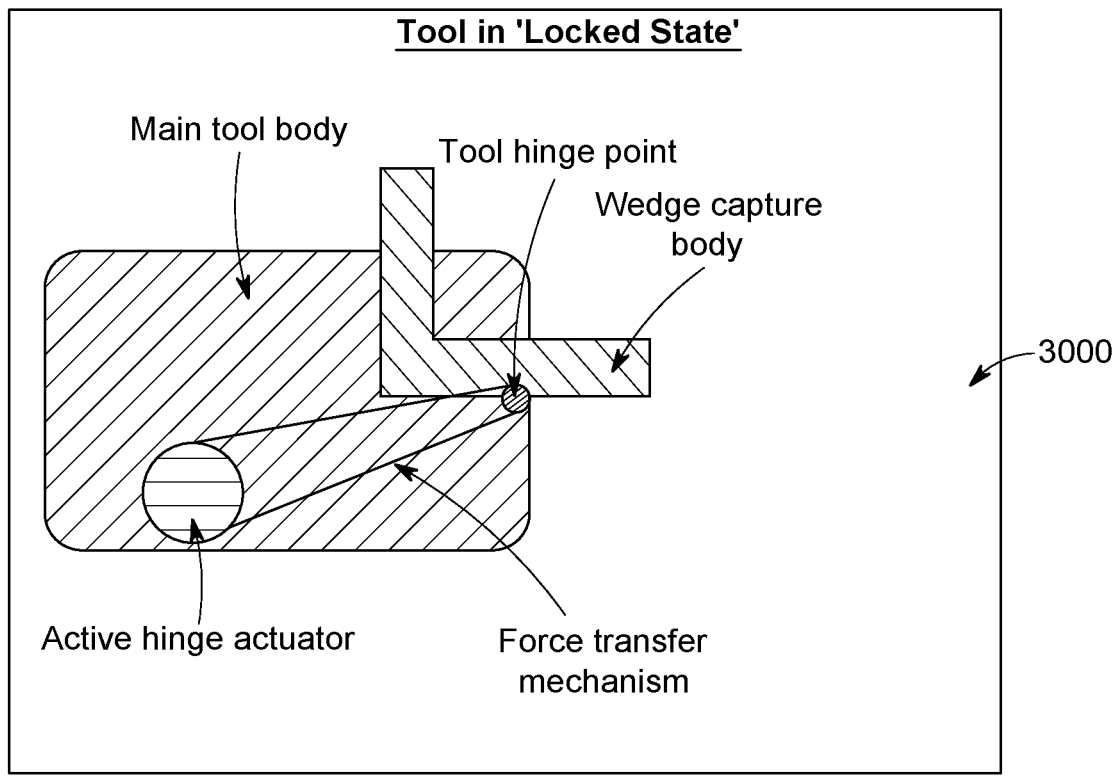
Figure 31:
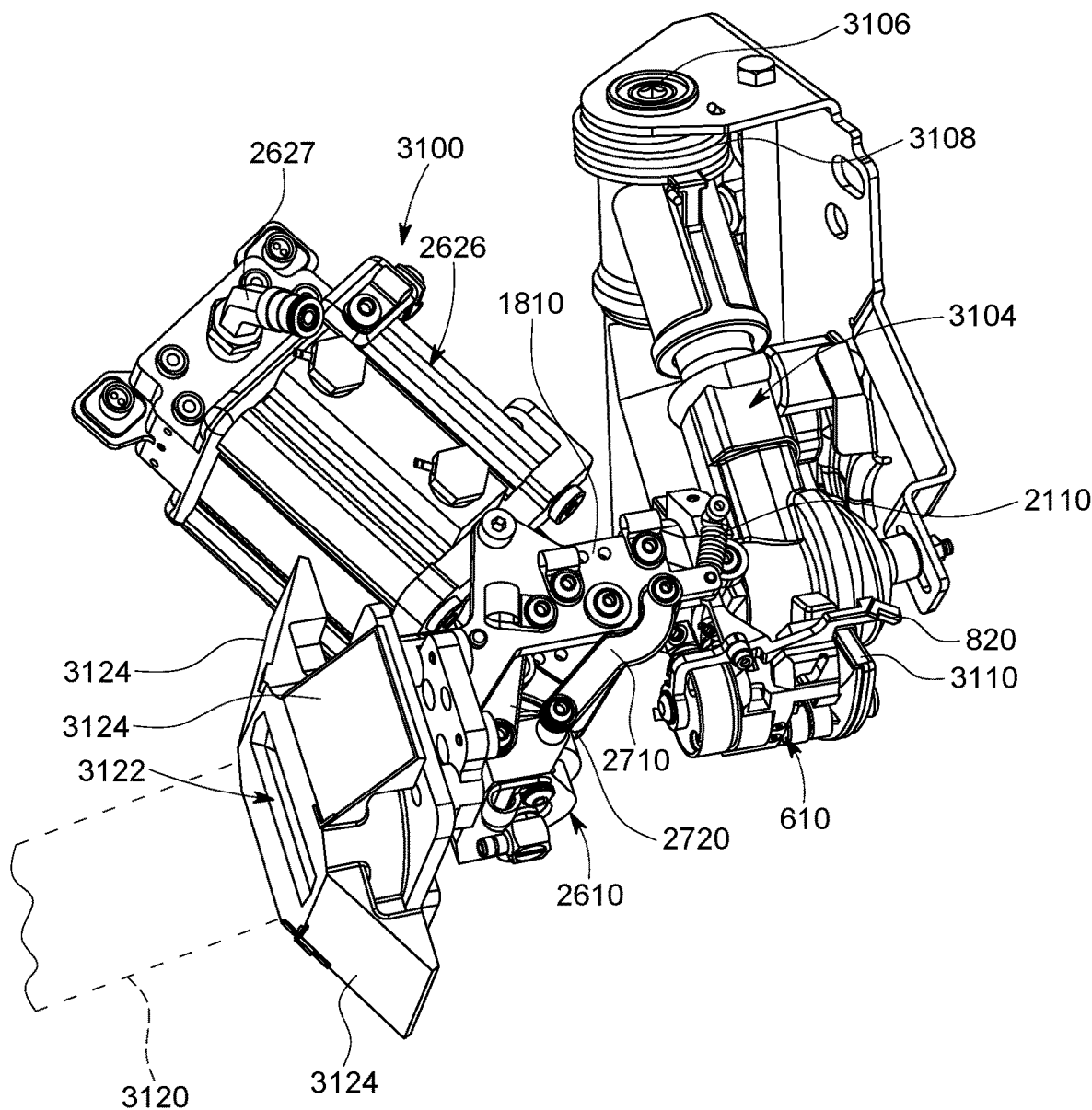
FIG. 31 is a perspective view of the overall connection tool and active hinge, shown engaging an exemplary spring-loaded gladhand, with the hinge in an unlocked state.
Figure 32:
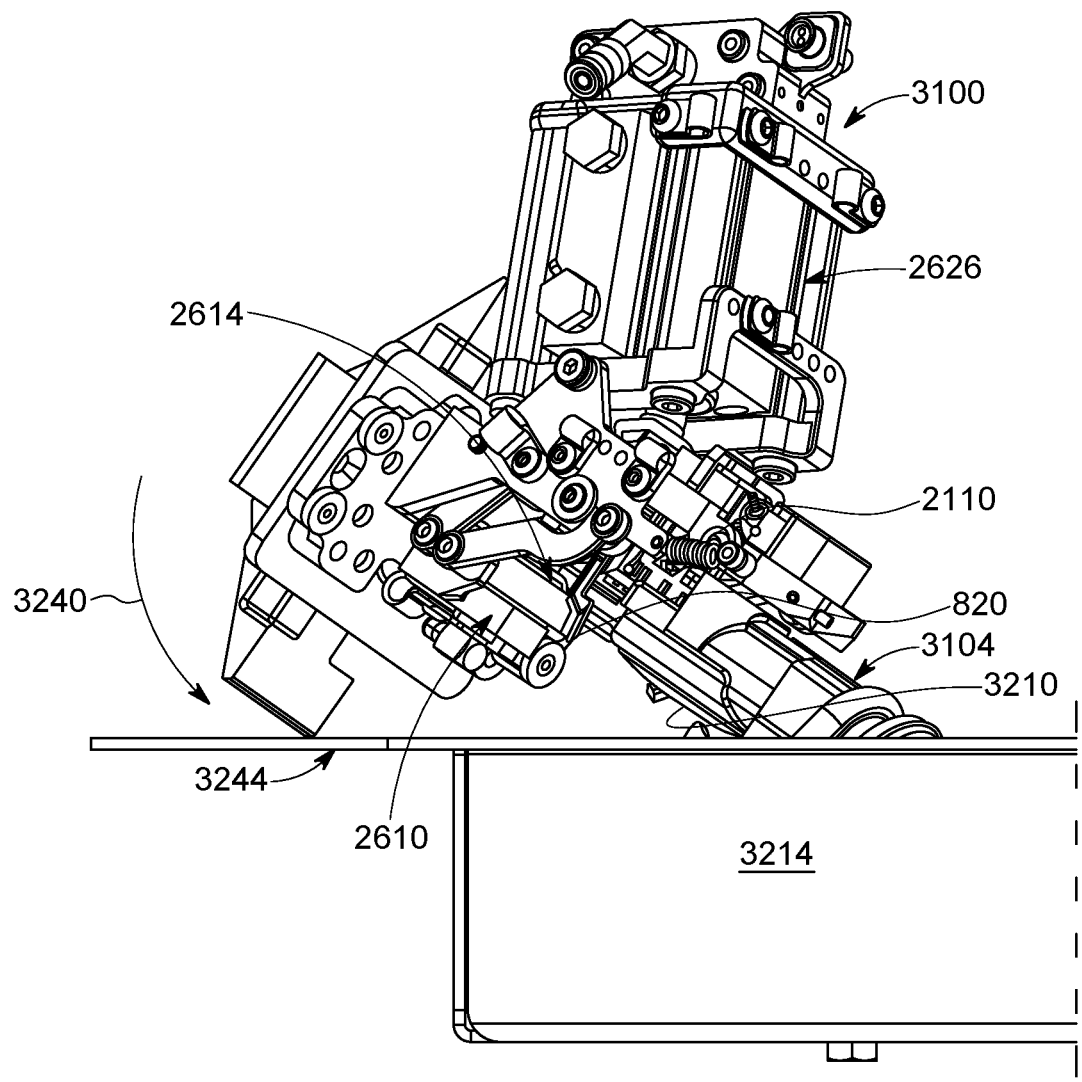
FIG. 32 is a perspective view of the overall connection tool and active hinge, as shown in FIG. 31, reacting off of the trailer face to expose the gladhand seal, and engaging the exemplary spring-loaded gladhand, with the hinge moved to a locked state, ready to actuate the air connection clamp relative to the gladhand seal.

The active hinge arrangement has two main functions. It allows the configuration of the gladhand capture assembly to be changed automatically, depending on the type of gladhand, before a connection is made. The state change of the tool via the active hinge can be confirmed using the pivot sensor 1820 (described above). With reference also to the respective schematic diagrams 2900 and 3000 of FIGS. 29 and 30, the actuator 2630 applies appropriate input torque that is transferred via the force transfer mechanism (e.g. gears 2144) to generate output torque (curved arrow 2740) that biases the tool from the unlocked state (FIGS. 28 and 29) to the locked state (FIGS. 27 and 30).

For retractable, spring-loaded gladhands, the active hinge arrangement typically avoids the need for a complicated manipulator trajectory in order to expose the gladhand seal face. An exemplary process for operating the connection tool in the presence of such a retractable gladhand is described below with reference to FIGS. 31-33. Note that the connection tool 3100 is shown engaging a retractable gladhand 3104 provided within an enclosure 3214 on the surface 3244 of a trailer. The gladhand rotates/retracts into the enclosure 3214 based upon a pivot 3106 and spring assembly 3108 known to those of skill. The action of the connection tool 3100 causes it to react off the face of the trailer and thereby expose the gladhand and associated seal to complete the connection. The connection tool 3100 is removably mounted on a robot arm end effector/manipulator 3120 (shown in phantom) that is selectively attached and detached by movable locking components (not shown) on the end effector 3120 that interact with a receptacle 3122 on the tool 3100. In general, after the tool 3100 is attached via engagement of the gladhand capture assembly with the gladhand wedge 3110, and the airline connection plate engages the gladhand seal 3210, the end effector 3120 disengages from the receptacle 3122, and the arm can return to stowed position free of interference with AV truck movement and operation. Note that the receptacle 3122 is surrounded by four angled plates 3124 at 90-degree relative angles. These plates 3124 can contain unique fiducials (e.g. 2D barcodes—not shown—which can comprise ArUco markers by way of non-limiting example) that are detected by the AV tuck and/or robot arm's visual recognition (machine vision) system, and assist in guiding the arm end effector into the receptacle using known and customized robot visual guidance techniques.

In operation, a process for connecting to a retractable, spring-loaded gladhand (under control of the system controller) can proceed as follows:

(1) The vision system of the AV truck identifies the gladhand 3104 as a retractable type;
(2) The connection tool is retrieved from a stowage location by interengagement of the end effector/manipulator 3120 with the tool receptacle 3122;
(3) The active hinge mechanism (2630, 2640 and 2644) changes the configuration of tool to unlocked by biasing the pivot of the gladhand capture assembly 610;
(4) Based upon visual information, the system controller guides the end effector/manipulator 3120 and attached connection tool 3100 to the gladhand 3104;
(5) The gladhand capture assembly's latching fingers 820 grasp the gladhand wedge 3110;
(6) The end effector/manipulator 3120 detaches from the connection tool receptacle 3122, and the robot withdraws to a non-interfering position, thereby leaving the connection tool 3100 attached to the gladhand 3104;
(7) The active hinge arrangement changes connection tool configuration to locked, and while doing so, the torque generated by the active hinge mechanism pushes (curved arrow 3240) the tool 3100 against the trailer face/surface 3244, thereby rotating the spring-loaded gladhand 3104 sufficiently off the enclosure surface to expose the face of the gladhand seal 3210; and
(8) The airline connection plate 2610 swings (action not shown) on links 2710, 2720 so that its seal 2614 pressurably engages the gladhand seal 3210. This completes the pneumatic circuit between the trailer and AV truck braking systems. Note that this engagement technique is exemplary of a number of possible techniques and mechanisms that should be clear to those of skill. By way of non-limiting example, a rotary engagement mechanism can rotate beneath the gladhand gladhand capture flange to cause engagement with the seal.

Note that for some gladhand configurations, an actuable or fixed kickstand (not shown) attached to the main tool body can be employed to provide sufficient clearance between the tool 3100 and the trailer face (3244) for the airline connection plate 2610 to properly actuate into a clamped, sealed orientation relative to the gladhand seal 3210. Note that the connection tool 3100 can use similar motion and operational steps for fixed gladhand, but a change in the timing of movement from an unlocked to locked configuration—for example, becoming locked before engaging/clamping-on the fixed gladhand.

Disconnection of the connection tool 3100 from the gladhand can occur in roughly the reverse order of steps (1)-(7), typically when the trailer has been delivered to a destination and the AV truck is released to perform other tasks.

Figure 33A:
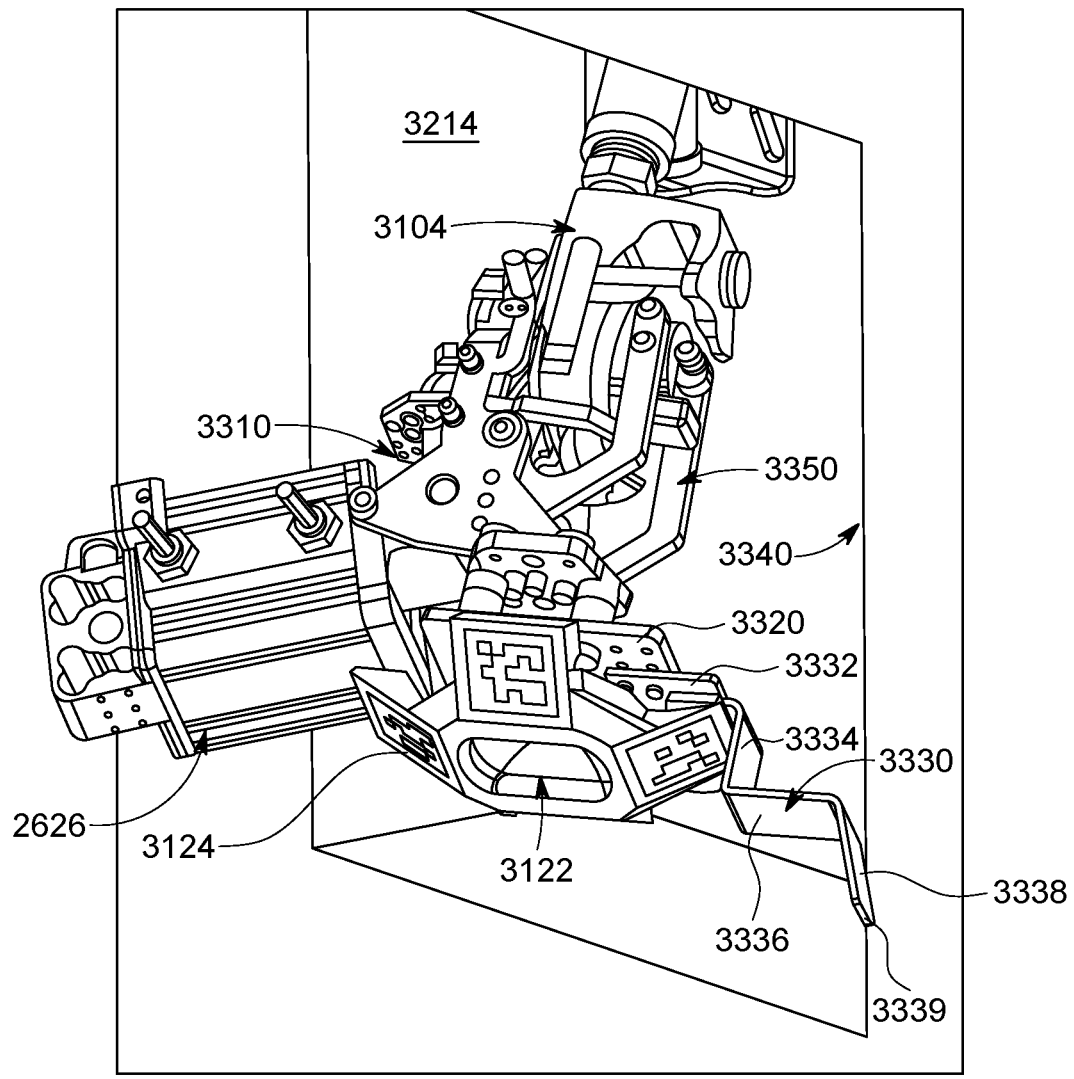
FIGS. 33A and 33B are perspective views of the overall connection tool and active hinge, similar to that shown in FIG. 31, engaging the exemplary spring-loaded gladhand with the use of a kickstand to react on the trailer face and resist full retraction of the gladhand once engaged.
Figure 33B:
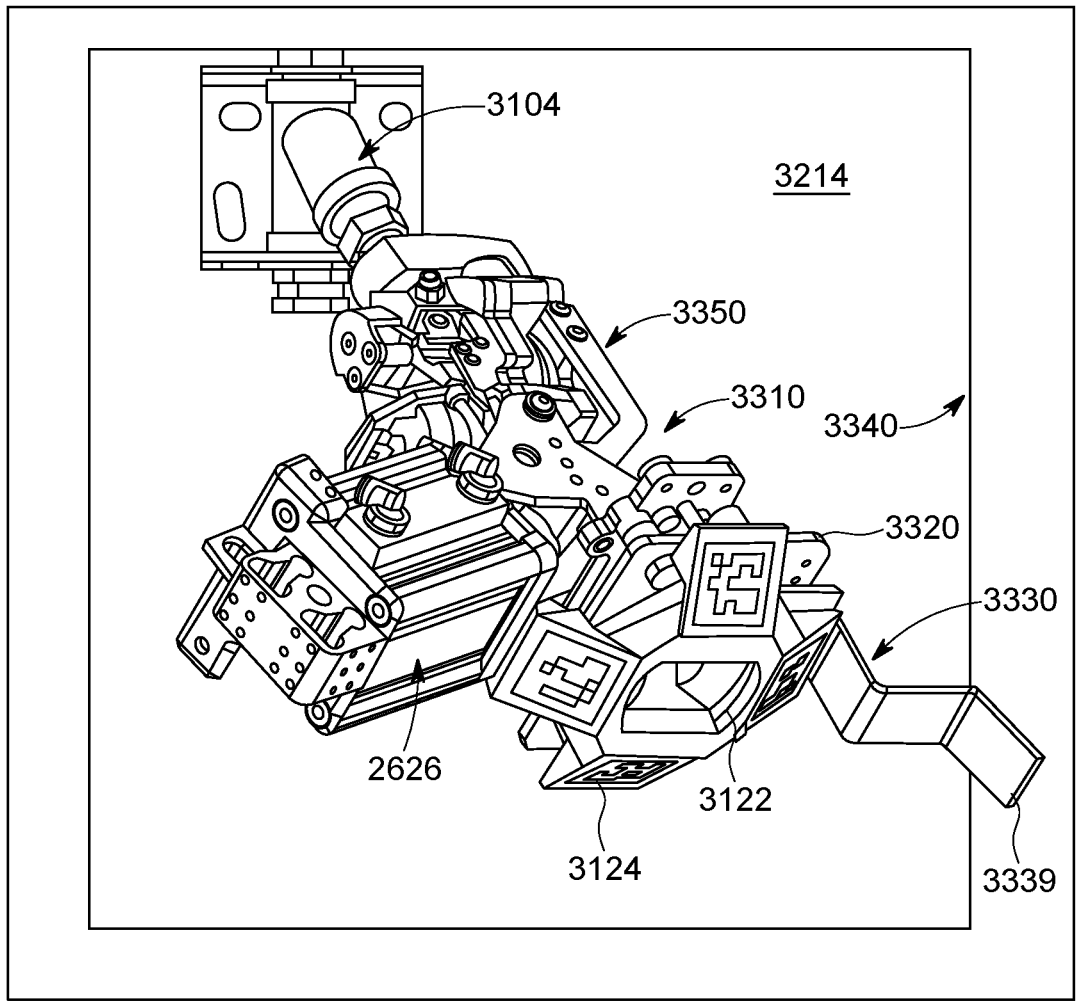
Figure 34:
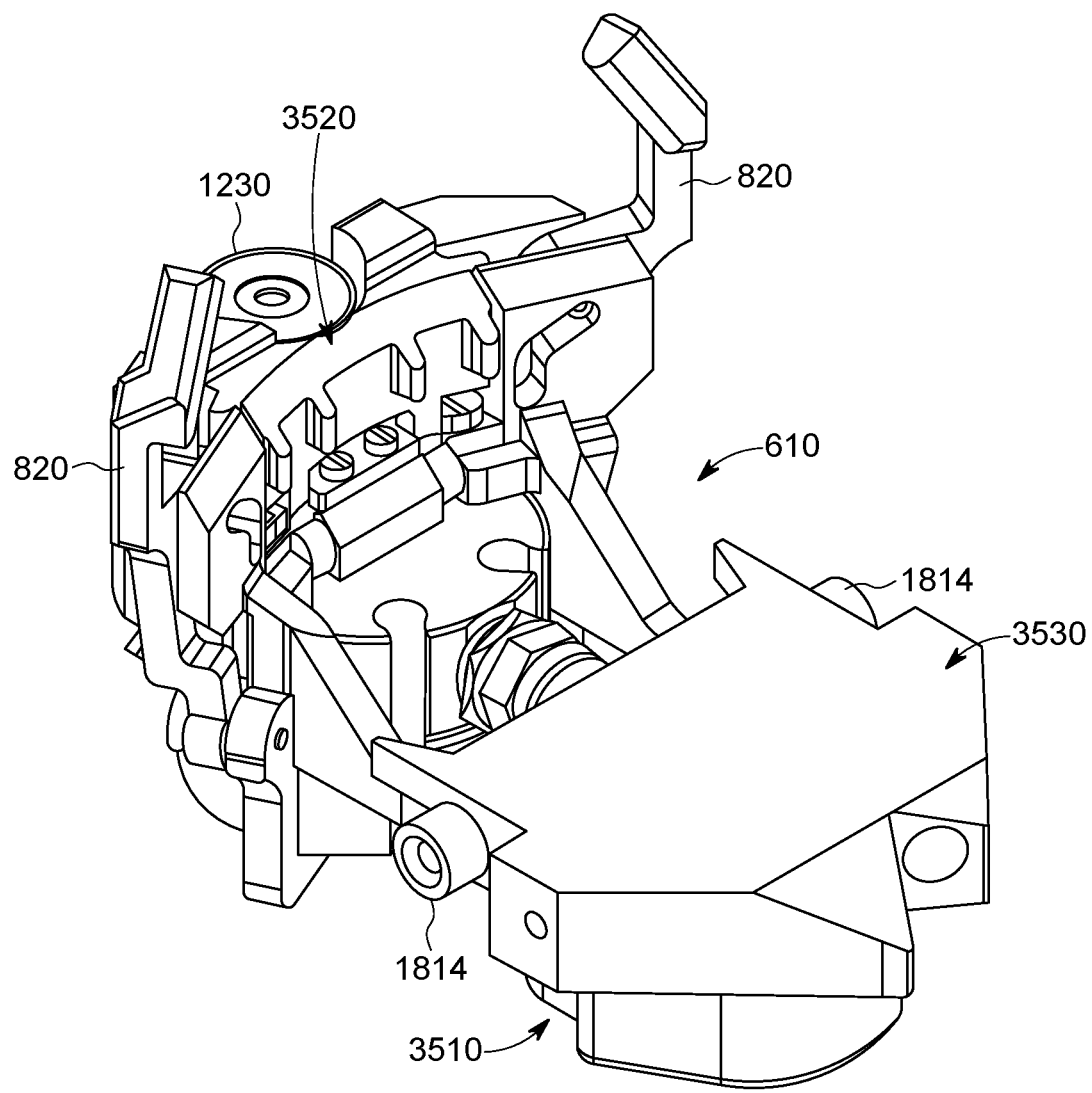
FIGS. 34 and 35 are top-oriented and bottom-oriented a perspective views of the gladhand capture assembly of the connection tool of FIG. 6, showing a passive compliance element thereof, respectively.
Figure 35:
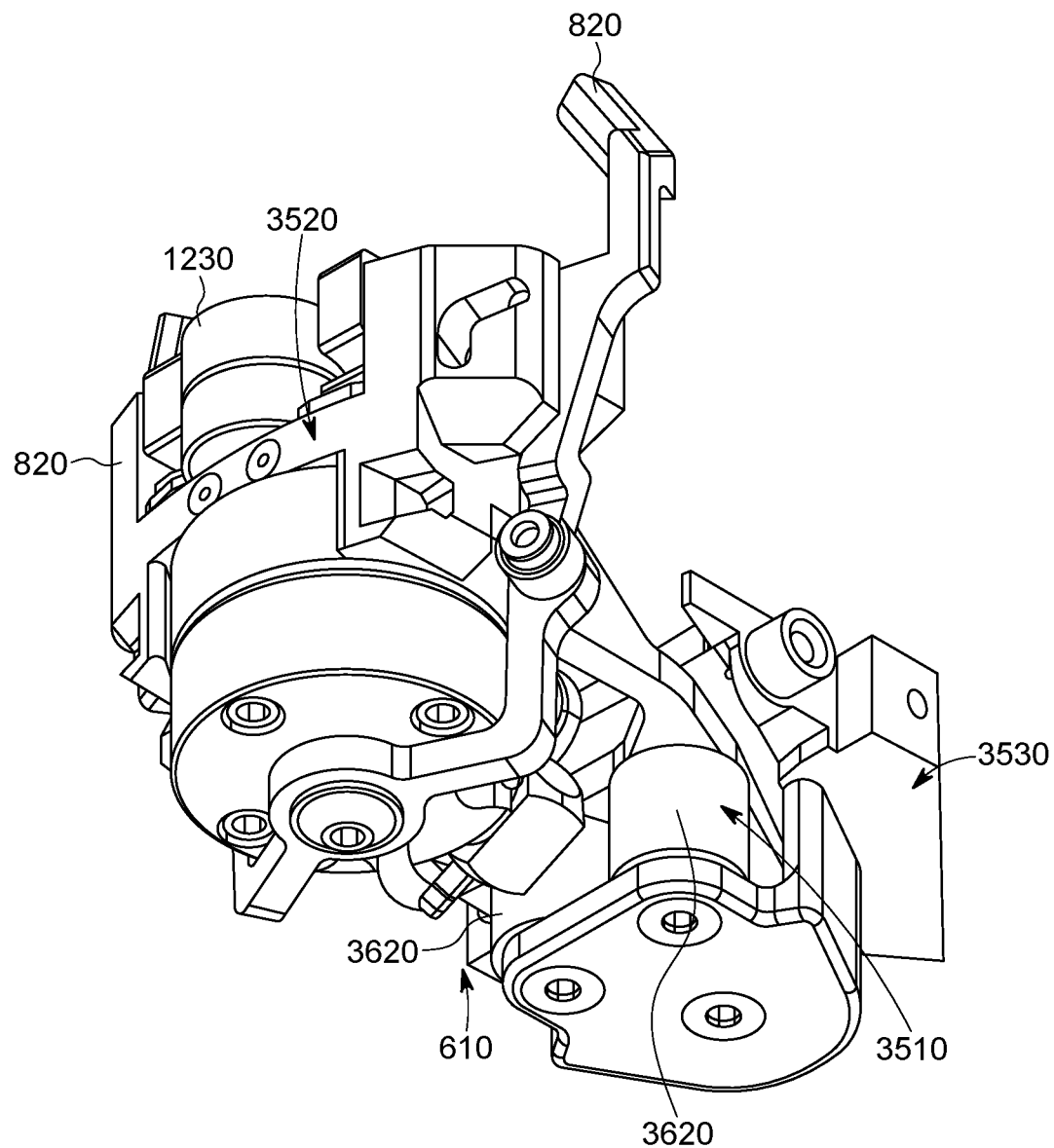
Figure 36:
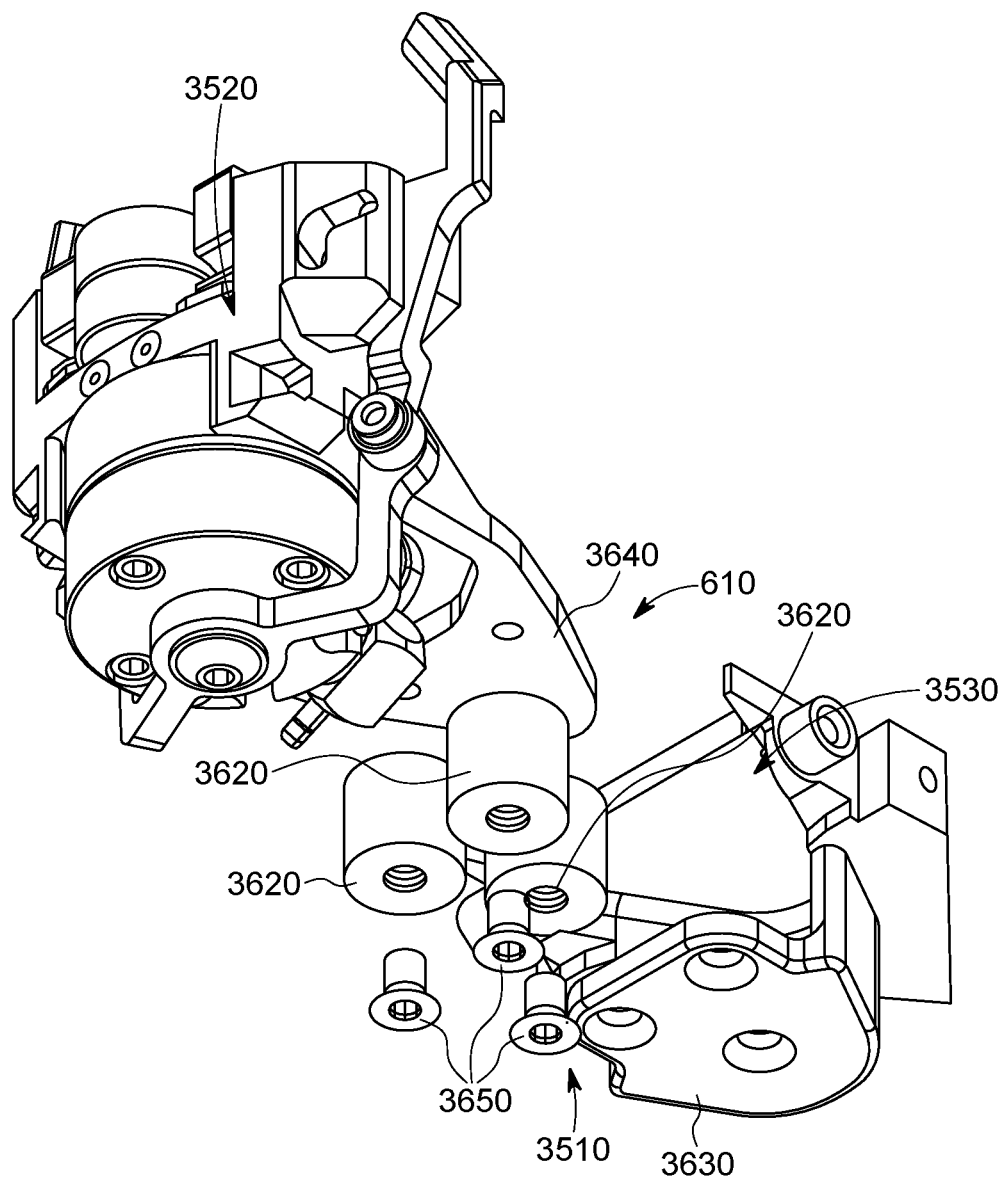
FIG. 36 is an exploded bottom-oriented perspective view of the gladhand capture assembly as shown in FIGS. 34 and 35 showing compliance elements thereof.

FIGS. 33A and 33B show a modified connection tool 3310 (where substantially similar components to tool 3100 above are identified by similar reference numerals), having a kickstand component 3330 mounted on a support plate 3320 for the end effector connection receptacle 3122. The kickstand 3330 is a rigid, folded, metal strip formed from an appropriate material (e.g. steel alloy, aluminum alloy, composite, polymer of appropriate thickness) and finish (e.g. a non-marring finish). The folds define a set of steps 3332, 3334, 3336 and 3338, which collectively extend the end 3339 of the kickstand 3330 outwardly and forwardly with respect to the receptacle 3122. The kickstand 3330 is sized and arranged so that it engages the far edge (opposite the gladhand pivot) 3340 of the enclosure 3214 when the tool 3310 is locked relative to the withdrawn (unretracted) gladhand 3104. Thus, the kickstand 3330 holds the gladhand open against its retracting spring force as it engages edge 3340. It thereby serves to maintain a sufficient clearance between the connection tool and the trailer (enclosure) face, whereby the connection tool is prevented from retracting into the recessed gladhand box on the trailer face, and thereby preventing the robot end effector from re-engaging and retrieving it.

D. Passive Compliance Assembly

FIGS. 34-38 show a passive compliance mounting structure (mount) 3510 for use with the gladhand capture assembly 610 according to an exemplary embodiment. The mount 3510 is operatively connected between the latching tool subassembly 3520 and the fixed connection base subassembly 3530 that engages the main connection tool body (i.e. hinge body 1810) and associated hinge arrangement. The compliance mount 3510 is adapted increase the capture envelope of the latching the tool subassembly 3520. It utilizes a passive compliance elements to account for misalignments between the tool and the gladhand wedge. In this embodiment, there are three elements 3620 arranged in a triangle with a side defined by two elements located adjacent to the latching tool subassembly 3520 and an opposing apex defined by the third element facing toward the connection tool main body. Each element 3620 is secured to each of opposing mounting plates 3630 and 3640 on the connection base subassembly 3530 and latching tool subassembly 3520, respectively. Appropriate fasteners (e.g. screws 3650) can secure the elements 3620 to each plate 3630, 3640. As such, the passive compliance structure 3510 is appropriately located and oriented so as to primarily account for lateral misalignments in the X-Y plane (see FIG. 5), as well as angular misalignments about the Z-axis. It can also account for smaller amounts of angular misalignments along the X and/or Y axes as well. The elements 3620 can be constructed from pseudo-rigid components that elastically deform and reform depending on the tool/gladhand interaction. Appropriate materials can include various stiff elastomers, such as natural or synthetic rubber, neoprene, PVC, etc., having a suitable durometer.

Figure 37:
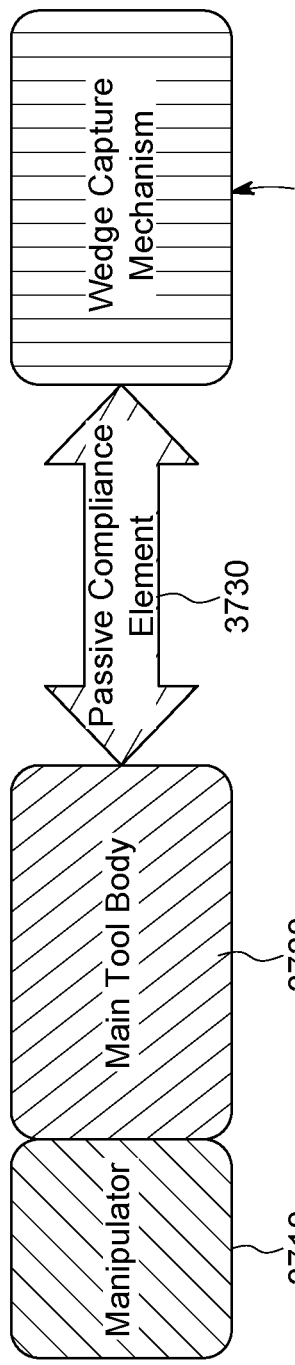
FIGS. 37 and 38 are schematic diagrams showing the orientation of the gladhand capture mechanism relative to the connection tool body and robotic arm manipulator in both direct linear motion and compliance-induced-offsetting motion, respectively, based upon operation of the passive compliance element of FIGS. 34-36.
Figure 38:
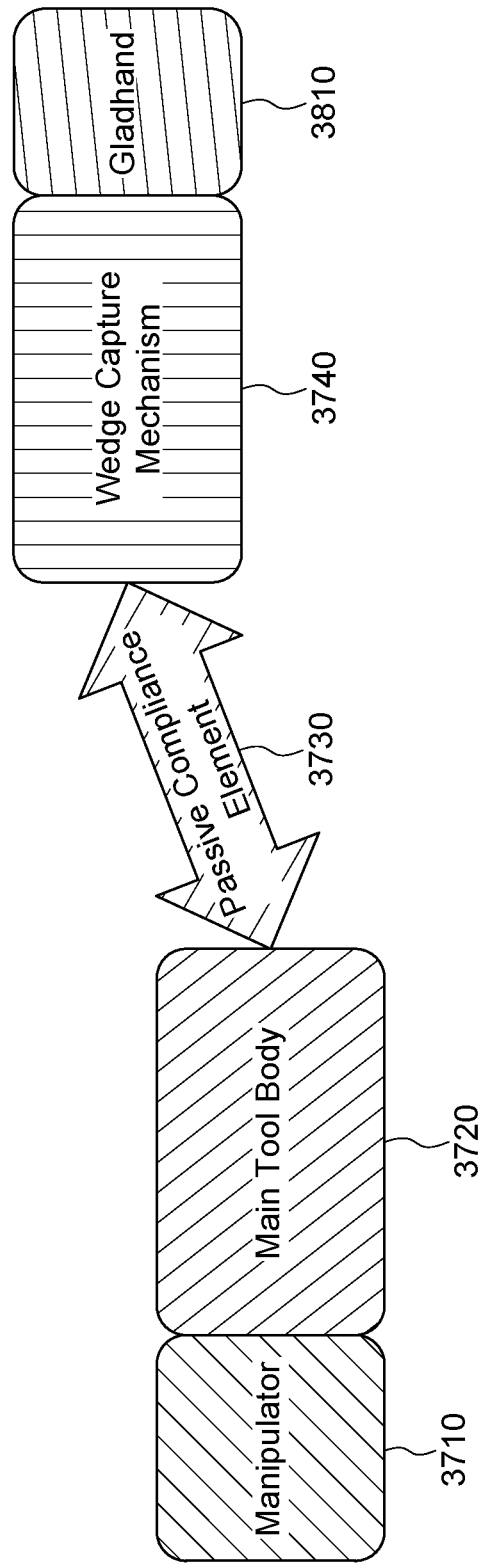

In operation, as shown in FIGS. 37 and 38, the end effector/manipulator (block 3710), with attached main tool body (block 3720) is directed in aligned orientation by the passive compliance elements (double arrow 3730) relative to the gladhand capture assembly. As shown in FIG. 38, where the wedge of the gladhand 3810 is slightly misaligned, axially and/or rotationally, relative to the position and/or orientation of the manipulator 3710 and main body 3720 axes, the compliance elements 3730 allow for relative misalignment as shown. Hence, when latching onto the gladhand 3810, the gladhand capture mechanism 3740 can conform to actual gladhand alignment along one or more gladhand axes, thus avoiding breakage of the assembly or a poorly sealed connection. Once the end effector/manipulator 3710 releases the main tool body, it can become approximately realigned relative to the gladhand capture assembly 3740, with deforming stress removed from the elements 3730.

Figure 39:
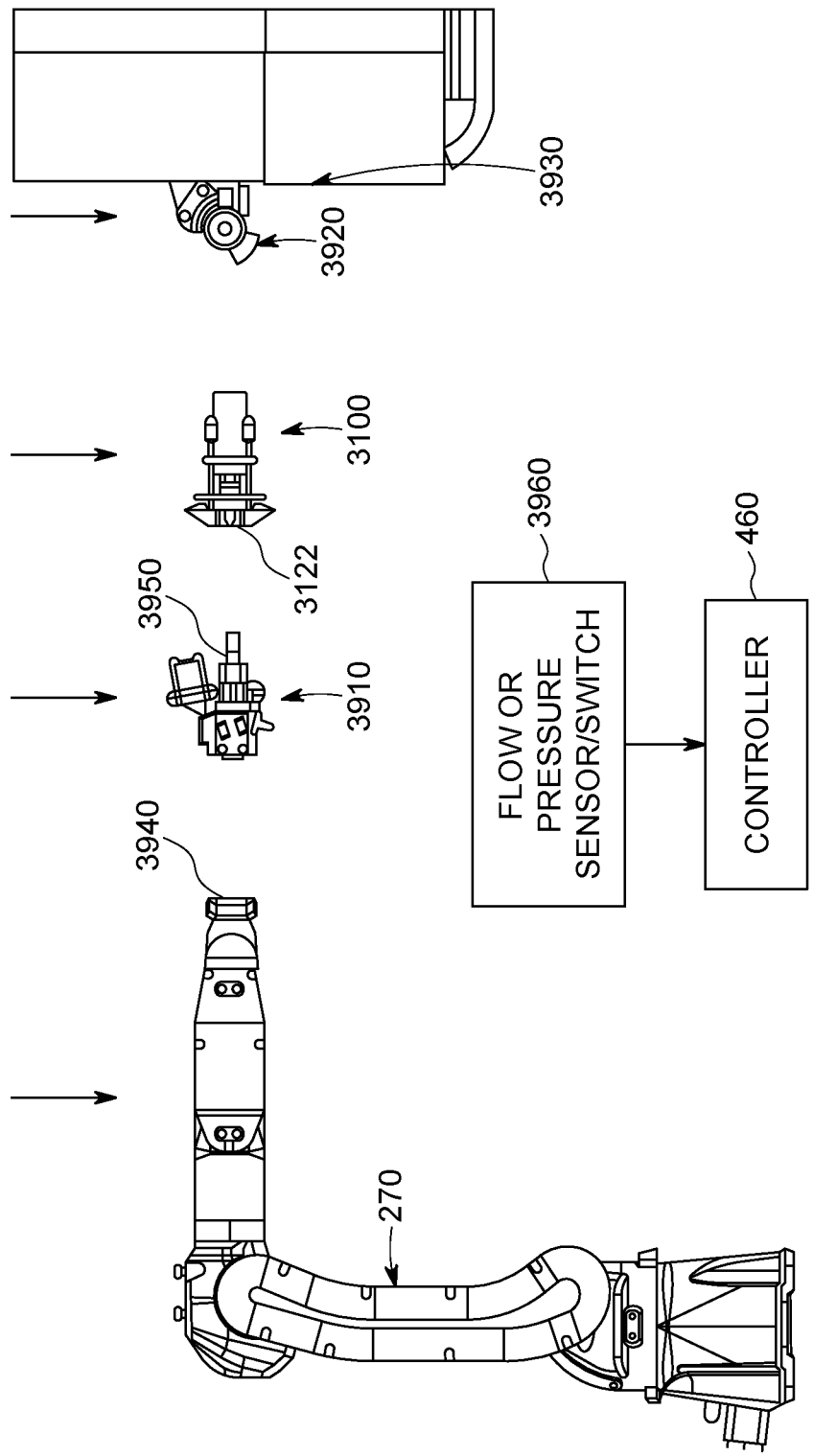
FIG. 39 is an exploded side view of the trailer connection system according to an illustrative embodiment, arranged with respect to an exemplary trailer front having a fixed gladhand.

Note that in addition to, or as an alternative to, providing compliance to the connection tool/gladhand capture assembly, as described above, compliance can be built into other elements of the overall robotic connection arrangement. As shown in the overview of the (adapterless) connection system of FIG. 39, which show, in exploded view, the AV truck-mounted robot arm 270, end effector/manipulator 3910, connection tool 3100 and exemplary (e.g. fixed) gladhand 3920 on a trailer front 3930.

A passive or active compliance functionality can reside in any of the above components, including, but not limited to the robot arm, itself. Such compliance mechanisms can be active (involving sensors and feedback-based control), or passive (involving elastic structures in the system). Further examples are provided below.

As noted, the robotic system 270 can be actively compliant. With an understanding of the motor characteristics in each joint, it is possible to back-calculate the load applied at the end of the arm. As the attached robotic end effector/manipulator 3910 moves to make a connection it can continuously monitor and move to reduce forces in undesirable directions. For example, if the robot is performing a linear motion, it can sense and recognize any non-axial force that is a product of binding. In response, the arm control process (or)/controller 460 can adjust the arm's orientation to reduce the non-axial loads. Note that the robot and/or other components described herein can also include a compliance lockout feature and/or mechanism. This can be provided as an electronic control on actuators that allow for compliance or can be a physical lockout—for example an actuated (e.g. solenoid) pin that engages a detent to secure the interconnection between flexibly connected components. This enables use of the tool in higher precision operations.

Since it is contemplated that an off-the-shelf (relatively unmodified and commercially available) manipulator can be employed in various embodiments, it is often desirable to incorporate compliance into the end effector/manipulator stack. The end effector stack 3910 includes any components that are permanently affixed to the endpoint 3940 of the robotic arm 270. Active compliance can be added to the end effector stack 3910 by placing a multitude of sensors in-line with the robotic manipulator. One of these sensors can be a commercially available force-torque sensor, such as those provided by ATI Industrial Automation, Inc. of Apex, NC. By way of example, a force-torque sensor can provides feedback in up to 6 total directions allowing real-time adjustments to manipulation trajectories to minimize binding. It is also contemplated to provide compliance to the end effector using a commercially available collision sensor to detect if the system is misaligned. A collision sensor provides feedback if the lateral offset of the system has moved beyond a desired threshold. If the threshold is reached, the system controller 460 directs the arm 270 to move in the reverse direction to relieve possible binding.

Alternatively, or additionally, it is contemplated that compliance can be incorporated into the end effector stack with a passive compliance device. Such compliance device can comprise an elastic suspension system that allows for misalignment in one or more (or all) directions. The integration of a compliance device can allow the end effector to move when making connections and reduce the chances of binding. As compliance is often only desired during an interaction with the trailer, a mechanism with a compliance lockout feature can be more desirable, rather than a fully passive compliance device. It is also contemplated that the connection tool gripper 3950, which engages the receptacle 3122 of the connection tool 3100, can incorporate the compliance. By way of example, the gripper 3950 can employ a soft gripper structure with built-in compliance using an elastomeric material for its overall construction, or the gripper can include elastomeric pads that can conform to external forces.

E. Connection Verification

After completing a connection with the trailer, it is desirable to confirm whether a proper and relatively leak-free connection has been achieved by the connection system. The verification can encompass, one or multiple of the following techniques:

(1) Tug Test—Mechanical Engagement

After the robotic system makes a connection to the trailer it can perform a light "tug test" to verify proper engagement. If the tool has a force or torque threshold to disconnect from the trailer, the robotic system can apply a lower amount of force or torque on the tool and monitor that the tool has not moved.

(2) Air Sensing—Truck Engagement

It is possible to determine whether a successful air connection has been made by adding sensors in-line with the AV truck air supply. There are multiple methods for which this can be achieved, including, but not limited to:

(a) Pressure Sensor

A pressure sensor (see 3960 in FIG. 39) can be connected to the airline that connects the truck to the tool on the trailer. After the robot completes a connection, the system controller 460 can request air to be applied to the trailer. The pressure should typically drop as the airflow passes through the system and into the trailer. If the pressure stabilizes, then it can be assumed a proper connection was achieved. If the pressure does not stabilize or is near zero, then it can be assumed there is a leak in the system, most likely attributed to a poor connection.

(b) Pressure Switch

A pressure switch (see 3960 in FIG. 39) can be adapted to change state based on set pressure. The pressure can be set to the value required for brakes to release, and be continuously monitored thereafter. If the switch reports a value above the desired threshold for a predetermined amount of time, it can be assumed a successful connection was made.

(c) Flow Sensor

A flow sensor (see 3960 in FIG. 39) can detect proper engagement by monitoring flow after air is supplied to the trailer. A proper connection would allow detection of airflow for a limited amount of time as the trailer system equalizes. The flow rate should thereafter taper down to (approximately) zero once the pressure equalizes. A continuous flow would, conversely, indicate a leak and a poor connection.

VI. Additional Connection Aids

Figure 40:
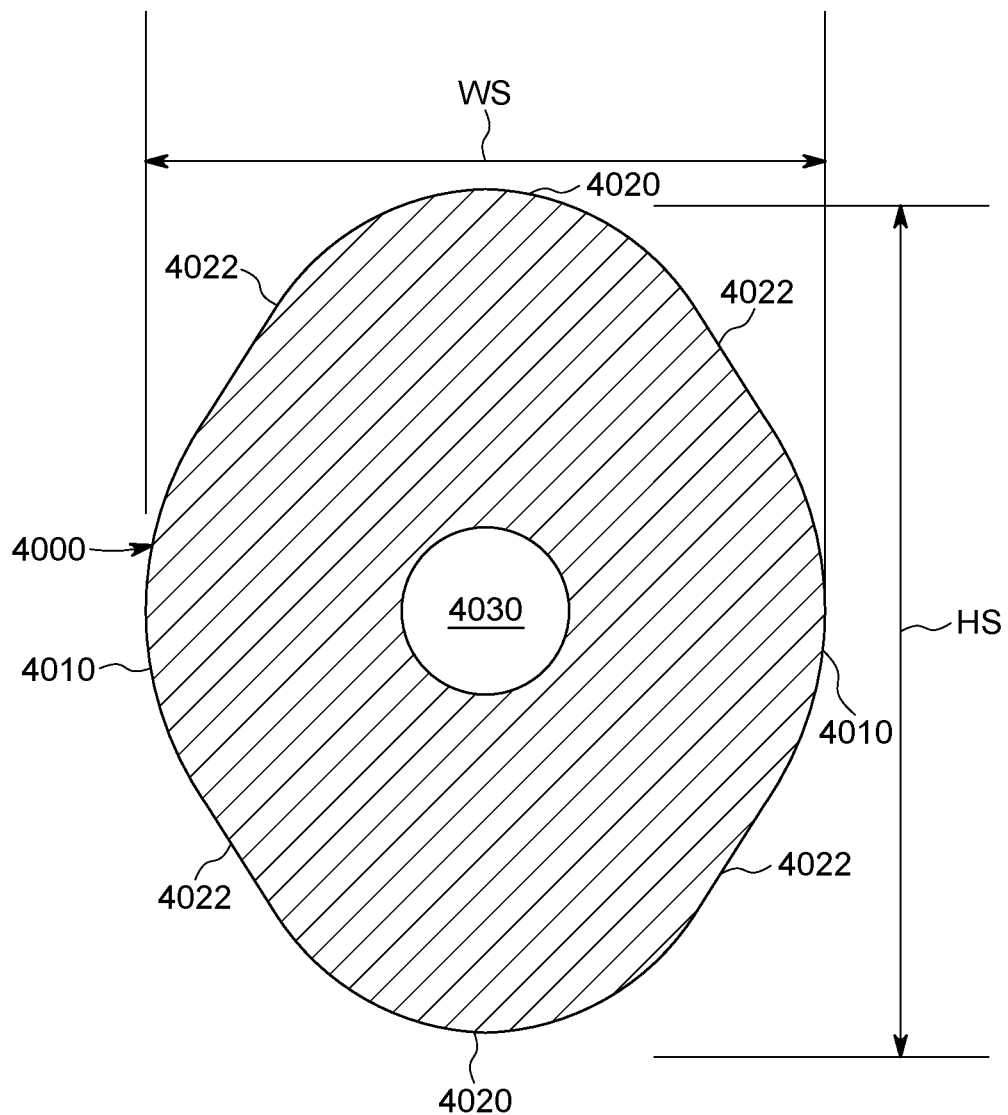
FIG. 40 is a plan view connection tool seal that defines a modified oval so as to accommodate various degrees and distances of misalignment of the tool relative to the gladhand, while maintaining a pressure connection therebetween.
Figure 41:
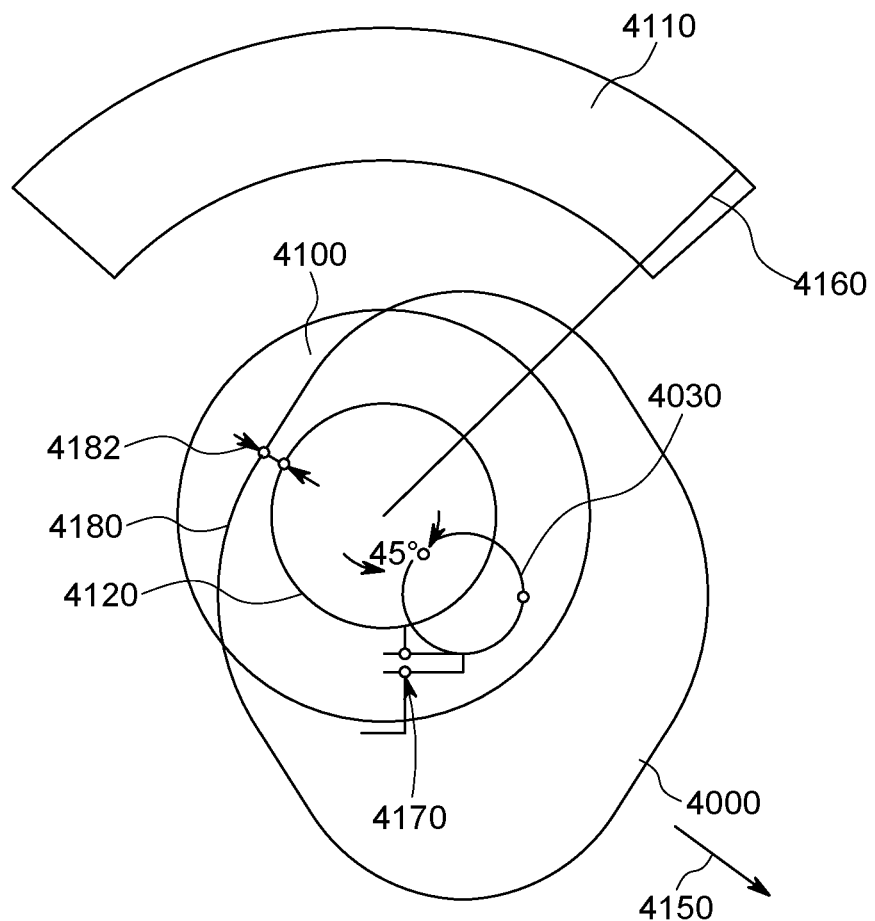
FIG. 41 is a plan view showing the maintenance of sufficient overlap between the seal of FIG. 40 and an exemplary gladhand seal in the presence of 45-degree misalignment along both a lateral and lineal direction.
Figure 42:
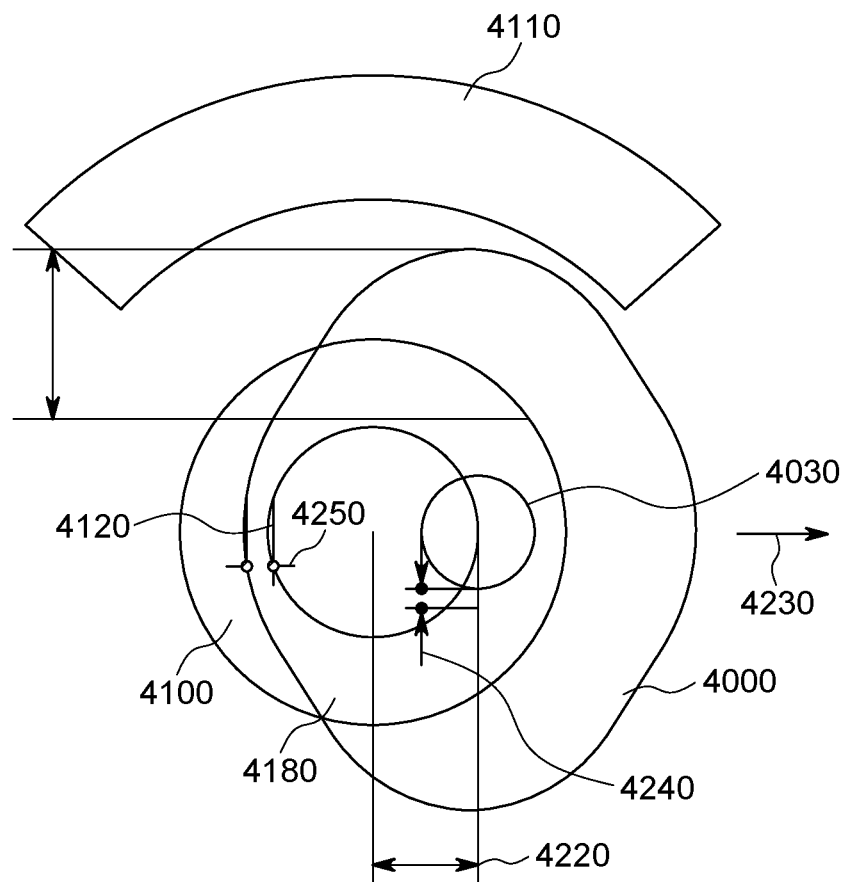
FIG. 42 is a plan view showing the maintenance of sufficient overlap between the seal of FIG. 40 and an exemplary gladhand seal in the presence of misalignment along a lateral direction.
Figure 43:
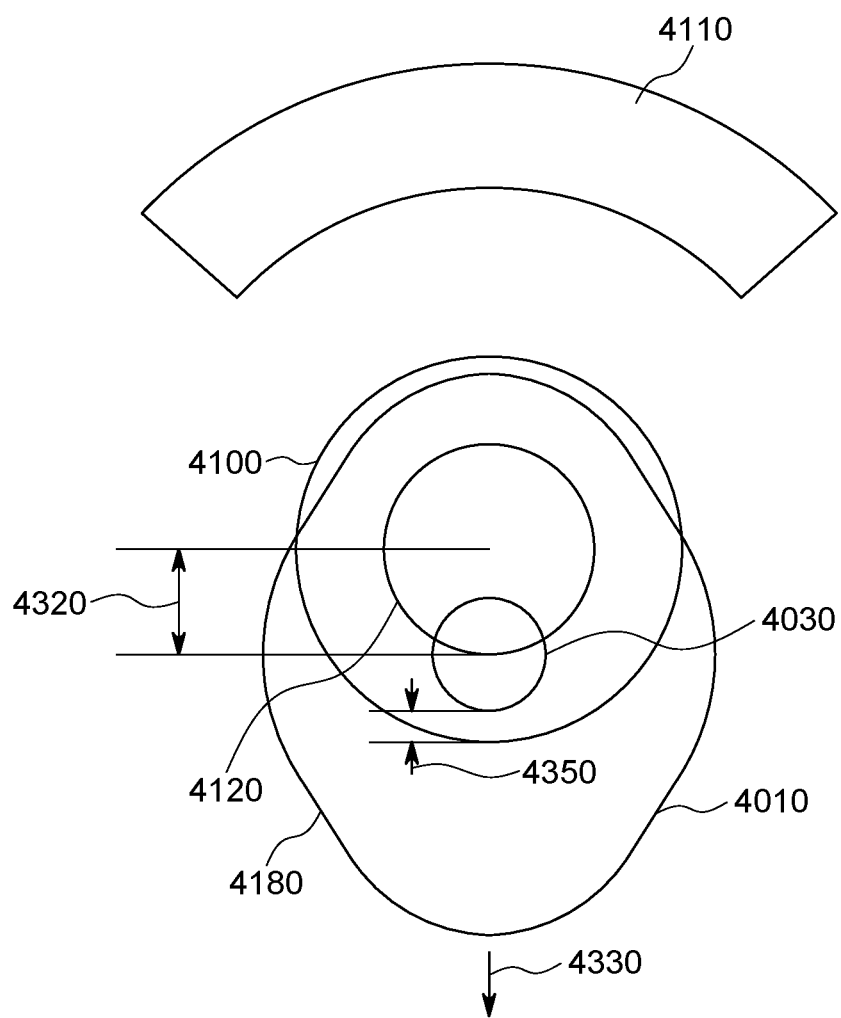
FIG. 43 is a plan view showing the maintenance of sufficient overlap between the seal of FIG. 40 and an exemplary gladhand seal in the presence of misalignment along a lineal direction.

There are scenarios in which the gladhand is not perfectly aligned with the tool before clamping. In these scenarios, there is a chance that misalignment will prevent adequate sealing with the gladhand gasket, and result in air leakage that prevents adequate pressurization of the brake system. FIGS. 40-43 show a custom seal for use with the swinging airline connection plate assembly (see 2610 in FIG. 26 above) of the connection tool. This seal 4000 optimizes the area for which the gladhand gasket/seal's air orifice is exposed to the connection plate air channel while maintaining a positive between the components when clamped together. FIG. 40 shows a version of this seal 4000 in plan view. The seal 4000 is formed from soft urethane, synthetic or natural rubber, or any other acceptable elastomer. The shape of the seal defines a modified oval as shown with arcuate edges 4010 and 4020 of each of four ends. In an embodiment, the arcuate ends 4010, 4020 define a radius of approximately 0.6-0.6 inch. The shape defines a maximum height HS that is greater than the width WS. These dimensions are highly variable (e.g. HS can be 1.75-2 inches and WS can be 1-1.5 inches). To define the elongated shape of the seal 4000, the heightwise arcuate ends 4020 are separated from the widthwise arcuate ends 4010 by substantially linear segments 4022 of appropriate length. A central orifice 4030 is provided with a diameter of between 0.3 and 0.4 inch. FIGS. 41-43 show the seal 4000 superimposed over a typical gladhand seal 4100 and corresponding wedge 4110, in which the outer perimeter of the gladhand seal 4120 is also depicted. The seal's (4000) dimensions are defined to enable overlap between connection tool and gladhand air orifices as well as the complete overlap of sealing surfaces surrounding these air orifices. Thus, as shown in FIG. 41, the seal 4000 can be offset (arrow 4150) significantly in a 45-degree (angle 4160) translation relative to the gladhand seal 4100. As shown, the perimeter of the seal orifice 4030 maintains overlap with the seal by an offset distance 4170, while the outer perimeter 4180 of the seal 4000 also maintains needed overlap distance 4182 to maintain a pressure connection that is relatively leak free. In FIG. 42, a lateral (widthwise) offset (arrow 4230 and distance 4220) of (e.g.) 0.3 to 0.4 inch still allows sufficient overlap 4240 between the orifices 4030 and 4120 of the seal 4000 and gladhand seal 4100, respectively, to maintain a pressure channel. The dimensions of the seal 4000 also ensure a minimal overlap 4250 between the seal perimeter 4180 and the perimeter of the gladhand seal orifice 4120. Further, as shown in FIG. 43, a lineal (heightwise) offset (arrow 4030 and distance 4120) of (e.g.) 0.3 to 0.4 inch still allows sufficient overlap 4350 between the orifices 4230 and 4220 of the seal 4000 and gladhand seal 4100, respectively, to maintain a pressure channel, while also allowing the seal perimeter 4180 to maintain an overlap relative to the perimeter of the gladhand orifice 4120. More particularly, the size of the inner and outer surfaces of the seal 4000 are chosen so as to provide a minimal seal overlapping surface of at least (e.g.) 1/16 (0.06) inch in an exemplary embodiment, but other distance can be defined in various alternate implementations, which are deemed generally sufficient to maintain a sealed pressure channel.

VII. Tool Stowage and Locked/Unlocked Position Change

Reference is now made to FIGS. 44-54, which show a tool stowage arrangement or stand 4500 (FIG. 45), general theory of operation (diagrams in FIGS. 44-44B), and operational examples in association with a version of the connection tool 4600 described herein. The stowage arrangement 4500 can be located at any position on the AV truck chassis within the operational range of the robotic end effector. It is generally placed so it will not interfere with normal operation of the truck when hitched, nor will it block passage of the end effector when performing connection operations. The connection tool 4600 includes a pair of wedge grasping fingers 820 as described generally above, which are part of the gladhand capture assembly 610. The gladhand capture assembly 610 moves between a locked and unlocked position/state relative to the underlying tool structure/body, as described above (see FIGS. 21-25), under bias of the bistable spring arrangement 2110 and associated hinge pivots and stops. It is contemplated that the stowage assembly can be part of a plurality of adjacent (or separated) stowage arrangements that each contain one or more specialized connection tool(s). For example, other stowage arrangements on the AV truck can contain specialized tools for fixed gladhands, proprietary and/or multi-port connections and/or electrical connections with respect to either (or both) emergency and service lines of the trailer.

In order to accommodate connections to various gladhands in a multitude of configurations, the system should prepare the tool, and associated gladhand capture assembly for connection in one of its two states (locked or unlocked). In operation, a machine vison (or other visual or sensor-based) perception step can be (optionally) executed on the trailer gland hand to determine the connection and/or gladhand type—e.g., fixed, rotating, electrical receptacle, etc.— before the desired tool is retrieved from its stowed position in the stowage arrangement. It is contemplated that the exemplary embodiment of the connection tool employs a passive hinge and bistable spring assembly to move between the locked and unlocked positions/states. That it, the structure is free of any independent actuation of the hinge by an appropriate powered mechanism. In such cases, the stowage arrangement 4500 is adapted to assist in moving the gladhand capture assembly into the desired state to engage and connect with the particular gladhand type being engaged.

With reference again to FIG. 45, the stowage arrangement/stand 4500 includes a channel-shaped base 4510 with opposing side walls 4512, a bottom 4514 adapted for bolting (holes 4514) onto a supporting surface on the truck chassis and a cross web 4518 between side walls that acts as a back wall for the stand. The side walls 4510 and web 4518 collectively define a channel that partially surrounds the tool when stowed therein. By way of non-limiting example, the channel is oriented at a non-perpendicular angle 4710 (FIG. 47) relative to the vertical. This angular orientation is for illustration purposes only, and can be widely varied, and/or the channel can be vertical in alternate embodiments. Likewise, the channel can be replaced with an open top box that is sized and arranged to surround all sides of the inserted tool. The tops 4520 of the sidewalls 4512 include a set of posts 4522 that support a U-Shaped frame 4530. The posts 4522 can be optionally spring-loaded (with coaxial springs as shown) to absorb downward force exerted by the tool 4600, when engaged, through downward translation of the frame 4530. As shown, the posts 4522 are constructed using an elongated bolt with opposing nut, and a spring with spacer around the bolt's shaft. The materials and structure of the post is highly variable in alternate embodiments or can be substituted with a different structure. The frame 4530 includes a pair of opposing guide pins 4532 with tapered ends. The pins 4532 act to register the tool 4600 with respect to the stowage stand 4500, when stowed, and their function is described further below. A lever assembly 4550, with roller bearing tip 4542 interacts with a position sensor 4544 that provides a position signal to the system processor. Note that the sensor 4544 can provide a variable signal depending upon relative motion into with respect to a stowed position, or according to this exemplary embodiment, provides an on/off signal based upon whether or not the tool is fully stowed. The lever assembly 4540 moves in response to insertion and removal of the tool 4600 relative to the stowage stand 4500 to assist in guiding robot arm operation and confirm tool position/status.

The stowage stand 4500 has been designed to allow for a configuration change of the state of the tool 4600 that is dependent on the state of the latching fingers 820 when it is retracted from the stow stand. This is accomplished through unique features on the stow stand that interact with the tool latching fingers 820 that cause the tool to change state when retracted. The transverse web 4518 of the stand 4500, thus, includes a fin assembly 4550 that is bolted (or otherwise attached) to the web 4518, as shown. It defines resides along the same acute angle 4710 relative to the vertical, which, as described below assists in the action of magnets 4560 relative to the latching fingers 820 as also described below. The fin assembly 4550 includes a vertically oriented central fin 4552 having an undulating surface profile that is adapted to engage the gladhand capture assembly 610 as the tool is lowered vertically by the robot end effector into engagement with the undulating fin surface. This engagement causes the gladhand capture assembly 610 to rotate about its pivot and bistable spring arrangement from the unlocked position, into a locked position, which is the default position during for the gladhand capture assembly during stowage.

Reference is made to FIG. 44, and FIGS. 46-51, showing the generalized stowage operation, with movement of the gladhand capture assembly (also termed "latch(ing) mechanism"). As shown, the tool 4600 resides in an overlying state 4410 with the gladhand capture assembly/latching mechanism shown in an unlocked configuration. This is further depicted in Fig, 46, where the robot manipulator arm end effector (not shown) has moved the tool from a trailer front, or other location, to the depicted orientation. The robot/system controller can be programmed with the coordinates for the stowage stand 4500 and/or can find the stowage stand via sensors, including vision system recognition of the stand's shape and/or fiducials that represent stand coordinates.

Figure 47:
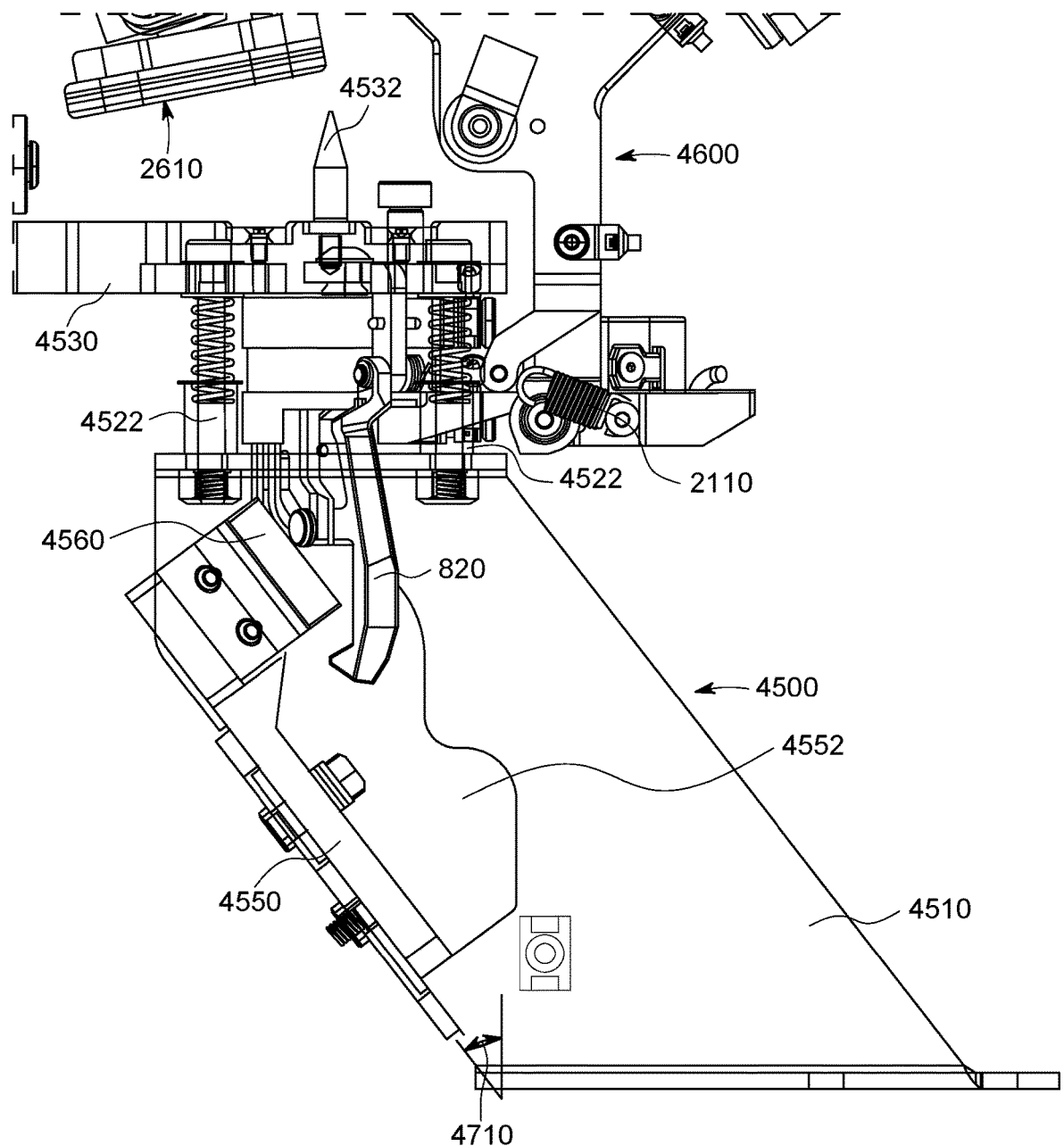
FIG. 47 an exposed side view of the connection tool and stowage stand as shown in FIG. 46 moved downwardly into contact with the stowage stand.
Figure 48:
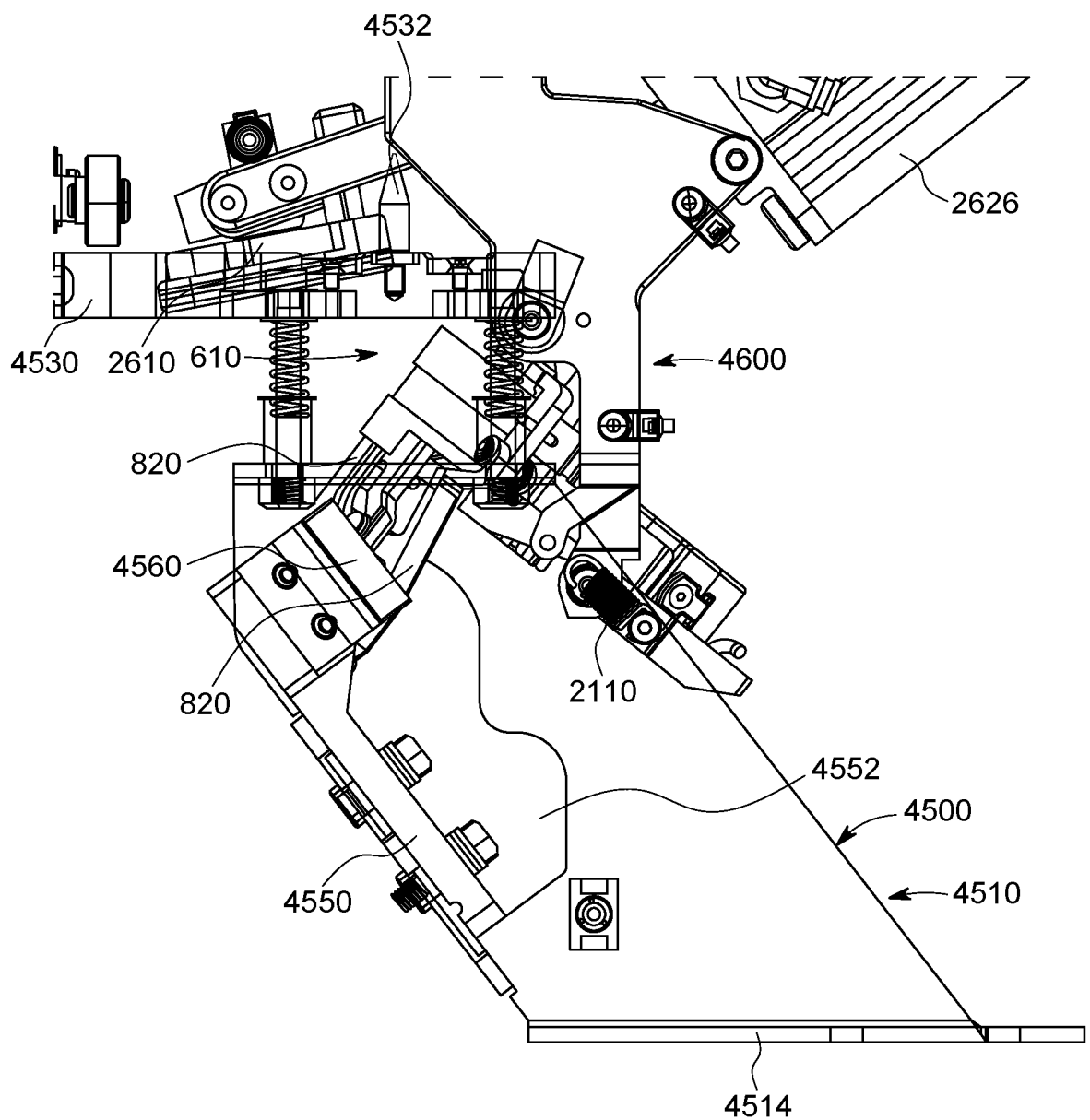
FIG. 48 is an exposed side view of the connection tool as shown in FIG. 47 moved further downwardly so that the rib assembly in the stowage stand passively biases the gladhand capture assembly from the unlocked state into the locked state.
Figure 49:
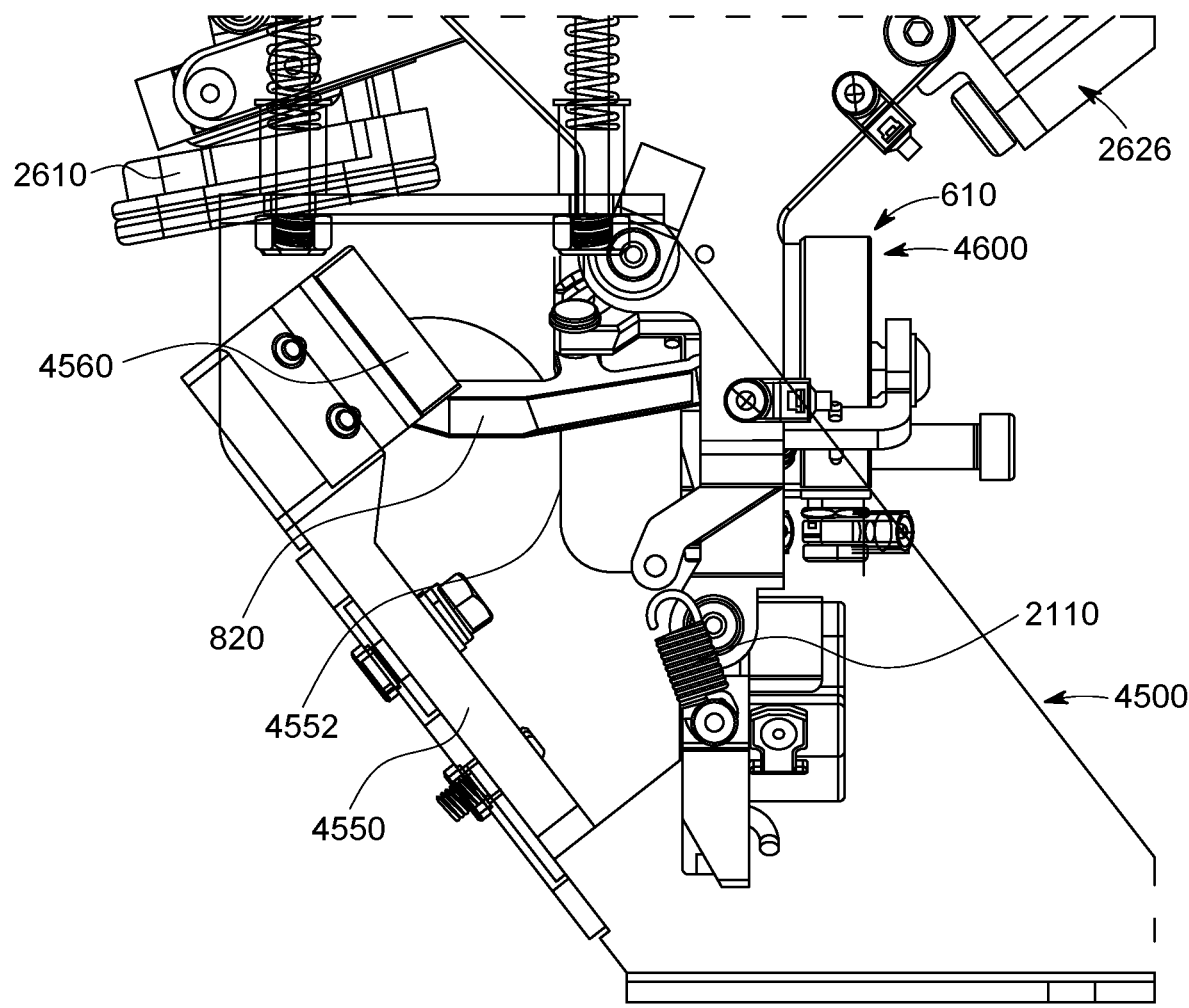
FIG. 49 is an exposed side view of the connection tool as shown in FIG. 48 moved into a fully stowed position in the stowage stand with the gladhand capture assembly in the locked state.

The robot arm then moves the tool vertically downward (arrow 4454 in FIG. 44), as also shown in FIGS. 47 and 48, with the latching fingers 820 straddling the fin 4552. As the gladhand capture assembly/latching mechanism 610 engages the fin surface, it causes the assembly 610 to rotate (curved arrow 4420 in FIG. 44), under bias of the pivot and bistable spring arrangement, into a locked configuration. This is the final stowed state that is further depicted in FIG. 49. The surface of the fin engages the profile of the gladhand capture assembly as shown.

Figure 50:
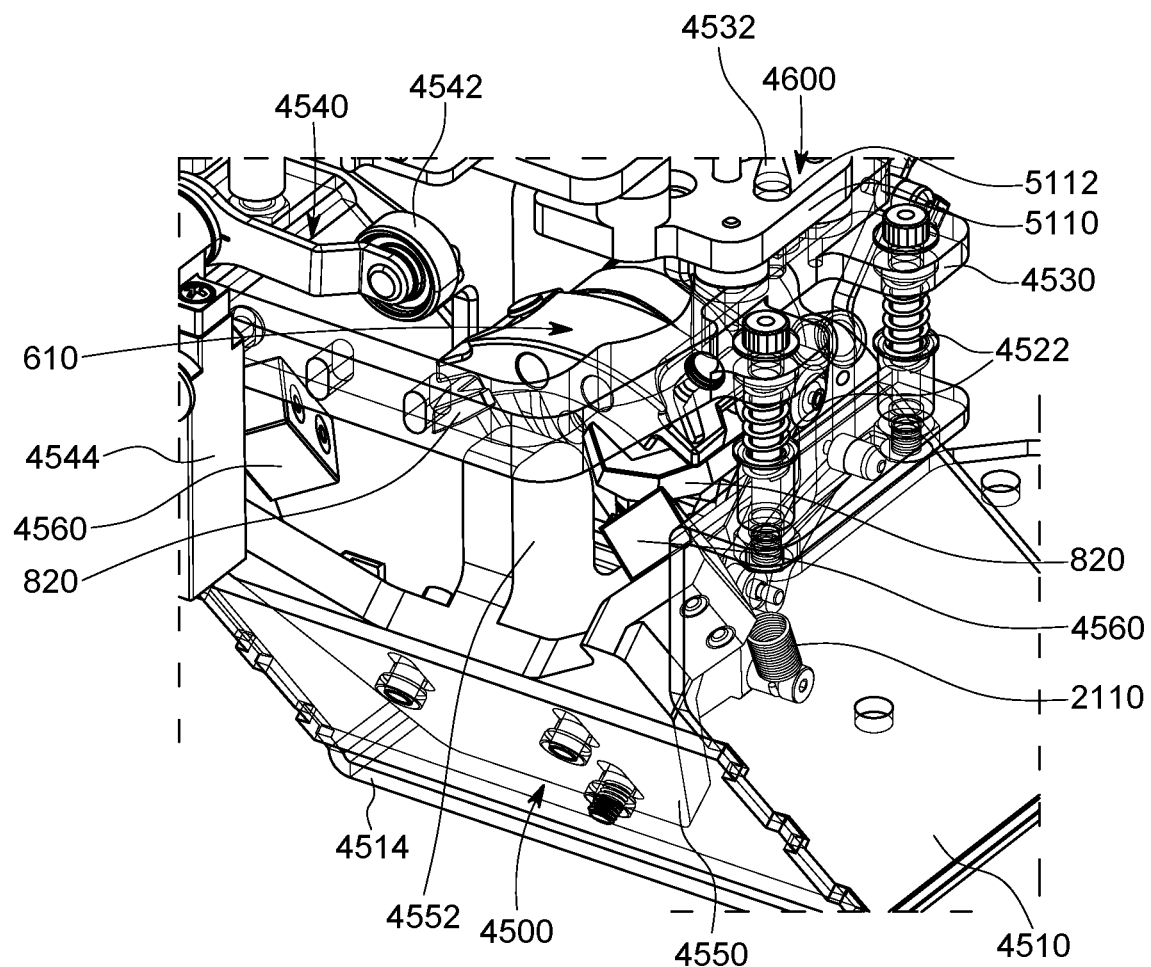
FIG. 50 is an exposed, fragmentary perspective view of the gladhand capture assembly stowed in the stowage stand as shown in FIG. 49, with latching fingers in a closed/latched state.
Figure 51:
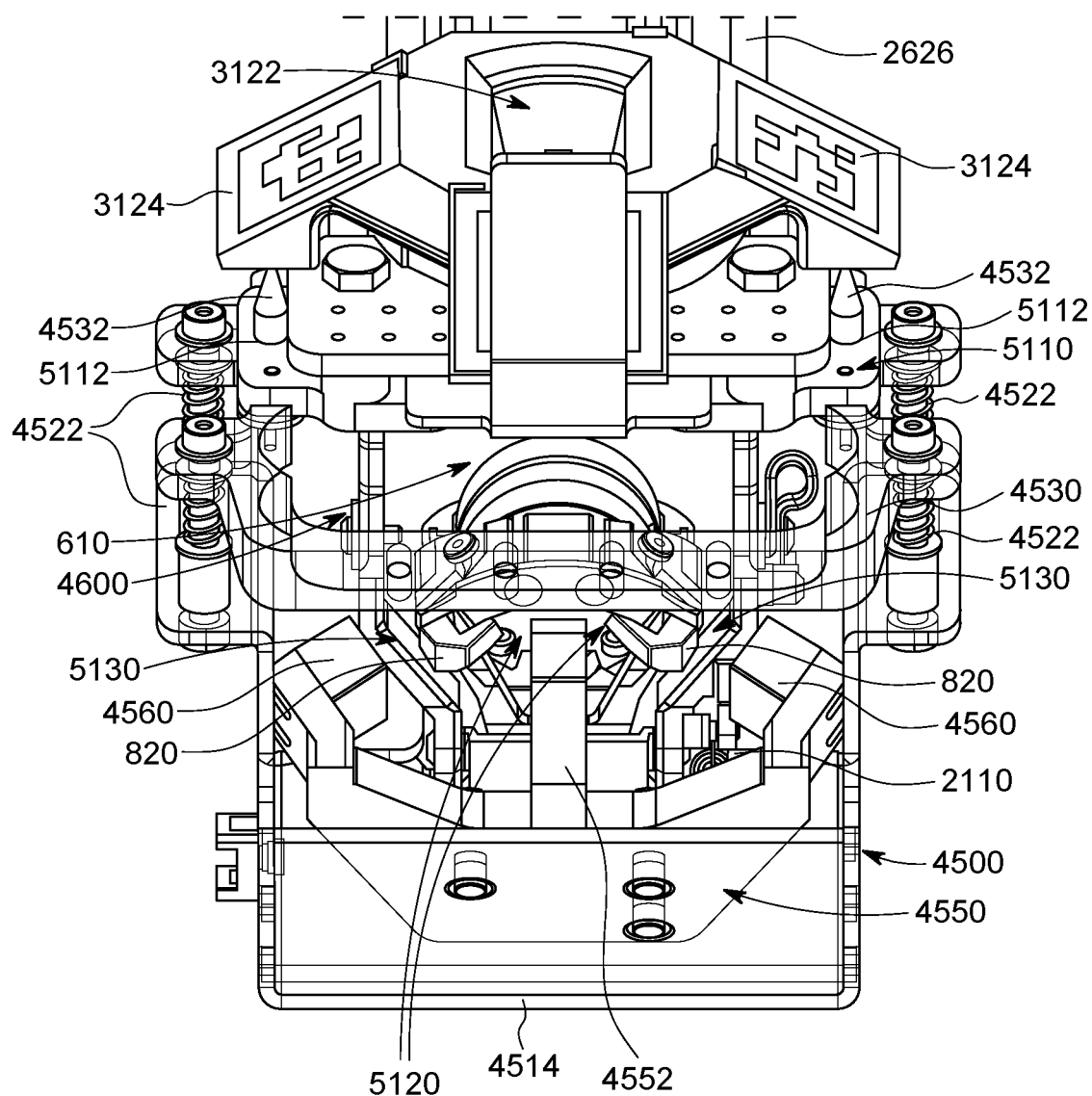
FIG. 51 is an exposed frontal view of the gladhand capture assembly stowed in the stowage stand as shown in FIG. 50, with latching fingers in a closed/latched state.

With reference to FIGS. 50 and 51, the stowed orientation, depicting the connection tool 4600 fully engaged by the stowage stand 4500. As shown, the latching fingers 820 of the gladhand capture assembly 610 are in a closed/latched state, where they define a gap 5120 (FIG. 51) relative to each respective, facing sidewall of the rib 4552. Likewise, the fingers 820 are spaced apart by a gap 5130 with respect to an adjacent magnet 4560. In this manner, the fingers 820 are out of interfering contact with both the rib 4552 and the magnets 4560. Note that a base plate 5110 supports the end effector receptacle 3122 (and associated fiducials 3124) with respect to the remaining connection tool frame. The base plate 5110 includes through-cut holes 5112 that are aligned with respective pins 4532 on the U-shaped frame 4530. During stowage, the robotic manipulator arm aligns the base plate holes 5112 with the pins 4532, and the plate thereby becomes registered with the frame 4530 and underlying stowage stand in the stowed state. Note that the holes 5112 can include appropriate lead-ins (countersinks) that assist in guiding the pins into engagement. Once engaged, appropriate magnets are used to retain the stowed tool relative to the stand.

Figure 44:
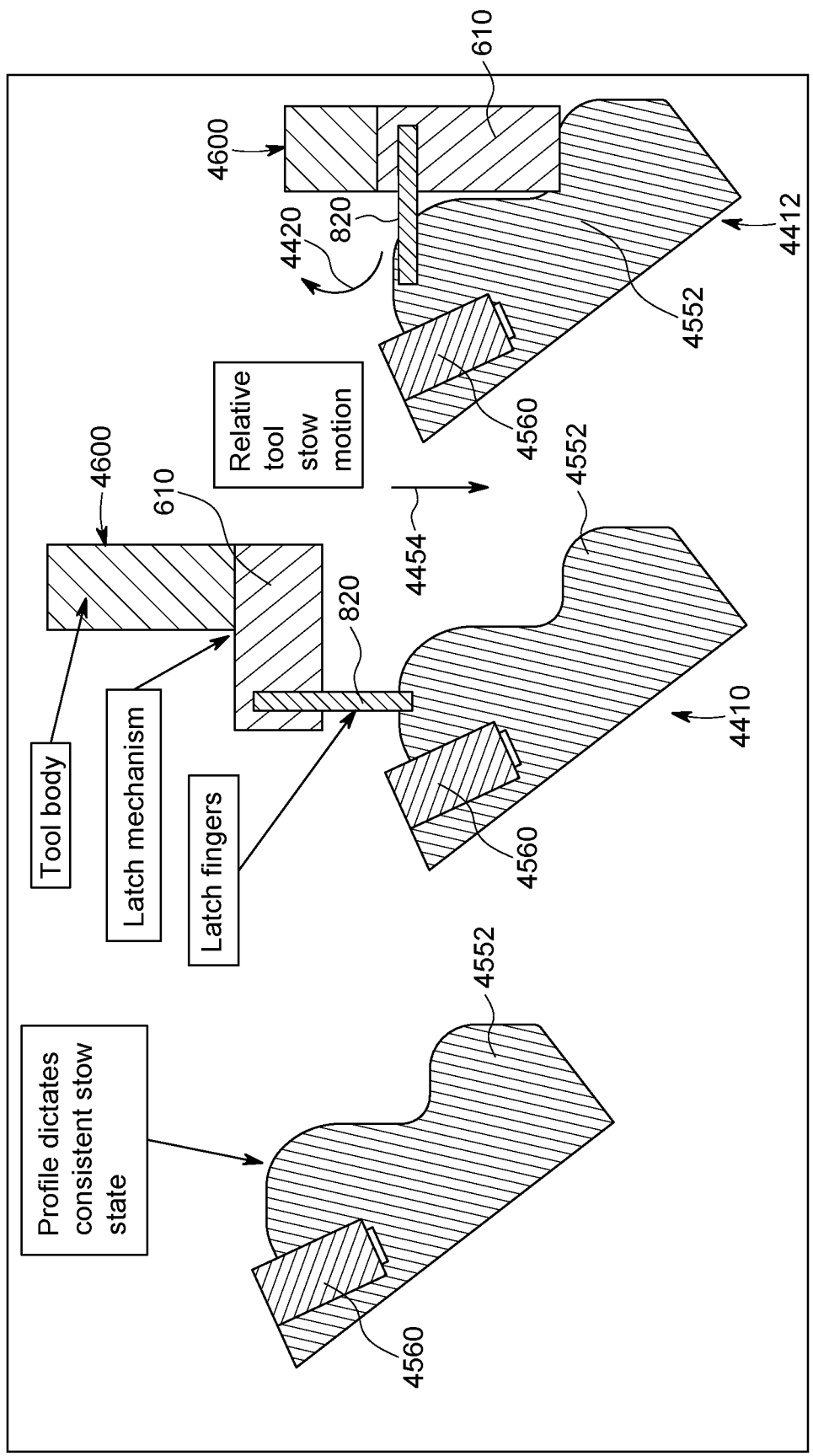
FIG. 44 is a diagram showing operation of the connection tool moved into a stowed configuration in a stowage stand with gladhand capture assembly moved passively into a locked state.
Figure 44A:
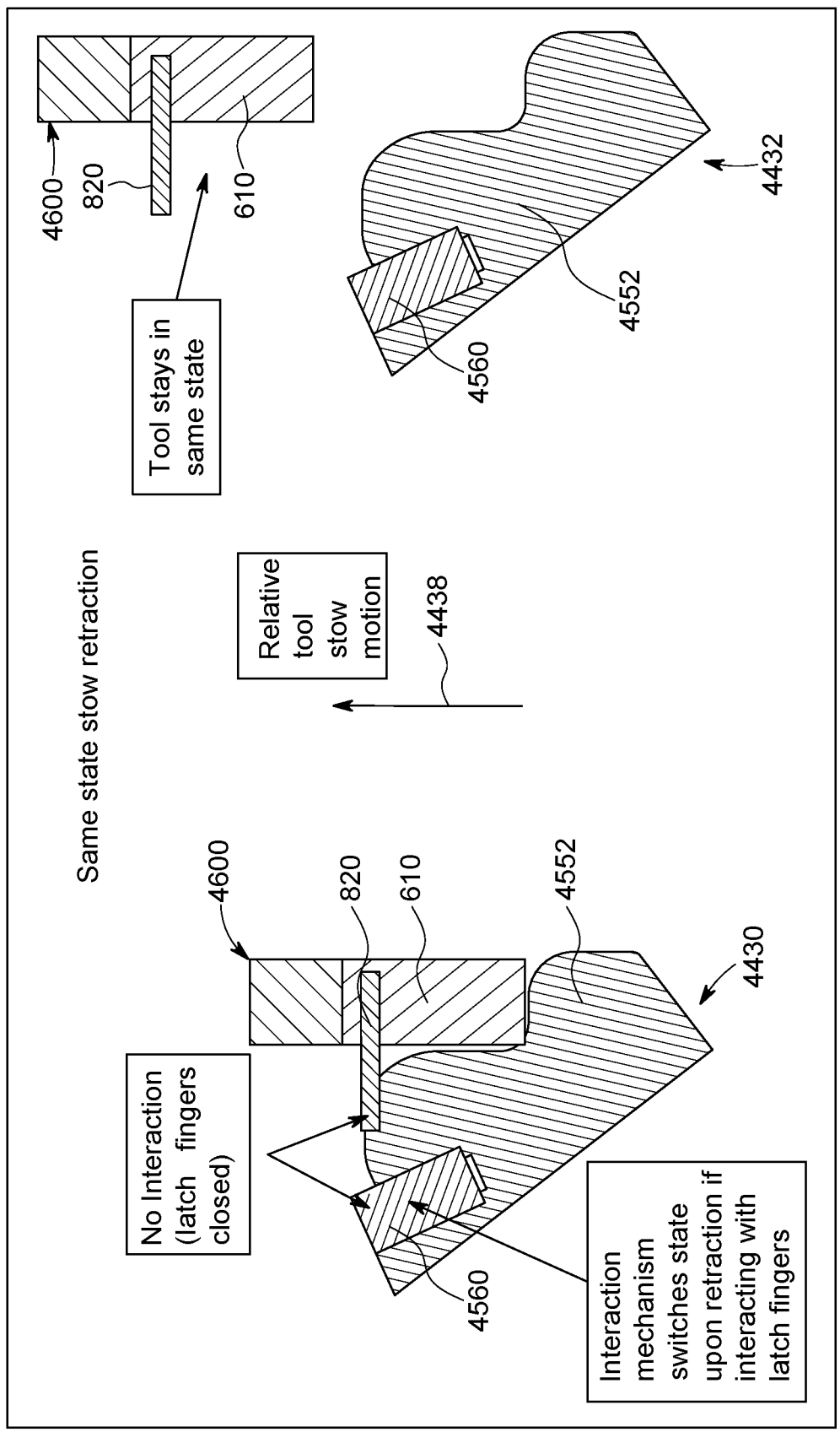
FIG. 44A is a diagram showing operation of the connection tool, as shown in FIG. 44, moved out of a stowed configuration from the stowage stand with the gladhand capture assembly in the locked state.

FIG. 44A depicts a withdrawal operation with the gladhand capture assembly 610 the tool 4600 in a locked state with fingers 820 in a latched state so as to avoid interference with both the rib 4552 and magnets 4560. In this operation, the tool 4600 is lifted vertically (arrow 4438) from the stowed state 4430 to an unstowed state 4432, in which the tool overlies the stowage stand 4500, and the gladhand capture assembly 610 remains locked under bias of the bistable spring arrangement (2110). Hence, in this configuration, the previously locked gladhand capture assembly 610 remains locked for use on the appropriate type of gladhand (which may have been previously identified by the system).

Figure 44B:
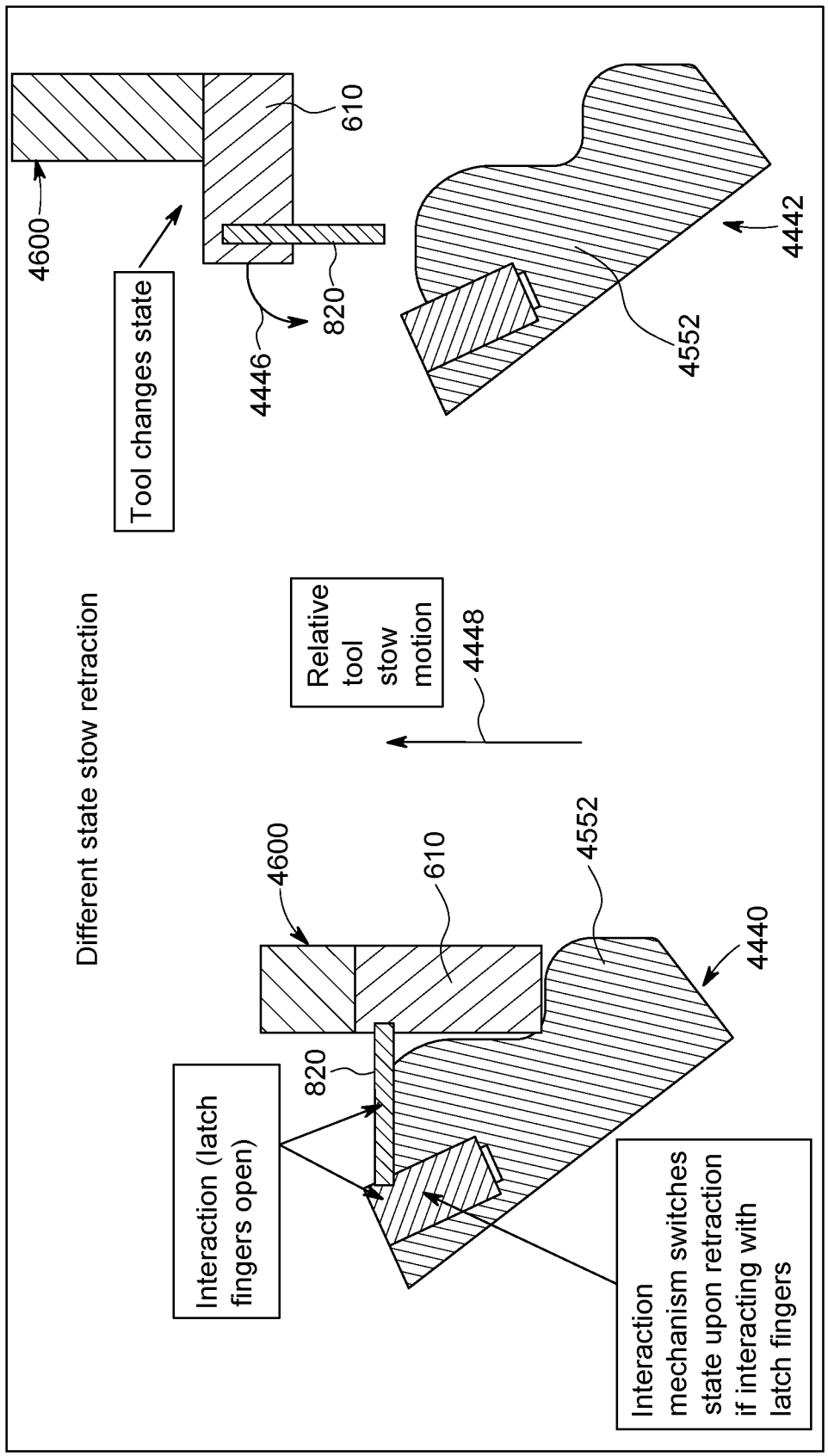
FIG. 44B is a diagram showing operation of the connection tool, as shown in FIG. 44, moved out of a stowed configuration from the stowage stand with the gladhand capture assembly passively moved into an unlocked state.
Figure 45:
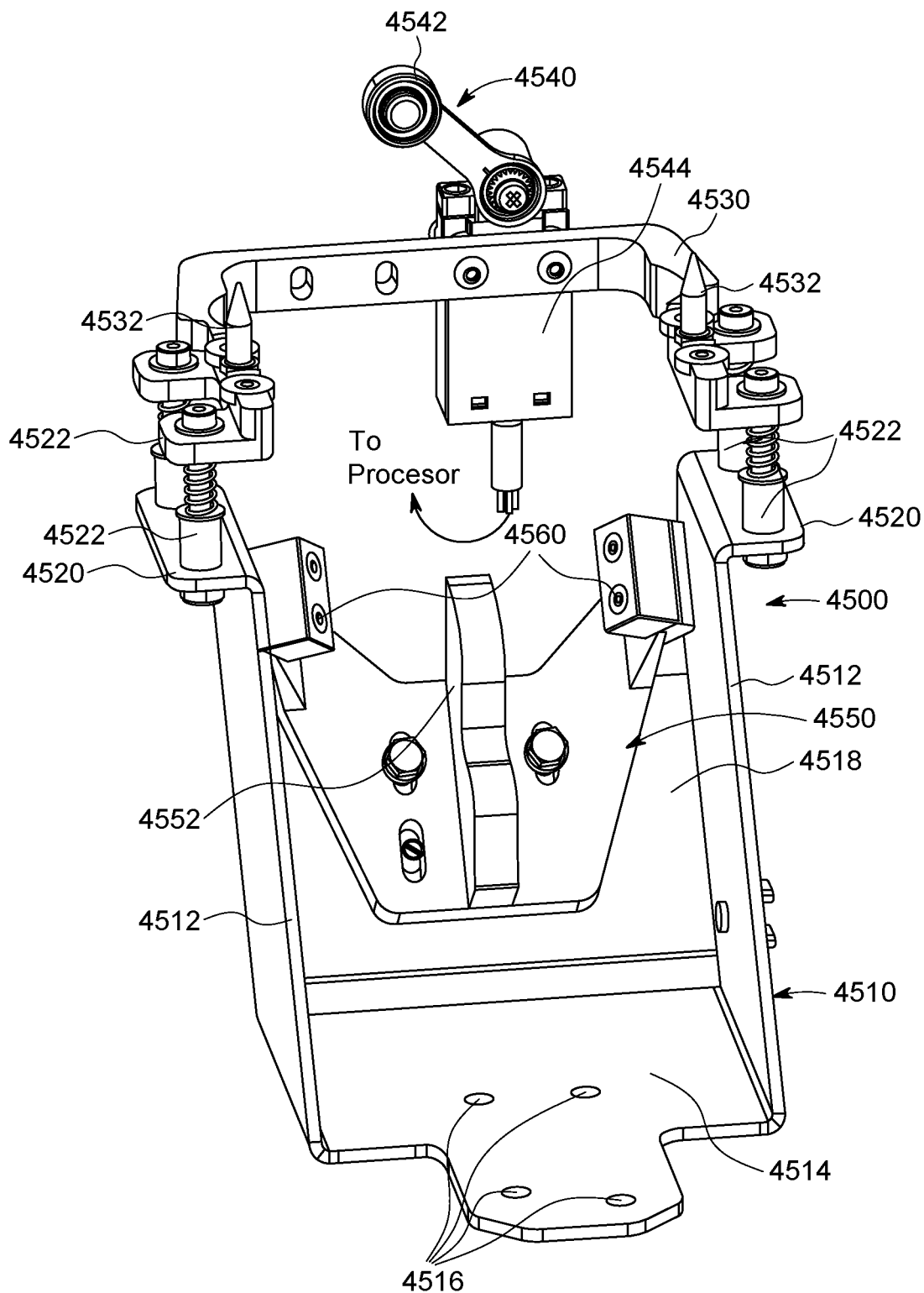
FIG. 45 is a perspective view of a stowage stand removably for storing and passively moving the gladhand capture assembly with respect to a robot arm on the AV yard truck according to an illustrative embodiment.
Figure 46:
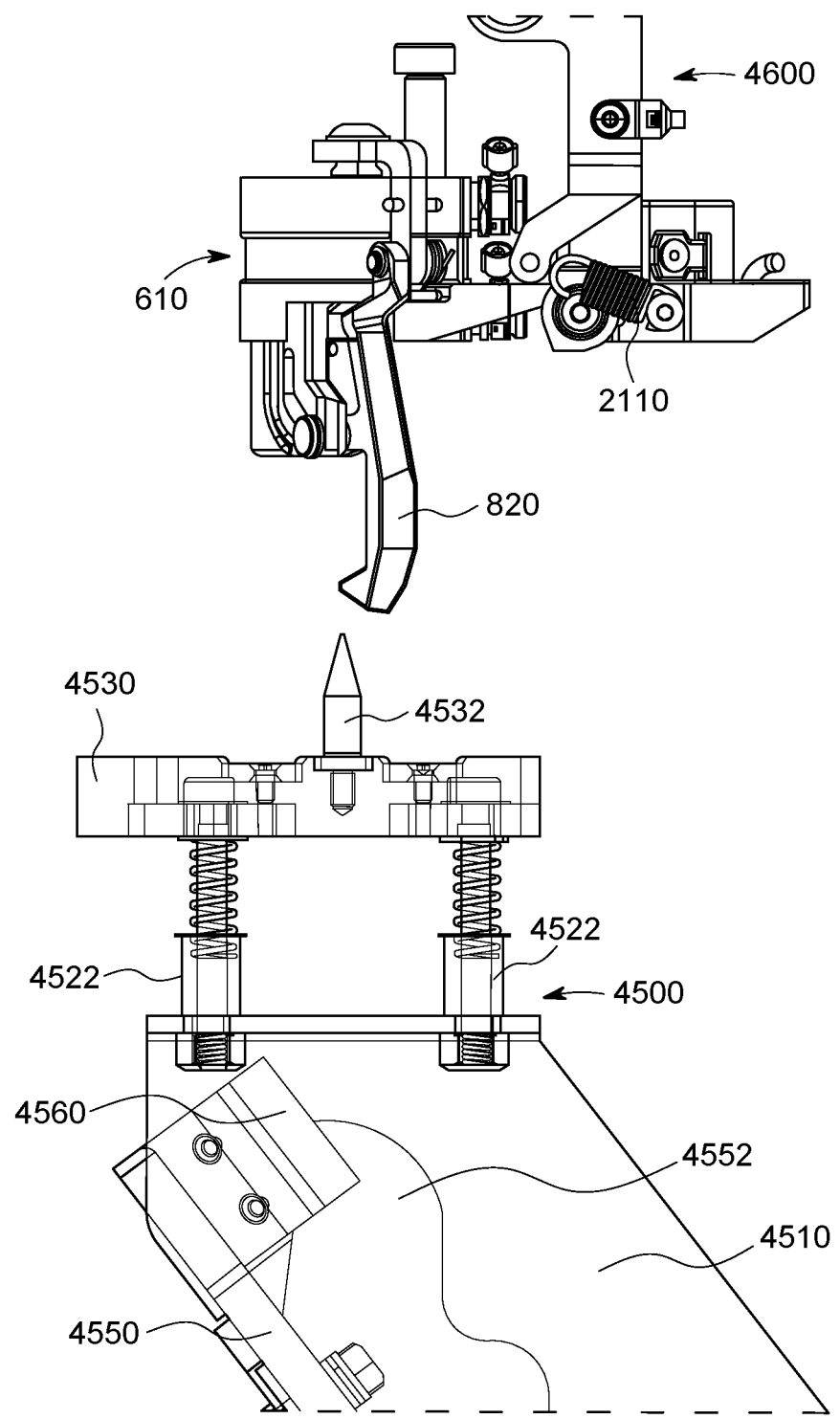
FIG. 46 is an exposed side view showing the connection tool and associated gladhand capture assembly, in an unlocked state, overlying the stowage stand of FIG. 46.
Figure 52:
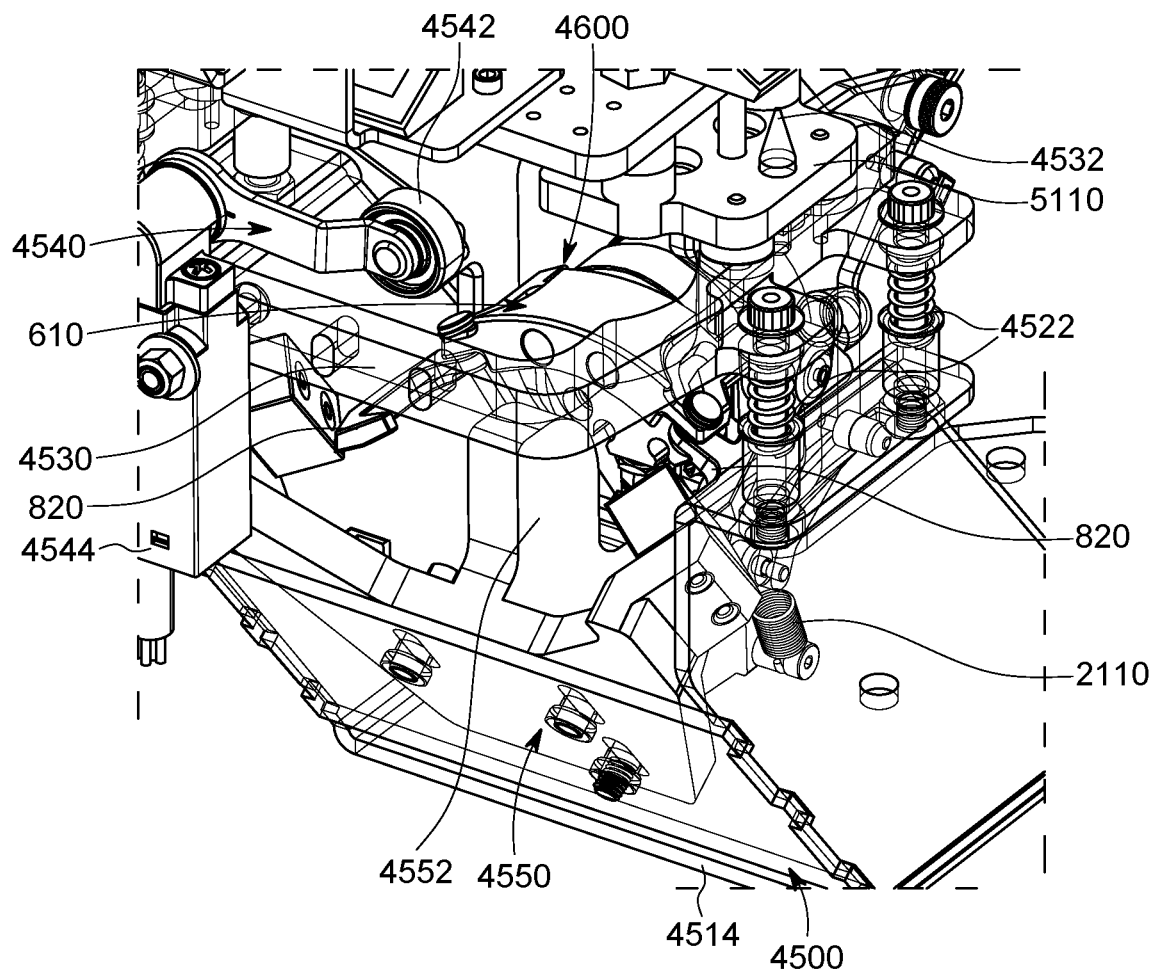
FIG. 52 is an exposed, fragmentary perspective view of the gladhand capture assembly stowed in the stowage stand as shown in FIG. 49, with latching fingers moved into an open/unlatched state so as to be magnetically attracted by the magnets of the rib assembly.
Figure 53:
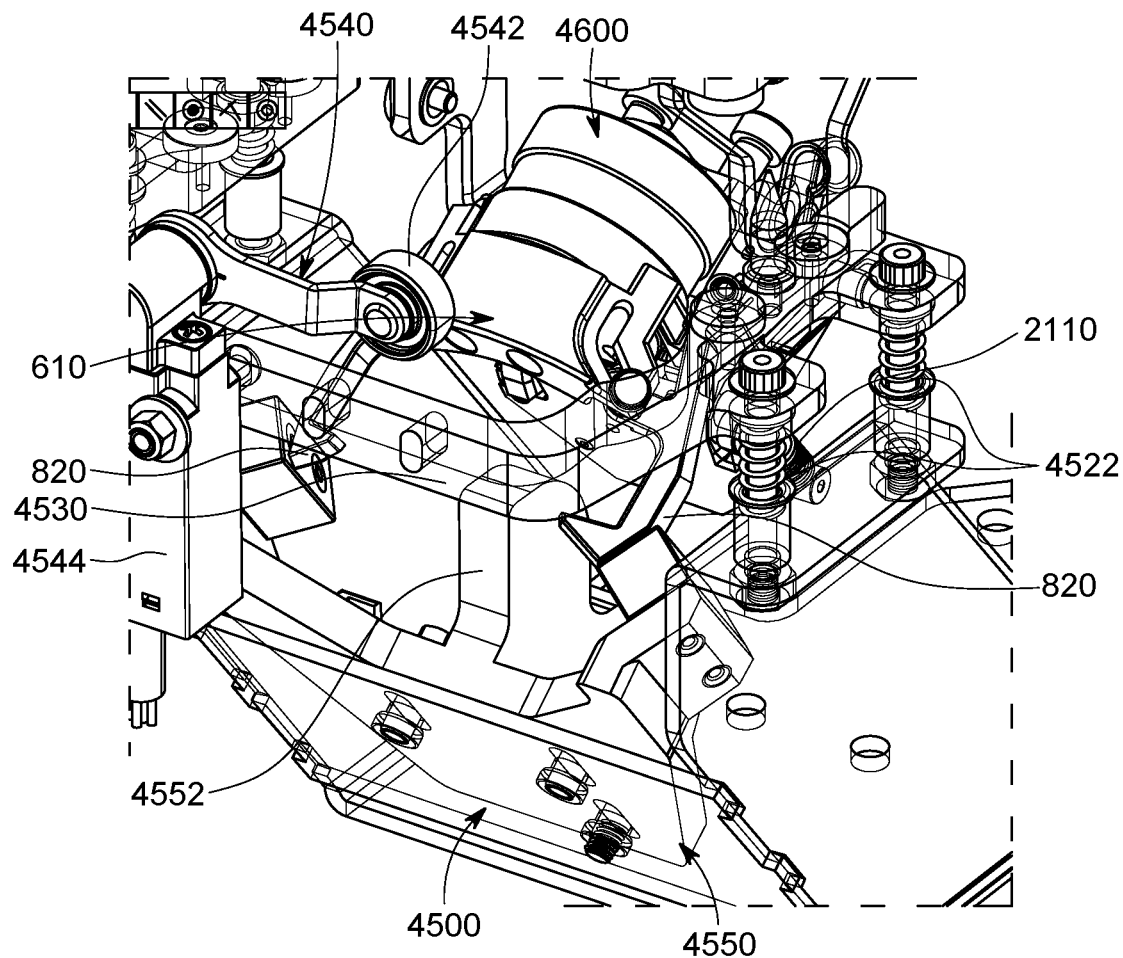
FIG. 53 is an exposed, fragmentary perspective view of the gladhand capture assembly as it is withdrawn vertically from the stowage stand as shown in FIG. 52, with latching fingers moved into an open/unlatched and the magnets retaining ends of the latching fingers so as to cause the gladhand capture assembly to rotate into a unlocked state.
Figure 54:
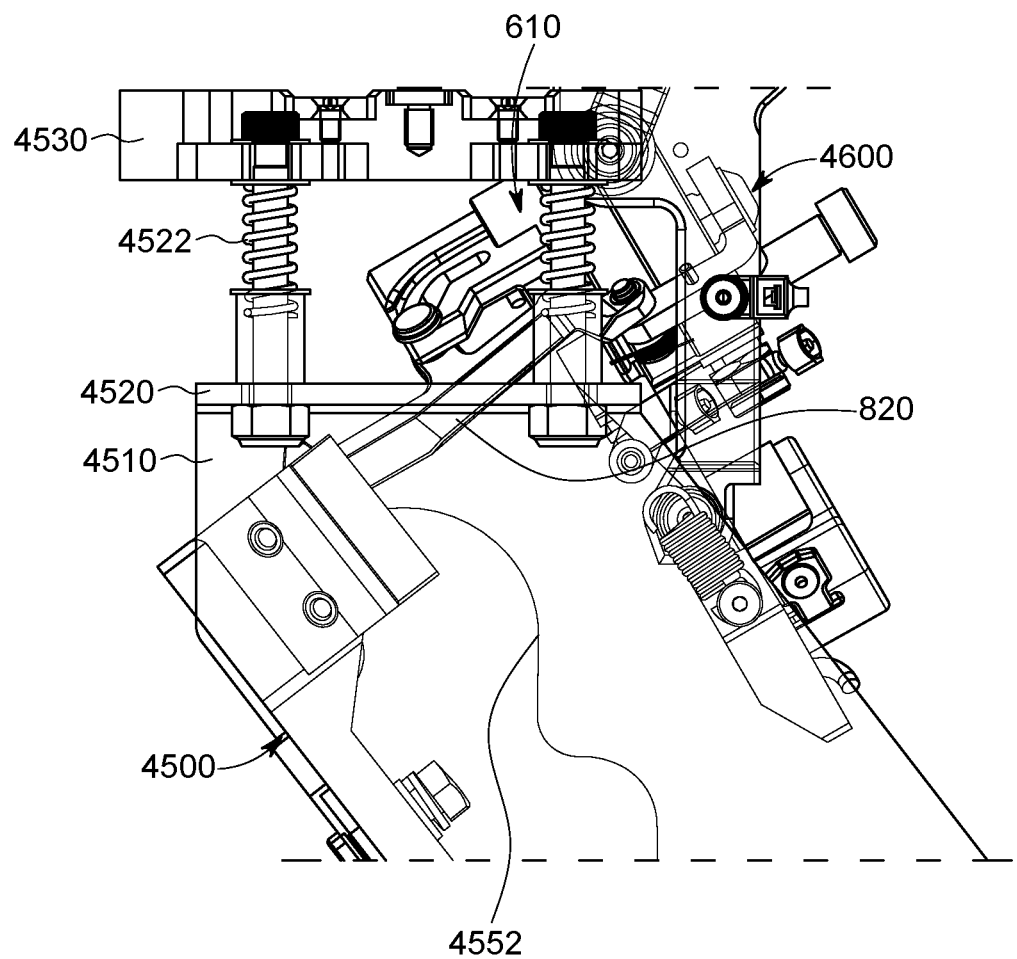
FIG. 54 is an exposed fragmentary side view of the gladhand capture assembly as it is withdrawn vertically from the stowage stand as shown in FIG. 53.
Figure 55:
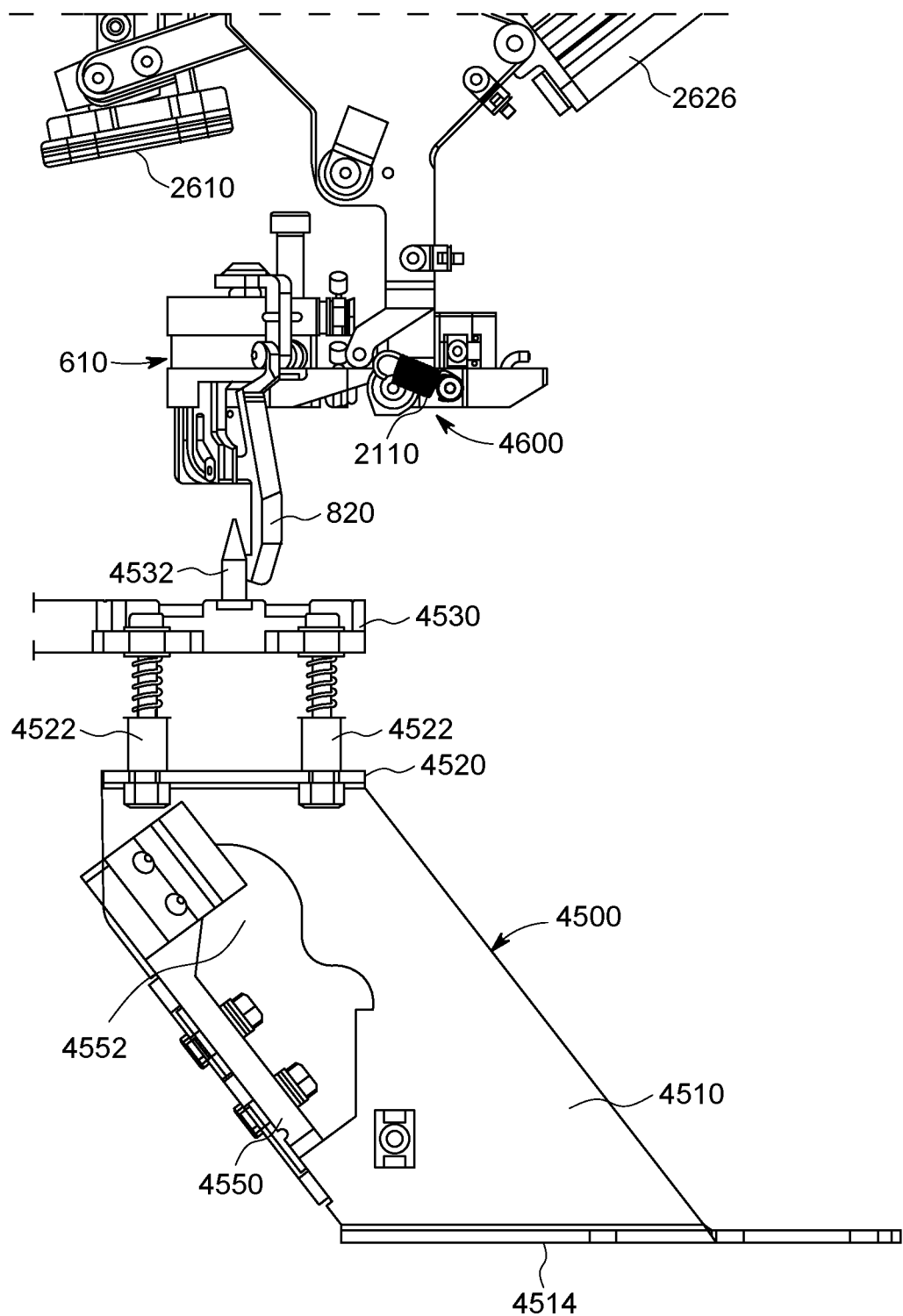
FIG. 55 is an exposed side view showing the connection tool and associated gladhand capture assembly, after unlocking thereof in accordance with FIGS. 52-54, overlying the stowage stand.

Conversely, as shown in FIG. 44B and FIG. 52 the system controller can direct the actuator of the latching fingers 820 to cause them to open as depicted (FIG. 52) what it is desired that the connection tool 4600 interact with a gland hand requiring the gladhand capture assembly 610 to be presented in an unlocked configuration. The magnets 4560 are located and arranged to contact or be closely adjacent to the ends of the fingers 820 in the open/unlatched state. The fingers 820 constructed from, or are integrated with magnetically attracted material—e.g. steel, iron, magnetized metal, etc. As such, the magnets 4560 exert an attractive force on the confronting ends of the fingers 820. Thus, as the robot arm moves upwardly (arrow 4448 in FIG. 44B) to withdraw the tool 4600 from a stowed state (4440), the fingers remain attracted to the magnets, causing the gladhand capture assembly 610 to rotate (curved arrow 4446) as also shown in FIGS. 53 and 54 until the bistable spring arrangement biases the assembly 610 into the unlocked state 4442 (FIG. 44B). Thereafter, the tool 4600 with an unlocked gladhand capture assembly 610 moves free of the stowage stand 4500 and magnets in the unlocked, as shown in FIG. 55, and can be directed to interact with a glad hand requiring an unlocked gladhand capture assembly as described above.

Notably, the above-described stowage stand 4500 allows for selective movement of the gladhand capture assembly 610 on a connection tool 4600 in a semi-passive manner, which is free of a separate actuator for moving the gladhand capture assembly relative to the tool frame. In alternate embodiments, the fin 4552 and/or the bistable spring arrangement can be substituted with an active drive mechanism—such as a stepper motor or rotary solenoid that moves the gladhand capture assembly between locked and unlocked states, based upon a signal from the system processor/controller. Moreover, the stowage stand herein can be adapted to store other types of tools—for example those with a single state. Such stowage stands can include appropriate alignment/registration and retention elements—such as a frame with alignment pins as described above. These alternate storage stands can be discretely located and identified (e.g. with a unique shape, location and or fiducial) by the robotic arm. Such locations can be part of a bank or magazine of individual tools for differing pneumatic and/or electrical connection tasks. Additionally, while magnets are used to facilitate rotation of the gladhand capture assembly into an unlocked state in this embodiment, other types of catch mechanisms can be employed the stand including hooks that can be disengaged by the latching fingers as the connection tool withdraws and the assembly flips into the unlocked position.

VIII. Tool/End Effector Rotation Device

Hose wrap is an undesirable condition in which the air hose(s) and/or electrical cable on the AV truck become twisted around the connection tool or robotic arm while the tool is being deployed so as to form a connection with the trailer. To reduce the chances of hose wrap, the interconnection between the robotic arm and the connection tool can include a selectively, freely rotating joint that allows the hose/cable to spin freely around its axis when tension builds up in the hose/cable. However, it is noted that this joint cannot be completely passive, because there are times when precise movements must be made by the robotic manipulator arm to deploy the connection tool with respect to the trailer. Therefore a lockable rotation device that can be used to selectively lock the interconnection when free rotation is not desired.

A. Self-Locking Rotation Device

Figure 56:
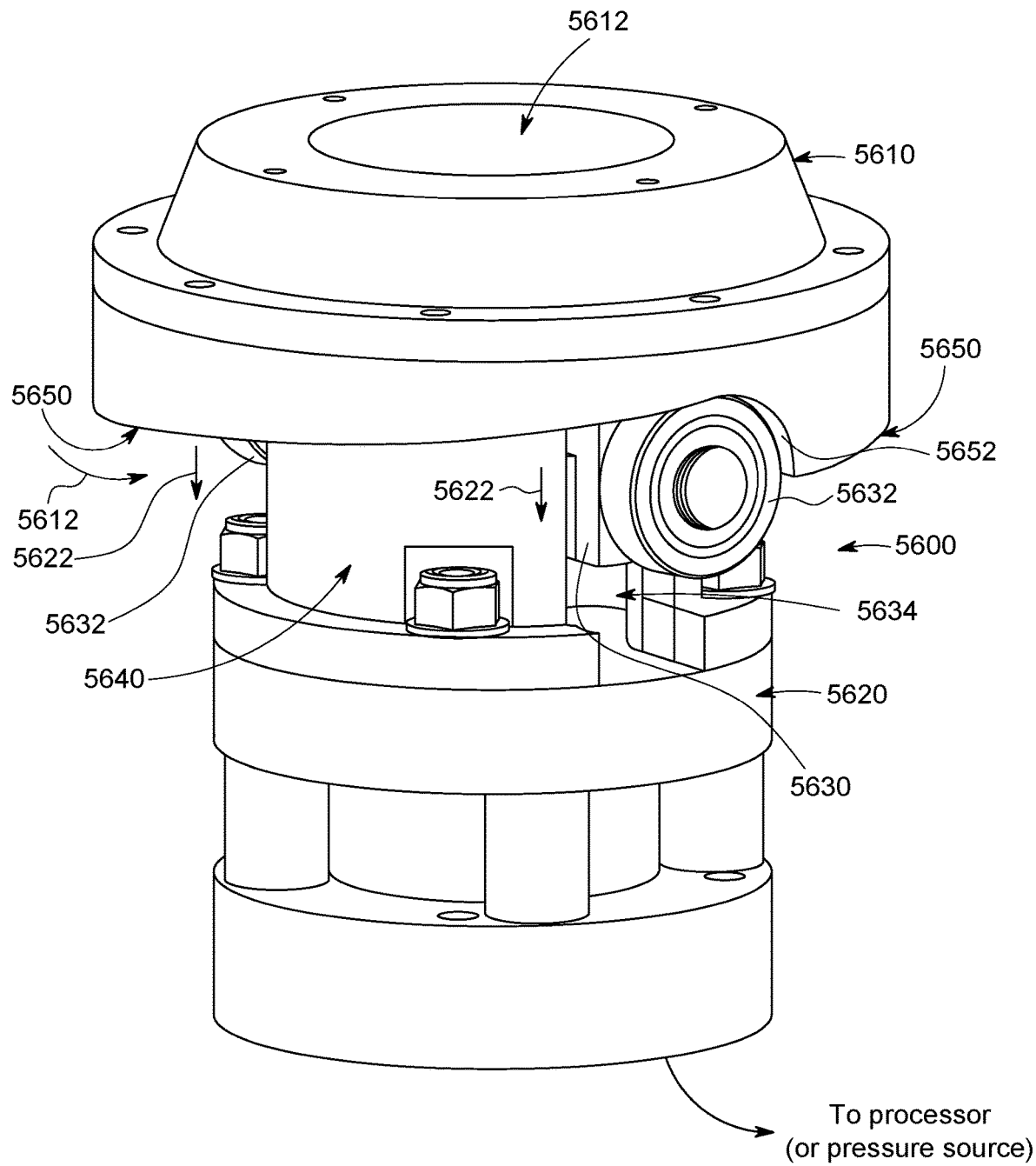
FIG. 56 is a perspective view of a self-locking rotation device for attachment between the a robotic arm manipulator and connection tool according to an illustrative embodiment, adapted to reduce undesirable hose and cable wrapping during operation, shown in a rotationally locked/stopped orientation.
Figure 57:
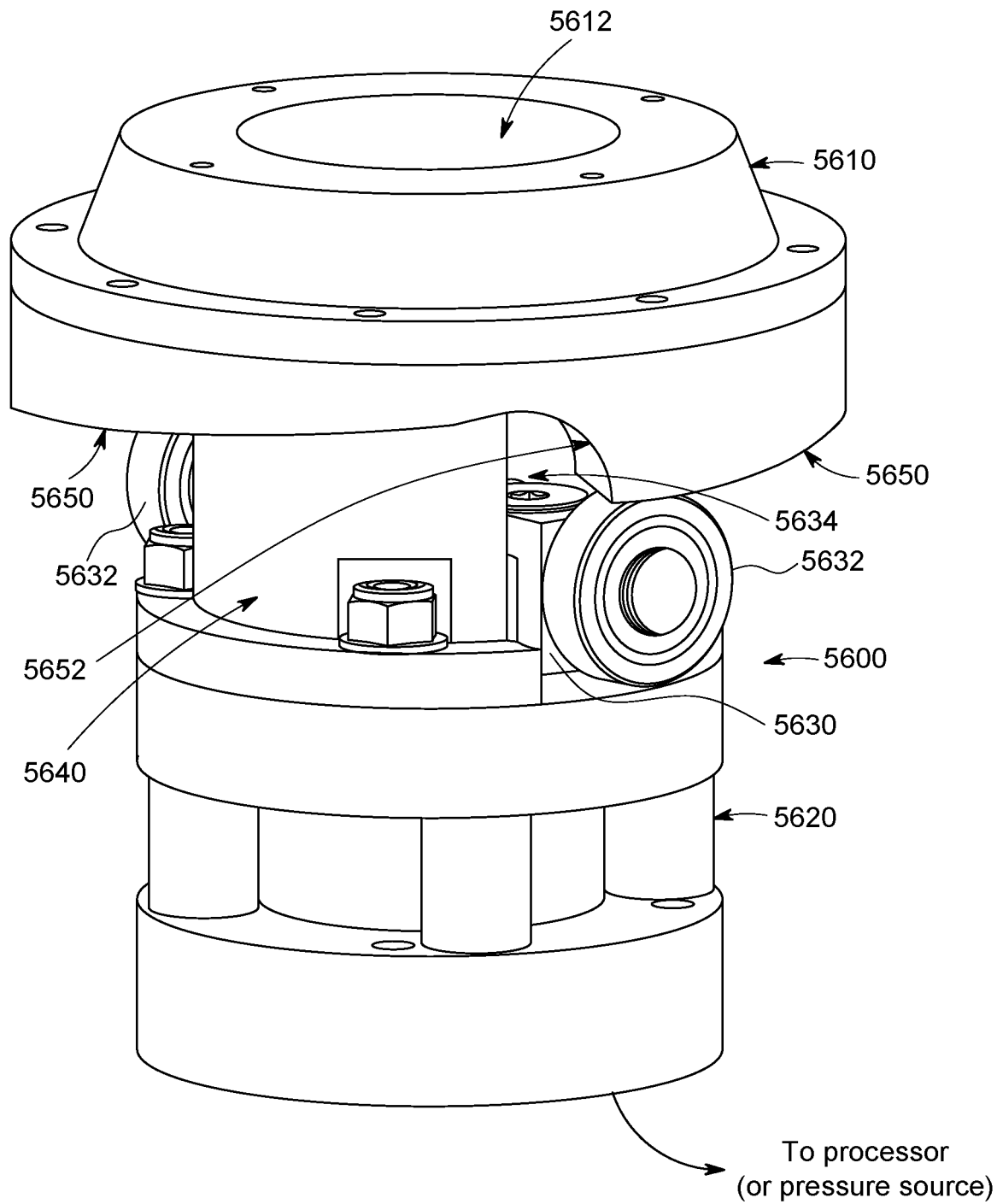
FIG. 57 is a perspective view of the self-locking rotation device of FIG. 56, shown in a freely rotating orientation.
Figure 58:
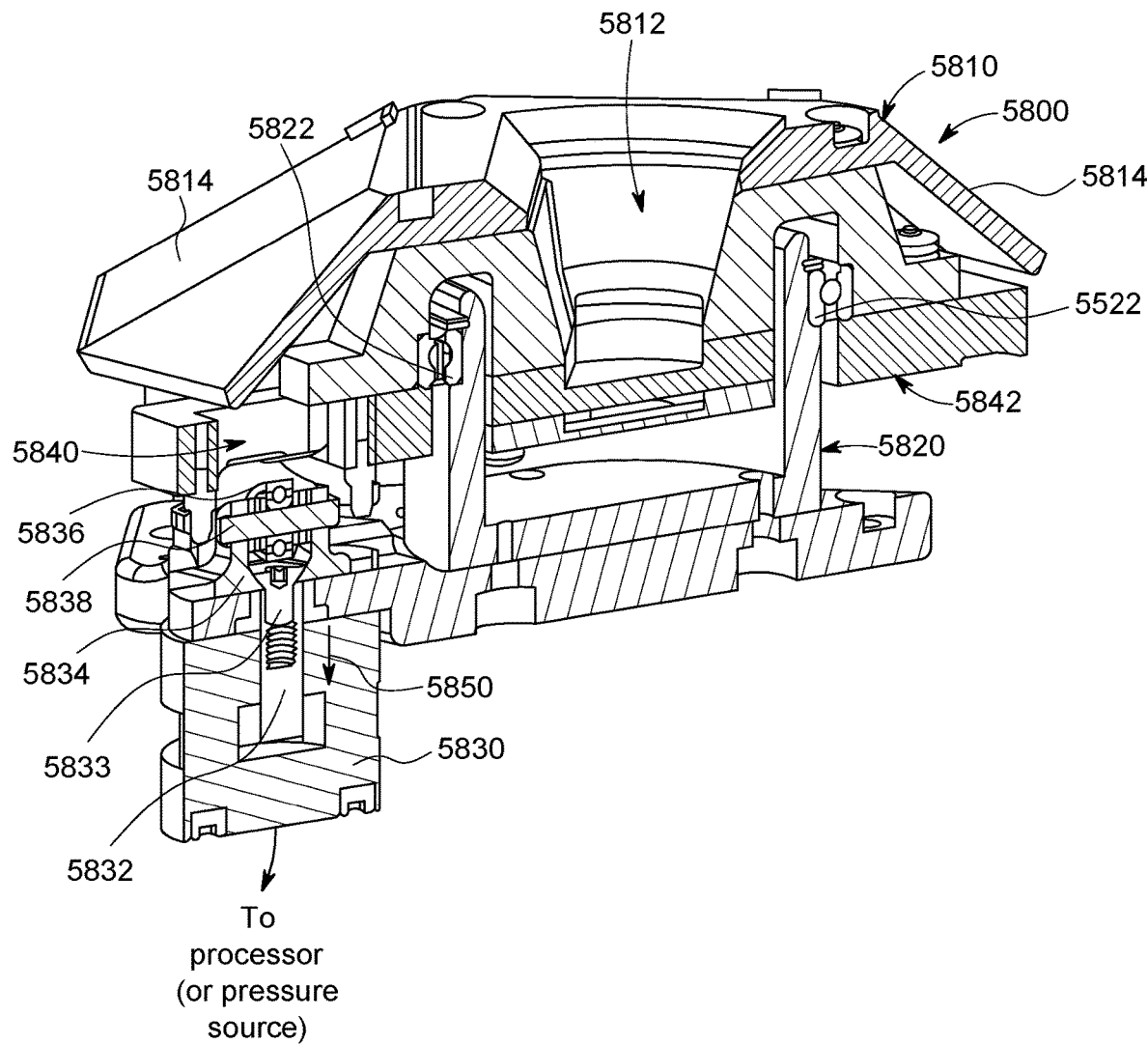
FIG. 58 is a side oriented diametric cross-sectional perspective view of an assisted locking rotation device for attachment between the a robotic arm manipulator and connection tool according to an illustrative embodiment, adapted to reduce undesirable hose and cable wrapping during operation, shown in a rotationally unlocked/freely rotating orientation.

FIGS. 56 and 57 depict a locking rotation device 5600 that can reside in line with the robotic manipulator and connection tool herein—either attached relative the robotic arm end effector or the connection tool interface. The rotation device 5600 includes a connection interface component 5610 that rotates (curved arrow 5612) relative to an actuator 5620, which serves as a base for the components of the device 5600. In this example, the connection interface component is adapted to be part of the connection tool and defines a receptacle 5612 to removably receive an end effector connection member. In alternate embodiments, the device 5600 can be part of the end effector and the tool receptacle remains rotationally fixed. The device actuator 5620 contains two diametrically opposed roller bearing assemblies with axially moving (arrow 5622) actuator structures 5630 and associated roller bearings 5632 on an upper portion 5640 of the actuator 5620. The slots 5634 provide motion clearance for the actuator structures 5630 and associated bearings 5632 of the device actuator 5620. The upper portion 5640 can act as an axle for rotation of the component 5610 as well as an axial guide for the bearing bases 5630 between a minimum and maximum position. The interface component 5610 includes a bottom surface formed into a pair of ramps 5650, with end stops 5652 adapted to engage each of the bearings, respectively, contains two bearings 5632 that ride on a respective slope 5650 (as shown in FIG. 57) until contacting a stop 5652 (as shown in FIG. 56). In this embodiment, the ramps 5650, stops 5652 and bearings 5632 are located 180 decrees relative to each other. Where more ramps, stops and bearings are used, the spacing about the diameter can be a smaller arc distance. Likewise, in an embodiment a single ramp, stop and bearing can be used (see the assisted rotation device described below).

The bearing bases 5630 can be spring-loaded to maintain pressurable contact with each slope 5650 and/or can be controlled by/interact with a solenoid or other actuable force-application mechanism (an actuator). More generally, the actuator 5620), can comprise a pneumatic cylinder in an exemplary embodiment, but like other linear actuators herein, can be another type of fluid or electrically driven actuator (e.g. a solenoid) in alternate embodiments. The actuator 5620 includes appropriate automated valves, etc. that are connected with the system processor/controller, and can be used to selectively rotationally lock and unlock the interface component 5610 relative to the base 5620 and associated upper portion. When the actuator is retracted, the interface component 5610 can rotate freely (rotation unlocked). Conversely, when the actuator is extended, the interface component 5610 rotates until the actuator/bearings reach their maximum travel (locked), at which point the stops 5652 engage the respective, confronting bearings

5632. By way of example, when the actuator is extended to pressurably bias the bearing structures 5630, the ramps 5650 are prevented from back-rotation of the stops 5652 until the actuation pressure is released to restore free rotation. The position in which the rotational lock occurs is known and constant, and thus the robotic motion controller/system processor knows the underlying orientation of the connection tool in its coordinate space.

B. Assisted Rotation Device

Reference is now made to FIGS. 58-61, which show a rotation device 5800 adapted to reside on the connection tool, but which can be adapted to reside on the robotic arm end effector in a manner clear to those of skill. By way of example, the device 5800 includes an interface component 5810 with a receptacle 5812 for removably receiving the end effector connection member, and guidance/recognition fiducials 5814 as described above. The interface component 5810 rotates on a base 5820 with a ball bearing assembly 5822 therebetween. Illustratively, a (e.g.) linear actuator 5830, which can comprise a solenoid, pneumatic cylinder, etc., is mounted through the base 5820. The actuator is interconnected with the robotic controller/system processor, and is operated when rotational locking or unlocking is directed in the system's connection cycle.

Figure 59:
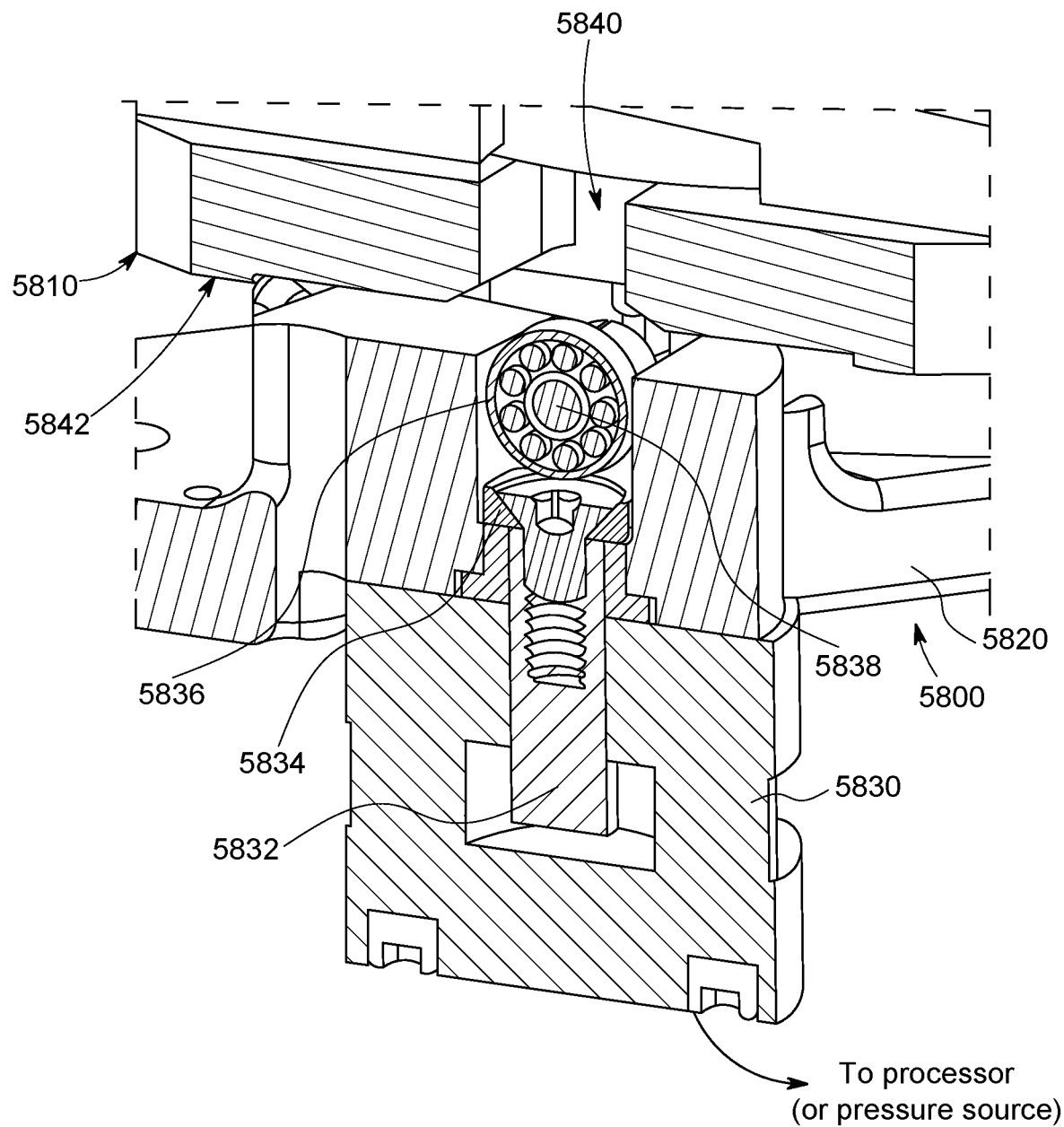
FIG. 59 is a more detailed, fragmentary cross-sectional perspective view of the actuator and locking mechanism of FIG. 58.

The actuator 5830 includes an axially moving shaft 5832 having a bracket 5834 fastened (e.g. using a screw 5833) to its top. The bracket 5834 carries a roller bearing 5836 on an axle 5838. The interface component 5810 includes at rest one recess 5840 formed along its bottom surface. With further reference to FIG. 59, when the actuator 5830 retracts (arrow 5850 in FIG. 58) the shaft 5832, the roller bearing 5836 are located out of interfering contact relative to a recess 5840 formed in the bottom surface 5842 of the interface component 5810. The retracted roller bearing 5836, thus, is free of interference with the interface component, thereby allowing the interface component 5810 to rotate freely relative to the base 5820.

Figure 60:
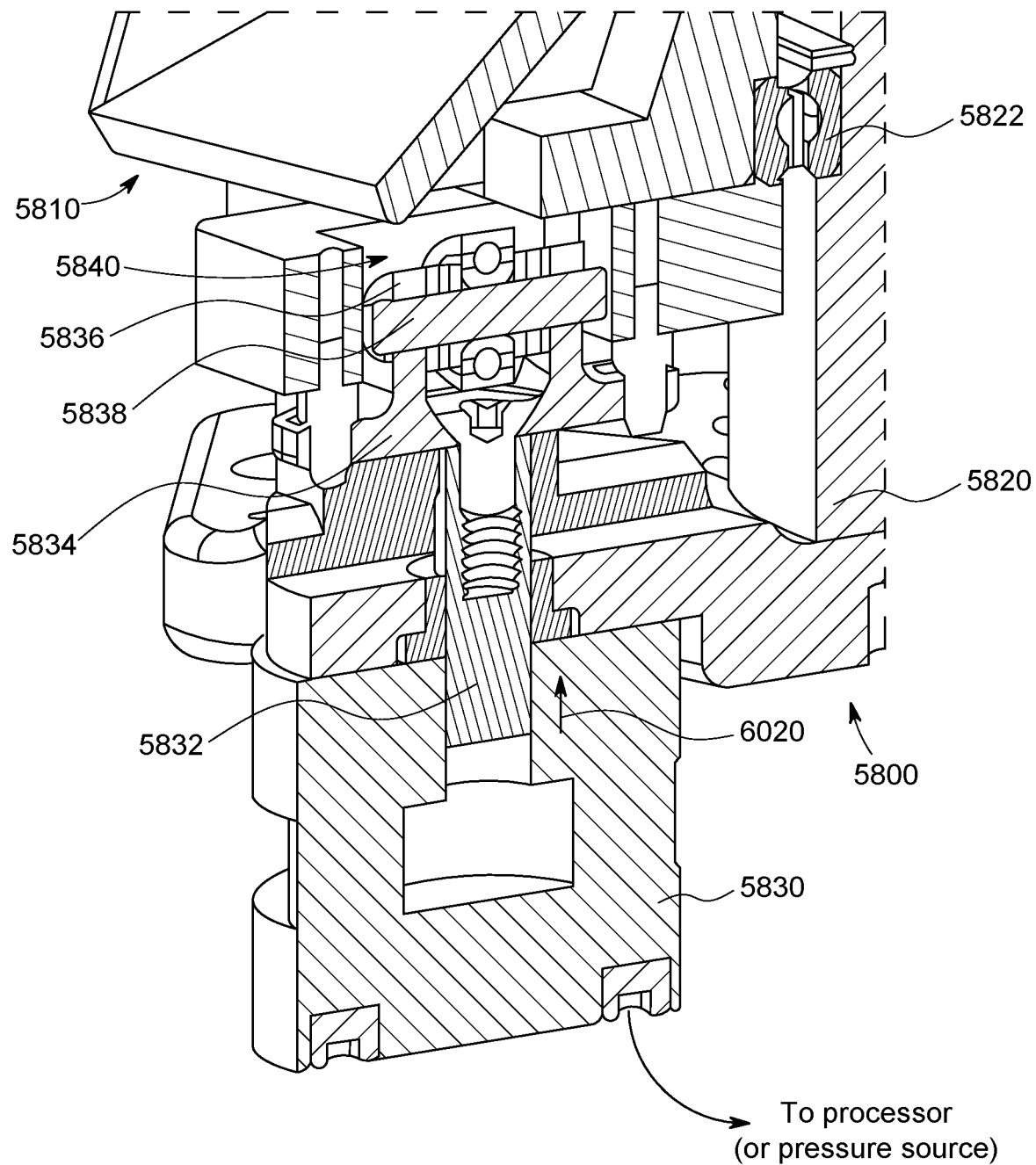
FIG. 60 is a more detailed, fragmentary diametric cross-sectional perspective view of the actuator and locking mechanism of FIG. 58, shown in a rotationally locked orientation.
Figure 61:
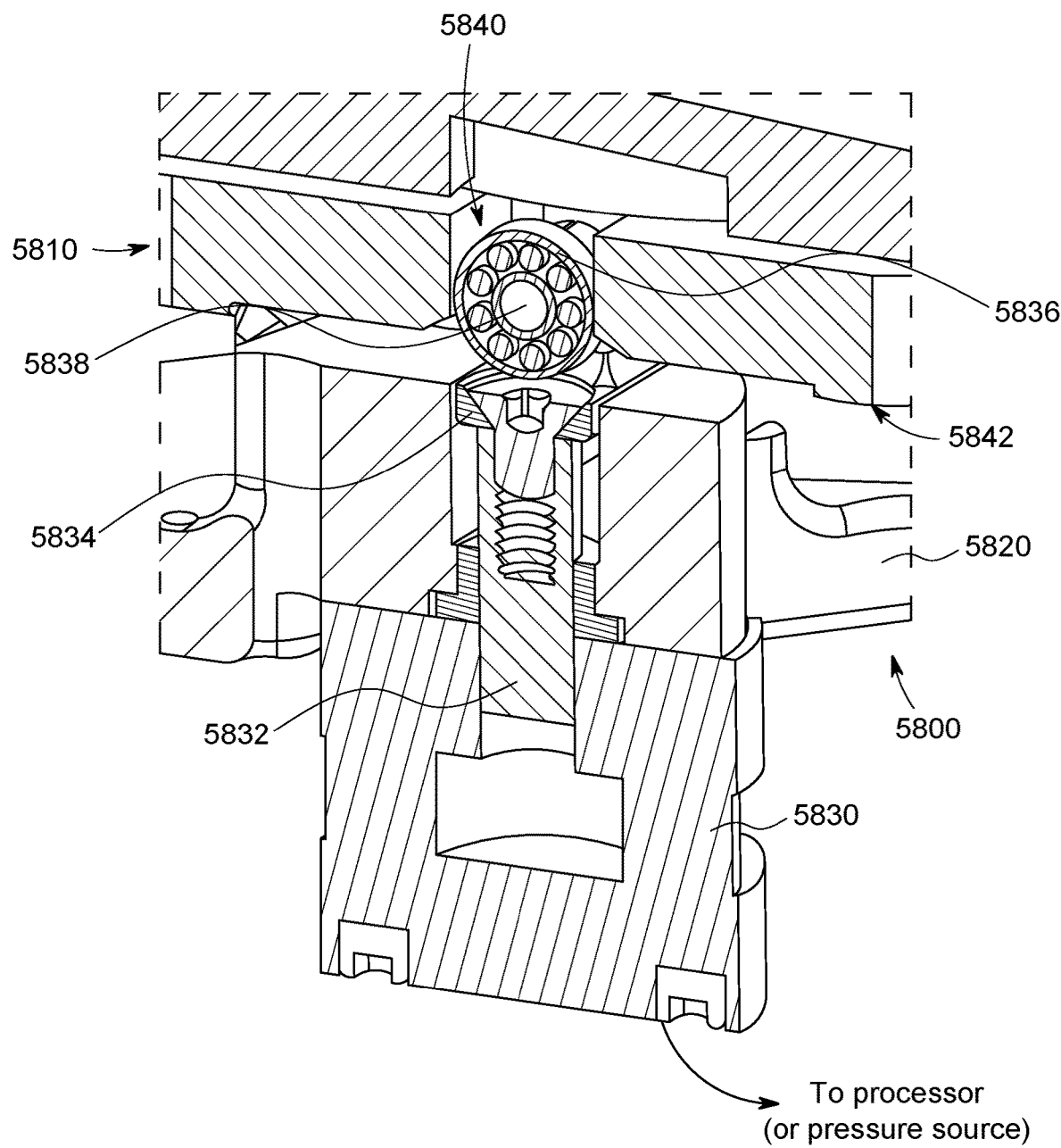
FIG. 61 is a more detailed, fragmentary cross-sectional perspective view of the actuator and locking mechanism of FIG. 58, shown in a rotationally locked orientation.

Conversely, as shown in FIGS. 60 and 61, the actuator 5830 has biased (arrow 6020) the shaft 5832 into an extended position where the roller bearing 5836 enters the recess 5840 and interferes with relative rotation of the interface component 5810 with respect to the base 5820. This established a rotationally locked state in which the connection tool is in a known rotational orientation relative to the systems coordinate space.

In operation, the actuator 5830 can be operated to extend the shaft/bearing when a rotational lock is desired by the processor. The shaft 5832 the bears with moderate pressure on the roller bearing 5836, which in turn, biases against the lower surface of the interface component. Once the interface component 5810 rotates to the appropriate rotational position, the bias pressure on the roller bearing 5836 causes it to snap into the recess 5840, and thereby restrict further rotational motion relative to the base 5820. Rotation of the interface component 5810 can be achieved by instructing the robotic manipulator to spin approximately 180 degrees in either direction. If desired, a sensor (not shown) can be provided in communications with the system controller/processor to determine if the device 5800 is in a locked or unlocked rotational state by detecting the travel of the actuator or other telemetry. Note that in alternate embodiments, a plurality of actuators can be employed to lock/unlock rotation. Additionally, a roller bearing can be substituted for a different, selectively interfering surface, such as a locking pin, with or without a low-friction tip.

IX. Conclusion

It should be clear that the above-described system and method provides various devices and techniques for achieving a reliable pneumatic braking system connection between a conventional, native gladhand on a trailer and an automated truck in a variety of conditions, and/or with differing gladhand placements and/or types.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Also, qualifying terms such as "substantially" and "approximately" are contemplated to allow for a reasonable variation from a stated measurement or value can be employed in a manner that the element remains functional as contemplated herein—for example, 1-5 percent variation. Accordingly, this description is meant to be taken only by way of example, and not to otherwise limit the scope of this invention.

What is claimed is:

1. A system for interconnecting a brake line on an AV truck with a gladhand mounted on a front of a trailer hitched thereto comprising:
    a robotic arm, having an end effector, that is guided by a controller, from a stowage location to the gladhand, the end effector removably carrying a connection tool with a connection member adapted to carry pressurized air from a braking circuit of the AV truck to a braking circuit of the trailer;
    a gladhand capture assembly on the connection tool that selectively engages a portion of the gladhand; and
    a hinge assembly that allows movement of the gladhand capture assembly relative to a base of the connection tool between an unlocked configuration and a locked configuration.

2. The system as set forth in claim 1, wherein the movement of the gladhand capture assembly from the unlocked to the locked configuration is adapted to expose a retractable gladhand to enable engagement of the connection member with a seal of the gladhand.

3. The system as set forth in claim 2, further comprising at least one of (a) a sensor that detects each of the unlocked configuration and the locked configuration and transmits information thereon to the controller, and (b) a motion measurement sensor that determines an angle or position of the gladhand capture assembly.

4. The system as set forth in claim 2, wherein the gladhand capture assembly includes latching fingers adapted to engage the portion, responsive to an actuator controlled by the controller.

5. The system as set forth in claim 4, wherein the latching fingers are linked to the actuator via links and slots that allow the fingers to engage the portion at differing elevations relative thereto.

6. The system as set forth in claim 5, wherein the latching fingers are arranged to move downwardly and inwardly into contact with the portion.

7. The system as set forth in claim 6, wherein the portion is a wedge and the movement inwardly is in directions approximately normal to confronting side edges of the wedge.

8. The system as set forth in claim 7, wherein the latching fingers each include gripping formations that engage the wedge.

9. The system as set forth in claim 4, wherein the hinge assembly includes at least one of (a) a bistable spring arrangement, and (b) an active hinge assembly, that biases the gladhand capture assembly into each of the unlocked configuration and the locked configuration.

10. The system as set forth in claim 9, wherein the stowage location includes a stowage stand that receives the connection tool in a predetermined orientation, the stowage stand including a biasing assembly that moves the gladhand capture assembly into the desired configuration as the robotic arm directs the connecting tool into the predetermined orientation.

11. The system as set forth in claim 10, wherein the biasing assembly comprises a rib that the latching fingers straddle in the predetermined orientation, and further comprising magnets that are adapted to magnetically engage the latching fingers when the latching fingers are moved outwardly into a non-engaged configuration with respect to a wedge, whereby upon withdrawal of the connection tool from the stowage stand, the gladhand capture assembly is moved to the unlocked position.

12. The system as set forth in claim 11, wherein the stowage stand includes a frame having alignment pins and the connection tool includes a plate that selectively engages the frame with the holes passing over respective of the alignment pins.

13. The system as set forth in claim 1, wherein the gladhand capture assembly includes a contact sensor or proximity sensor that transmits information to the controller when the gladhand is engaged.

14. The system as set forth in claim 13, wherein the contact sensor or proximity sensor comprises at least one of a rocker assembly and a switch, a LIDAR, a camera assembly, and a Hall effect sensor.

15. The system as set forth in claim 14, wherein the gladhand capture assembly includes a magnet assembly to assist engagement with the portion.

16. The system as set forth in claim 1, wherein at least one of the connection tool and the robot arm includes a compliance structure that enables a predetermined degree of motion between the gladhand and the connection member when engaging the gladhand.

17. The system as set forth in claim 16, wherein the compliance structure is passive and is located between the base of the connection tool and the gladhand capture assembly and includes a plurality of compliance elements arranged between a pair of mounts on each of respective subassemblies of the gladhand capture assembly.

18. The system as set forth in claim 17, wherein the compliance elements comprise semi-rigid, elastomeric elements.

19. The system as set forth in claim 16, wherein the compliance structure includes a lockout mechanism that limits compliance motion at predetermined times.

20. The system as set forth in claim 1, wherein the gladhand comprises a fixed gladhand or a retractable gladhand.

21. The system as set forth in claim 20, wherein the connection tool includes a kickstand structure that is selectively positioned to engage a side wall of the trailer adjacent to the retractable glad hand so as to maintain the glad hand in an outwardly pivoted position.

22. The system as set forth in claim 1, wherein the controller is arranged to confirm a status of a connection between the connection tool and the gladhand after the connection member engages the gladhand seal.

23. The system as set forth in claim 22, wherein the controller is adapted to receive information from at least one of (a) the robotic arm performing a tug test of the connection tool, (b) a pressure sensor in line with the braking circuit (c) a pressure switch in line with the braking circuit, and (d) a flow sensor in line with the braking circuit.

24. The system as set forth in claim 1, wherein the connection tool is adapted to engage a predetermined first type of gladhand geometry, and further comprising at least a second connection tool, adapted to be removably carried from a second stowage location, with a second connection member adapted to carry pressurized air through a second type of gladhand geometry.

25. The system as set forth in claim 1, further comprising a rotation device that allows rotation of the connection tool with respect to the robotic arm, the rotation device constructed and arranged to selectively change between an unlocked state, a rotating state and a rotationally locked state.

26. The system as set forth in claim 25, wherein the rotation device is located on the connection tool and includes a receiving structure that removably attaches to the end effector, the receiving structure mounted on a base, and further comprising an actuator that movably interacts with the receiving structure to selectively define the unlocked state, the rotating state and the rotationally locked state.

27. The system as set forth in claim 26, wherein the receiving structure includes a bottom surface arranged to selectively engage rollers, operatively connected to the actuator, that are moved into and out of an interfering engagement with portions of the bottom surface based upon axial movement of the actuator with respect to the receiving structure.

28. The system as set forth in claim 1, wherein pressurized air is provided by a source on the braking circuit of a truck.

29. The system as set forth in claim 1, wherein the connection member includes a connection member seal defining a central orifice and a modified oval perimeter that, when engaged with a seal of the glad hand, allows for maintenance of a pressure connection in the presence of misalignment between the connection member seal and the glad hand seal.

30. The system as set forth in claim 1, wherein the stowage location includes a stowage stand that receives the connection tool in a predetermined stowed orientation, the tool being oriented into the stowed orientation by at least one of the robotic arm interacting with a structure of the stowage stand and an actuator assembly on the connection tool.

31. A system for interconnecting a brake line on an AV truck with a gladhand mounted on a front of a trailer hitched thereto comprising:
a connection tool adapted to be removably connected to and guided by a robotic arm by a controller, the connection tool having a connection member adapted to carry pressurized air from a braking circuit of the AV truck to a braking circuit of the trailer;
a gladhand capture assembly on the connection tool that selectively engages a portion of the gladhand;
the connection tool being movable between a plurality of configurations based upon a type of gladhand being engaged; and
a stowage stand having a frame that allows the connection tool to be stored in and removed therefrom by the robotic arm, the frame being constructed and arranged to cause each of the plurality of configurations to be defined by the connection tool.

32. The system as set forth in claim 31, wherein the frame includes a structure that allows the connection tool to move between an unlocked and a locked configuration based upon movement of the robotic arm.

33. A system for interconnecting a brake line on an AV truck with a gladhand mounted on a front of a trailer hitched thereto comprising:
a robotic arm, having an end effector, that is guided by a controller, from a stowage location to the gladhand, the end effector removably carrying a connection tool with a connection member adapted to carry pressurized air from a braking circuit of the AV truck to a braking circuit of the trailer;
a gladhand capture assembly on the connection tool that selectively engages a portion of the gladhand; and
a compliance structure located on at least one of the connection tool and the robot arm that enables a predetermined degree of motion between the gladhand and the connection member when engaging the gladhand.

34. The system as set forth in claim 33, wherein the compliance structure is passive and is located between the base of the connection tool and the gladhand capture assembly and includes a plurality of compliance elements arranged between a pair of mounts on each of respective subassemblies of the gladhand capture assembly.

35. The system as set forth in claim 34, wherein the compliance elements comprise semi-rigid, elastomeric elements.

36. The system as set forth in claim 33, wherein the compliance structure includes a lockout mechanism that limits compliance motion at predetermined times.

37. A system for interconnecting a brake line on an AV truck with a gladhand mounted on a front of a trailer hitched thereto comprising:
a robotic arm, having an end effector, that is guided by a controller, from a stowage location to the gladhand, the end effector removably carrying a connection tool with a connection member adapted to carry pressurized air from a braking circuit of the AV truck to a braking circuit of the trailer;
a gladhand capture assembly on the connection tool that selectively engages a portion of the gladhand; and
a hinge assembly including an active drive element that allows movement of the gladhand capture assembly relative to a base of the connection tool between at least two configurations to engage or retrieve each of a plurality of differing types of gladhands.

38. A system for interconnecting a brake line on an AV truck with a gladhand mounted on a front of a trailer hitched thereto comprising:
a robotic arm, having an end effector, that is guided by a controller, from a stowage location to the gladhand, the end effector removably carrying a connection tool with a connection member adapted to carry pressurized air from a braking circuit of the AV truck to a braking circuit of the trailer; and
a rotation device that allows rotation of the connection tool with respect to the robotic arm, the rotation device constructed and arranged to selectively change between an unlocked, rotating state and a rotationally locked state.

39. The system as set forth in claim 38, wherein the rotation device is located on the connection tool and includes a receiving structure that removably attaches to the end effector, the receiving structure mounted on a base, and further comprising an actuator that movably interacts with the receiving structure to selectively define the unlocked, rotating state and the rotationally locked state.

40. The system as set forth in claim 39, wherein the receiving structure includes a bottom surface arranged to selectively engage rollers, operatively connected to the actuator, that are moved into and out of an interfering engagement with portions of the bottom surface based upon axial movement of the actuator with respect to the receiving structure.

* * * * *